(12) United States Patent
Ai et al.

(10) Patent No.: US 10,567,700 B2
(45) Date of Patent: Feb. 18, 2020

(54) METHODS AND SYSTEMS OF VIDEO PROCESSING

(71) Applicant: SZ DJI TECHNOLOGY CO., LTD., Shenzhen (CN)

(72) Inventors: Chuyue Ai, Shenzhen (CN); Gaoping Bai, Shenzhen (CN); Weifeng Liu, Shenzhen (CN); Taiwen Liang, Shenzhen (CN); Yajun Lai, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 34 days.

(21) Appl. No.: 15/598,170

(22) Filed: May 17, 2017

(65) Prior Publication Data
US 2017/0256288 A1   Sep. 7, 2017

Related U.S. Application Data

(63) Continuation of application No. PCT/CN2015/075458, filed on Mar. 31, 2015, and a
(Continued)

(51) Int. Cl.
*H04N 5/92* (2006.01)
*H04N 5/262* (2006.01)
(Continued)

(52) U.S. Cl.
CPC ......... *H04N 5/9201* (2013.01); *G11B 27/036* (2013.01); *G11B 27/28* (2013.01);
(Continued)

(58) Field of Classification Search
CPC ....... G11B 27/28; G11B 27/34; G11B 31/006; H04N 5/9201; H04N 5/2628; H04N 5/76;
(Continued)

(56) References Cited

U.S. PATENT DOCUMENTS 9,818,451 B1 * 11/2017 Tyagi ..................... G11B 27/34
2003/0018647 A1   1/2003 Bialkowski
(Continued)

FOREIGN PATENT DOCUMENTS

| CN | 1304613 A | 7/2001 |
|---|---|---|
| CN | 1396758 A | 2/2003 |

(Continued)

OTHER PUBLICATIONS

The World Intellectual Property Organization (WIPO) International Search Report for PCT/CN2015/075458 dated Sep. 9, 2015 4 Pages.
(Continued)

*Primary Examiner* — Huy T Nguyen
(74) *Attorney, Agent, or Firm* — Anova Law Group, PLLC

(57) ABSTRACT

Methods and systems are provided for video processing. Video may be captured using an image capture device at a first definition. The image capture device may optionally be, or may be on board, an aerial vehicle, such as an unmanned aerial vehicle. A first set of video data may be transmitted to a user terminal at a second definition, which may be less than the first definition. A user may interact with the user terminal to edit the video and generate a video edit request. The video edit request may be transmitted to the image capture device, which may accordingly produce a second set of video data in accordance with the video edit request, at a third definition. The third definition may be greater than the second definition.

17 Claims, 37 Drawing Sheets

Related U.S. Application Data continuation-in-part of application No. PCT/CN2014/093785, filed on Dec. 14, 2014, and a continuation-in-part of application No. PCT/CN2014/093786, filed on Dec. 14, 2014.

(51) Int. Cl.

| | | |
|---|---|---|
| *H04N 5/76* | (2006.01) | |
| *H04N 5/91* | (2006.01) | |
| *H04N 9/82* | (2006.01) | |
| *H04N 5/77* | (2006.01) | |
| *G11B 27/28* | (2006.01) | |
| *G11B 27/34* | (2006.01) | |
| *G11B 31/00* | (2006.01) | |
| *G11B 27/036* | (2006.01) | |
| *H04N 7/01* | (2006.01) | |
| *H04N 7/015* | (2006.01) | |

(52) U.S. Cl.
CPC ............ *G11B 27/34* (2013.01); *G11B 31/006* (2013.01); *H04N 5/2628* (2013.01); *H04N 5/76* (2013.01); *H04N 5/7605* (2013.01); *H04N 5/77* (2013.01); *H04N 5/772* (2013.01); *H04N 5/91* (2013.01); *H04N 5/9202* (2013.01); *H04N 5/9205* (2013.01); *H04N 5/9206* (2013.01); *H04N 7/015* (2013.01); *H04N 7/0125* (2013.01); *H04N 9/8205* (2013.01); *H04N 9/8233* (2013.01)

(58) Field of Classification Search
CPC ........ H04N 5/7605; H04N 5/77; H04N 5/772; H04N 5/91; H04N 5/9202; H04N 5/9205; H04N 5/9206; H04N 7/0125; H04N 7/015; H04N 9/8205; H04N 9/8233
See application file for complete search history.

(56) References Cited

U.S. PATENT DOCUMENTS

| | | | |
|---|---|---|---|
| 2003/0093790 A1 | 5/2003 | Logan et al. | |
| 2004/0175047 A1 | 9/2004 | Gormish et al. | |
| 2005/0033756 A1 | 2/2005 | Kottomtharayil et al. | |
| 2005/0033758 A1 | 2/2005 | Baxter | |
| 2005/0052469 A1* | 3/2005 | Crosby | G06F 17/30905 345/619 |
| 2007/0019072 A1* | 1/2007 | Bengtsson | B64D 11/0015 348/148 |
| 2007/0174774 A1 | 7/2007 | Lerman et al. | |
| 2007/0179979 A1* | 8/2007 | Folgner | G06F 17/30017 |
| 2007/0239787 A1* | 10/2007 | Cunningham | G06F 3/04817 |
| 2010/0118150 A1 | 5/2010 | Boland et al. | |
| 2011/0008024 A1 | 1/2011 | Sasaki et al. | |
| 2011/0206351 A1 | 8/2011 | Givoli | |
| 2013/0302010 A1 | 11/2013 | Kuo et al. | |
| 2014/0211987 A1* | 7/2014 | Fan | G06K 9/0063 382/103 |
| 2014/0300807 A1* | 10/2014 | Kamiya | H04N 5/2251 348/373 |
| 2015/0009347 A1 | 1/2015 | O'Donnell et al. | |
| 2015/0086184 A1* | 3/2015 | Takamune | H04N 21/44016 386/353 |
| 2016/0129999 A1* | 5/2016 | Mays | B64C 39/024 701/2 |
| 2016/0155472 A1* | 6/2016 | Elg | G11B 27/005 386/223 |
| 2017/0064247 A1 | 3/2017 | Schwartz et al. | |

FOREIGN PATENT DOCUMENTS

| | | |
|---|---|---|
| CN | 101167134 A | 4/2008 |
| CN | 101312535 A | 11/2008 |
| CN | 101395571 A | 3/2009 |
| CN | 101557483 A | 10/2009 |
| CN | 101681665 A | 3/2010 |
| CN | 101740082 A | 6/2010 |
| CN | 101753941 A | 6/2010 |
| CN | 102215429 A | 10/2011 |
| CN | 102685430 A | 9/2012 |
| CN | 103002330 A | 3/2013 |
| CN | 103096184 A | 5/2013 |
| CN | 103313122 A | 9/2013 |
| CN | 103412746 A | 11/2013 |
| CN | 103490842 A | 1/2014 |
| CN | 103716712 A | 4/2014 |
| CN | 103761985 A | 4/2014 |
| CN | 103856806 A | 6/2014 |
| CN | 103916535 A | 7/2014 |
| CN | 104052935 A | 9/2014 |
| CN | 104104907 A | 10/2014 |
| EP | 1095507 B1 | 4/2012 |
| JP | H11176137 A | 7/1999 |
| JP | 2002297630 A | 10/2002 |
| JP | 2003256432 A | 9/2003 |
| JP | 2004320233 A | 11/2004 |
| JP | 2005109566 A | 4/2005 |
| JP | 2006303594 A | 11/2006 |
| JP | 2008227860 A | 9/2008 |
| JP | 2009055152 A | 3/2009 |
| JP | 2011007592 A | 1/2011 |
| JP | 2012049840 A | 3/2012 |
| JP | 2014059773 A | 4/2014 |
| WO | 9429868 A2 | 12/1994 |
| WO | 2008136466 A1 | 11/2008 |

OTHER PUBLICATIONS

The World Intellectual Property Organization (WIPO) International Search Report for PCT/CN2015/076015 dated Sep. 18, 2015 4 Pages.

The World Intellectual Property Organization (WIPO) International Search Report and Written Opinion for PCT/CN2014/093785 dated Jun. 12, 2015 9 Pages.

Takaki Sasahara, Adobe CS3 Production Premium a la Carte 2nd—Video Editing Function of Photoshop CS3 Extended, Sep. 1, 2007, pp. 78-82, Shashin Kogyo Publisher Inc.

Thorough Comparison—Movie Editing Software Programs, PCFan, Aug. 1, 2008, pp. 176-181, vol. 15, No. 16, Mainichi Communications Inc.

Ryosuke Yamaguchi et al., Final Cut Pro X—Super Reference for Macintosh, Sep. 30, 2011, pp. 64, 65, 70, 71, First Edition, Sotechsha Co. Ltd.

Seiji Sugawara, Codex Digital Uncompressed Disc Recording System Portable, Video α, Sep. 1, 2008, pp. 55-58, Shashin Kogyo Publisher Inc.

ASCII dot PC, Feb. 1, 2005, No. 81, pp. 36-43, ASCII Coporation.

The World Intellectual Property Organization (WIPO) International Search Report and Written Opinion for PCT/CN2014/093786 dated Sep. 22, 2015 7 Pages.

Hiroyasu Kitada, NHK "The 32nd Program Technology Exhibition", Hohsoh Gijutsu, May 1, 2003, pp. 136-141, vol. 56, No. 5.

Omori et al, "Waveform-analysis apparatus determines frame number of video data with respect to position of analog signal waveform data based on number of measurement data per pulse of frame synchronization signal of video data" 2017, Derwent 2011-A56429.

\* cited by examiner

Video Edit Request File Title

Segment 1
  Prologue Video ID
  Prologue Video Directory
  Filter Effect
  Output Size and Frame Rate
  Bit Rate Segment 2
  Transition Effect Video ID
  Transition Effect Video Directory
  Relative Start Time of Transition Effect Video
  Filter Effect
  Output Size and Frame Rate
  Bit Rate Segment 3
  Epilogue Video ID
  Epilogue Video Directory
  Filter Effect
  Output Size and Frame Rate
  Bit Rate

FIG. 10

METHODS AND SYSTEMS OF VIDEO PROCESSING

CROSS-REFERENCE

This application is a continuation application of International Application No. PCT/CN2015/075458, filed on Mar. 31, 2015, which claims priority to International Application No. PCT/CN2014/093785, Filed Dec. 14, 2014 and International Application No. PCT/CN2014/093786, filed on Dec. 14, 2014; is a continuation-in-part of International Application No. PCT/CN2014/093785, filed on Dec. 14, 2014; and is a continuation-in-part of International Application No. PCT/CN2014/093786, filed on Dec. 14, 2014, the contents of which are hereby incorporated by reference in their entirety.

BACKGROUND

Aerial vehicles, such as unmanned aerial vehicles (UAVs), have been developed for a wide range of applications including surveillance, search and rescue operations, exploration, and other fields. Such UAVs can often carry a camera module onboard for video capturing.

The video captured by UAVs can be displayed, edited and distributed. However, current video processing methods and systems for UAVs can be less than ideal. For example, excessive bandwidth may be consumed in downloading the captured video from a UAV, especially high definition video.

SUMMARY

A need exists for improved methods and systems for editing images, such as video, captured by image capture devices. In some instances, the image capture devices may be supported by or integral to movable objects, such as unmanned vehicles. Methods may be provided for editing video captured by image capture devices, such as image capture devices on unmanned aerial vehicles (UAVs). The editing may occur on a user terminal, such as a handheld device. In some embodiments, the UAV may have an image capture device that captures video at a first definition and transmits the captured video to the handheld device at a second definition. The handheld device may receive and edit the captured video at the second definition and form a video edit request. The video edit request may be small in size and contain edited video data information for an edited video. The video edit request may then be transmitted to the UAV and/or image capture device. The UAV and/or image capture device may analyze the edited video file, generate a video file corresponding to the edited video data information, and transmit the generated video file to the handheld device or another device.

With the methods, devices and terminals of present disclosure, the user terminal may download the video at a lower definition from the image capture device before editing, rather than the high definition video. The user may edit the video at the user terminal, transmit a small video edit request to the image capture device, and receive a high definition video corresponding to the edited video from the image capture device. Therefore, the pressure on bandwidth for transmission and computation for video editing may be alleviated, since not all the high definition video is transmitted.

According to an aspect of the present invention, a method of processing a video is provided. The method comprises: receiving a first set of video data at a user terminal, wherein the first set of video data is provided from an image capture device remote to the user terminal and configured to capture a video at a first definition, wherein the first set of video data at the user terminal is received at a second definition; editing the received first set of video data at the second definition, thereby forming a video edit request; transmitting the video edit request to the image capture device; and receiving, from the image capture device, a second set of video data at a third definition, wherein the second set of video data corresponds to edited video data in the video edit request.

According to another aspect of the present invention, a user terminal for processing a video is provided. The user terminal comprises a communication unit that permits communication with a remote image capture device, wherein the image capture device is configured to capture a video at a first definition; and one or more processors that individually or collectively: receive a first set of video data, wherein the first set of video data is provided from the image capture device, wherein the first set of video data is received at a second definition; edit the received first set of video data at the second definition, thereby forming a video edit request; generate a signal for the communication unit to transmit the video edit request to the image capture device; and receive a second set of video data from the image capture device at a third definition, wherein the second set of video data corresponds to edited video data in the video edit request.

According to another aspect of the present invention, a computer program product for processing a video, the computer program product being encoded on non-transitory machine-readable storage media, is provided. The computer program product comprises: instructions for receiving a first set of video data at a user terminal, wherein the first set of video data is provided from an image capture device remote to the user terminal and configured to capture a video at a first definition, wherein the first set of video data at the user terminal is received at a second definition; instructions for editing the received first set of video data at the second definition, thereby forming a video edit request; instructions for transmitting the video edit request to the image capture device; and instructions for receiving, from the image capture device, a second set of video data at a third definition, wherein the second set of video data corresponds to edited video data in the video edit request.

According to another aspect of the present invention, a method of processing a video is provided. The method comprises capturing, using an image capture device, a video at a first definition, and storing the video in memory; transmitting a first set of video data derived from the video to a user terminal remote to the image capture device at a second definition; receiving, at the image capture device, a video edit request from the user terminal, wherein the video edit request is formed from editing the received first set of video data at the second definition at the user terminal; finding corresponding video to edited video data described by the video edit request in the memory, thereby forming a second set of video data at a third definition; and transmitting, to the user terminal, the second set of video data at the third definition.

According to another aspect of the present invention, an image capture device for processing a video is provided. The image capture device comprises an image sensor configured to capture a video at a first definition; and one or more processors that individually or collectively: generate a signal for the communication unit to transmit a first set of video data derived from the video at a second definition; receive a video edit request generated at the user terminal, wherein the video edit request is formed from editing the received first set of video data at the second definition at the user terminal; find corresponding video to edited video data described by the video edit request in a memory, thereby forming a second set of video data at a third definition; and generate a signal for a communication unit to transmit, to the user terminal, the second set of video data at the third definition.

According to another aspect of the present invention, a processor is provided. The processor is configured to: receive a video edit request from a user terminal, wherein the video edit request is formed from editing a received first set of video data at a second definition at the user terminal, and wherein the first set of video data is provided from an image capture device remote to the user terminal and configured to capture a video at a first definition; find corresponding video to edited video data described by the video edit request in a memory, thereby forming a second set of video data at a third definition, wherein the memory is configured to store the video at the first definition; and generate a signal for a communication unit to transmit the second set of video data at the third definition to the user terminal.

According to another aspect of the present invention, a method of processing a video is provided. The method comprises capturing, at an image capture device, a video at a first definition, and storing the captured video in a memory; providing, from the image capture device, a first set of video data derived from the captured video to a user terminal, wherein the first set of video data is provided at a second definition; editing, at the user terminal, the first set of video data at the second definition, thereby forming a video edit request; providing, from the user terminal, the video edit request to the image capture device; finding, at the image capture device, corresponding video to edited video data described by the video edit request in the memory, thereby forming a second set of video data at a third definition; and providing, from the image capture device, the second set of video to the user terminal at the third definition.

According to another aspect of the present invention, a system for processing a video is provided. The system comprises an image capture device; and a user terminal in communication with the image capture device, wherein the image capture device comprises: an image sensor configured to capture a video at a first definition; a memory configured to store the video at the first definition; one or more processors that individually or collectively: generate a signal to provide a first set of video data derived from the captured video to the user terminal, wherein the first set of video data is provided at a second definition; receive a video edit request generated at the user terminal, wherein the video edit request is formed from editing the first set of video data at the second definition at the user terminal; find corresponding video to edited video data described by the video edit request in the memory, thereby forming a second set of video data at the first definition; and generate a signal to provide, to the user terminal, the second set of video data at a third definition; wherein the user terminal comprises: one or more processors that individually or collectively: receive the first set of video data at the second definition; edit the received first set of video data at the second definition, thereby forming a video edit request; generate a signal to provide the video edit request to the image capture device; and receive the second set of video data from the image capture device at the third definition.

According to another aspect of the present invention, a method of processing a video is provided. The method comprises determining, at a user terminal, whether a video captured by an image capture device remote to the user terminal is to be processed; selecting, at the user terminal, one or more video clips to be merged to the video captured by the image capture device when the video is determined to be processed, thereby forming a video edit request; and transmitting the video edit request to the image capture device to cause the image capture device to process the video by merging the one or more video clips with the video.

According to another aspect of the present invention, a user terminal for processing a video is provided. The user terminal comprises a communication unit that permits communication with a remote image capture device, wherein the image capture device is configured to capture a video; one or more processors that individually or collectively: determine whether a video captured by the image capture device is to be processed; select one or more video clips to be merged to the video captured by the image capture device when the video is determined to be processed, thereby forming a video edit request; and generate a signal for the communication unit to transmit the video edit request to the image capture device to cause the image capture device to process the video by merging the one or more video clips with the video.

According to another aspect of the present invention, a computer program product for processing a video captured by an image capture device, the computer program product being encoded on non-transitory machine-readable storage media, is provided. The computer program product comprises instructions for determining whether the video captured by the image capture device is to be processed; instructions for selecting one or more video clips to be merged to the video captured by the image capture device when the video is determined to be processed, thereby forming a video edit request; and instructions for generating a signal for a communication unit to transmit the video edit request to the image capture device to cause the image capture device to process the video by merging the one or more video clips with the video.

Accordingly to another aspect of the present invention, non-transitory computer readable medium containing program instructions for processing a video captured by an image capture device is provided. The non-transitory computer readable medium comprises program instructions for determining whether the video captured by the image capture device is to be processed; program instructions for selecting one or more video clips to be merged to the video captured by the image capture device when the video is determined to be processed, thereby forming a video edit request; and program instructions for generating a signal for a communication unit to transmit the video edit request to the image capture device to cause the image capture device to process the video by merging the one or more video clips with the video.

According to another aspect of the present invention, a method of processing a video is provided. The method comprises capturing a video at an image capture device; receiving, at the image capture device, a video edit request from a user terminal remote to the image capture device, wherein the video edit request is formed from a selection of one or more video clips to be merged to the video when a determination is made at the user terminal that the video is to be processed; and merging the one or more video clips to the video captured at the image capture device based on the video edit request.

According to another aspect of the present invention, an image capture device for processing a video is provided. The image capture device comprises an image sensor configured to capture a video; a communication unit that permits communication with a user terminal remote to the image capture device; and one or more processors that individually or collectively: generates a signal for the image sensor to capture a video; receives a video edit request from the user terminal, wherein the video edit request is formed from a selection of one or more video clips to be merged to the video when a determination is made at the user terminal that the video is to be processed; and merges the one or more video clips to the video captured at the image sensor based on the video edit request.

According to another aspect of the present invention, a processor is provided. The processor is configured to receive a video edit request from a user terminal remote to the processor, wherein the video edit request is formed from a selection of one or more video clips to be merged to the video when a determination is made at the user terminal that the video is to be processed; and merge the one or more video clips to the video captured at an image capture device based on the video edit request.

According to another aspect of the present invention, a method of processing a video is provided. The method comprises capturing a video at an image capture device; and determining, at a user terminal, whether the video captured by the image capture device is to be processed; selecting, at the user terminal, one or more video clips to be merged to the video captured by the image capture device when the video is determined to be processed, thereby forming a video edit request; providing, from the user terminal the video edit request to the image capture device; and merging, at the image capture device, the one or more video clips to the video captured by the image capture device.

In another aspect of the present invention, a system for processing a video is provided. The system comprises an image capture device configured to capture a video; and a user terminal that is in communication with the image capture device, wherein the user terminal comprises: one or more processors that individually or collectively: determine whether the video captured by the image capture device is to be processed; select one or more video clips to be merged to the video captured by the image capture device when the video is determined to be processed, thereby forming a video edit request; and generate a signal to provide the video edit request to the image capture device; and wherein the image capture device comprises: an image sensor configured to capture the video; one or more processors that individually or collectively: receive the video edit request from the user terminal; generate a signal for the image sensor to capture a video; and merge the one or more video clips to the video captured at the image sensor.

It shall be understood that different aspects of the invention can be appreciated individually, collectively, or in combination with each other. Various aspects of the invention described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 10 is an example of content in a video edit request as formed at a user terminal, in accordance with an embodiment of the invention.

DETAILED DESCRIPTION

Figure 1:
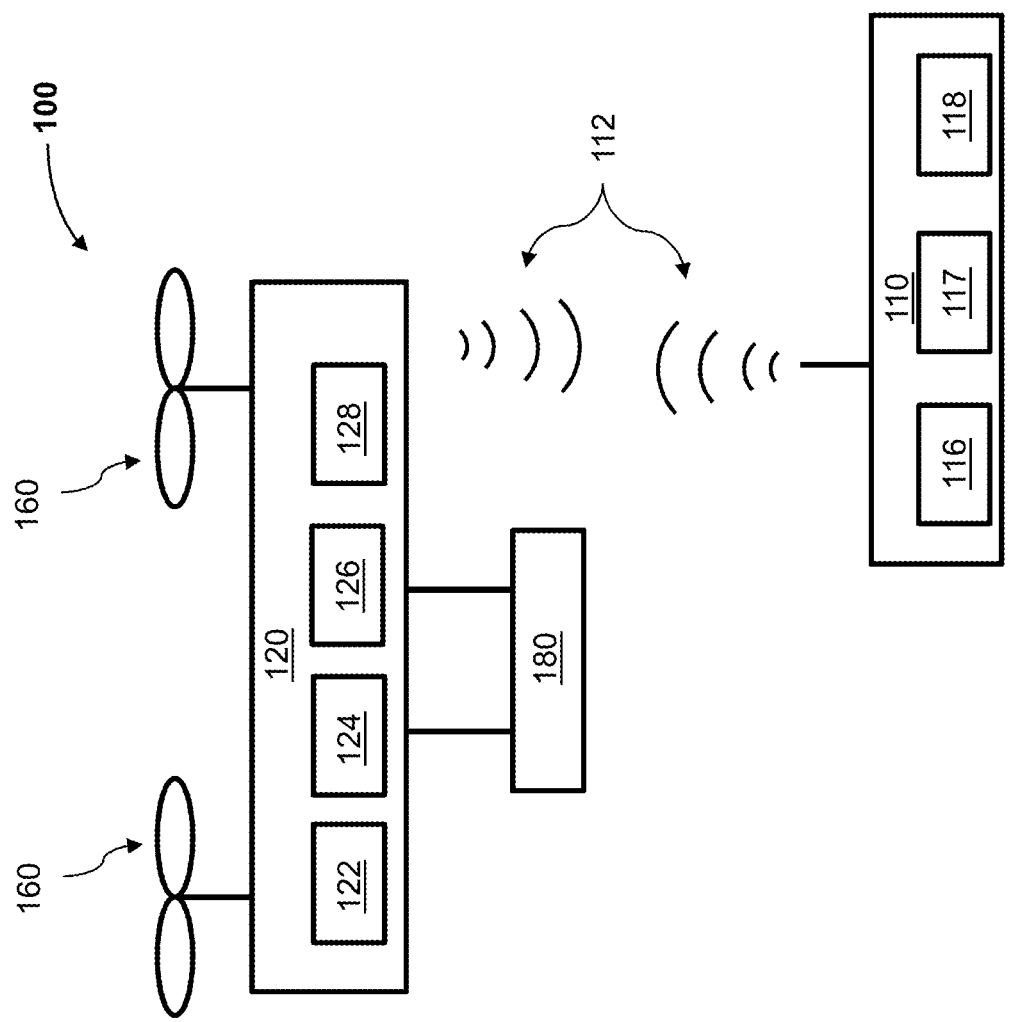
FIG. 1 shows a schematic of an unmanned aerial vehicle (UAV) that is used to capture video, and a user terminal, in accordance with an embodiment of the invention.

The methods, devices and terminals described herein provide an effective approach for efficiently transmitting and editing video captured by an image capture device, such as an image capture device on-board or integral to a movable object such as an unmanned aerial vehicle (UAV). The methods, devices and terminals described herein can be used to capture video at high definition, transmit and edit video at lower definition, and obtain and distribute an edited video at high definition. The methods, devices and terminals disclosed herein can be applied to any suitable movable object or stationery object. A movable object may be capable of self-propelled movement (e.g., a vehicle), while a stationary object may not be capable of self-propelled movement. In some embodiments, the movable object may be a UAV.

Methods may be provided for editing video captured by image capture devices, such as image capture devices on unmanned aerial vehicles (UAVs). The editing may occur on a user terminal, such as a handheld device. In some embodiments, the UAV may have an image capture device that captures video at a first definition and transmits the captured video to the handheld device at a second definition. The handheld device may receive and edit the captured video at the second definition and form a video edit request. The video edit request may be small in size and contain edited video data information for an edited video. The video edit request may then be transmitted to the UAV and/or image capture device. The UAV and/or image capture device may analyze the edited video file, generate a video file corresponding to the edited video data information, and transmit the generated video file to the handheld device or another device.

Image capture devices may be used for capturing video. In some embodiments, the image capture device may capture video at a first definition (e.g., high definition), store the captured video in a memory and transmit the captured video to a user terminal at a second definition that is lower than the first definition. The image capture device may then receive a video edit request from the user terminal. The video edit request may contain edited video data information on an edited video. The image capture device may generate a video file at the first definition corresponding to the edited video data information, and transmit the generated video file to the user terminal. In some embodiments, the image capture device may be supported by or may be part of a UAV. Any description herein of an image capture device of a UAV may apply to other image capture devices that are supported by or part of other movable objects, or non-movable objects. Additionally, any description herein of an image capture device of a UAV may apply to any type of image capture device, such as high-definition image capture devices.

User terminals may be used for editing video. In some embodiments, the user terminal may receive video at a second definition from an image capture device which captures video at a first definition higher than the second definition. The user terminal may edit the received video, form a video edit request and transmit the video edit request to the image capture device. The video edit request may be small in size and contain edited video data information on the edited video. The user terminal may then receive from the image capture device a video file which is generated at the first definition corresponding to the edited video data information.

The user terminal may download the video at a lower definition from the image capture device, rather than the high definition video. A user at the user terminal may edit the video at the user terminal, transmit a video edit request to the image capture device, and receive a high definition video corresponding to the edited video, from the image capture device. Therefore, the pressure on bandwidth for transmission and computation for video editing may be alleviated, since not all the high definition video is transmitted. Systems and methods provided herein may advantageously permit editing of video that was captured at a high definition with reduced amounts of transmission delay and required processing power.

FIG. 1 shows a schematic of an unmanned aerial vehicle (UAV) 100 and a user terminal 110 in accordance with an embodiment of the invention. Any description herein of a UAV 100 may apply to any type of movable object, such as an aerial vehicle. The description of a UAV may apply to any type of unmanned movable object (e.g., which may traverse the air, land, water, or space). The UAV may support an image capture device or may have an image capture device integrally formed thereon that is used to capture video.

The UAV 100 may have a body 120. In some instances, the body 120 may be a central body which may have one or more branching members, or "arms." The arms may extend outward from the body in a radial manner and be joined via the body. In some instances, the arms may form T-bars. In some instances, the arms may or may not be movable relative to the rest of the body. The number of arms may or may not match the number of propulsion units, or rotors, of the UAV. For example, the UAV may be a quadcopter having four propulsion units, each supported by a separate arm of the UAV. In another example, a UAV may be a quadcopter having four propulsion units, where two propulsion units are supported on the ends of a T-shaped arm of the UAV. The body may comprise a housing. The housing may enclose one or more components of the UAV within the housing. In some instances, one or more electrical components of the UAV may be provided within the housing. For example, a flight controller of the UAV may be provided within the housing. The flight controller may control operation of one or more propulsion units 160 of the UAV. The propulsion units 160 may each include the rotors and/or motors.

The UAV 100 may carry a variety of sensors onboard, including but not limited to laser sensor, lidar, infrared sensor, inertial measurement unit (IMU), global positioning system (GPS) sensor, audio collecting sensor, and optical sensor. The sensors and propulsion units may be powered by a battery assembly. The battery assembly may include one or more batteries, which may be distributed within a housing of the UAV.

The UAV 100 may include an image sensor 122, a memory, 124, a processor 126, and a communication system 128. Additionally, UAV 100 may include an image capture device 180. The image capture device may be integrally formed as part of the UAV or may be a separable component supported by the UAV. The image sensor 122 may be a component of image capture device 180, or image sensor 122 may interact with the image capture device 180 such that image sensor 122 receives image data that is captured by the image capture device 180 of UAV 100. Similarly, the memory 124, processor 126, and/or communication system 128 may be a part of the image capture device 180 or may be part of the UAV outside the image capture device that may interact with the image capture device 180 or the image sensor 122.

Additionally, FIG. 1 illustrates user terminal 110. The user terminal 110 may be any type of device having data processing capacity and communicating capacity. In some embodiments, the user terminal 110 may be a mobile device, such as a smartphone (e.g., iPhone, Android phone, Windows mobile phone, Blackberry, etc.) or tablet (e.g., iPad, Android tablet, Surface tablet). The user terminal may be any other type of device, such as a laptop computer, desktop computer, or wearable object. The user terminal 110 may be able to communicate with an image capture device 180 that is remote to the user terminal 110. The user terminal may communicate directly with the image capture device or a UAV 100 that may support the image capture device. In some instances, the UAV and the image capture device may be one and the same. Any description herein of communication with an image capture device may refer to communication with the image capture device without communication with a UAV, communication with a UAV that supports or is integral to the image capture device, or communication with both an image capture device and the UAV. The user terminal may communicate with the image capture device over a wireless link, including but not limited to, a radio frequency (RF) link, a Wi-Fi link, a blue tooth link, a 2G link, a 3G link, a 4G link, or a LTE link. The communication may occur directly between the user terminal and the image capture device, or may traverse a network, such as a telecommunications network.

The user terminal 110 may include a communication system 116, memory 117, and processor 118. The communication system 116 of the user terminal may be able to interact with a communication system 128 of the UAV 100 via wireless signals 112. The communication systems 128, 116 may include any number of transmitters, receivers, and/or transceivers suitable for wireless communication. The communication may be one-way communication, such that data can be transmitted in only one direction. For example, one-way communication may involve only the UAV 100 transmitting data to the user terminal 110, or vice-versa.

For example, one-way communication may include image data, such as video, as well as additional information such as video edit requests. For example, video data may be transmitted from one or more transmitters of the communication system 128 to one or more receivers of the communication system 116. The video data may then be stored in memory 117 and edited using processor 118. Once a video edit request is generated at user terminal 110, the video edit request may be transmitted from one or more transmitters of the communication system 116 to one or more receivers of the communication system 128.

Alternatively, the communication may be two-way communication, such that data can be transmitted in both directions between the UAV 100 and the user terminal 110. The two-way communication can involve transmitting data from one or more transmitters of the communication system 128 to one or more receivers of the communication system 116, and vice-versa. The two-way communication may include video data from the image capture device and/or UAV to the user terminal, and one or more video edit requests from the user terminal to the image capture device and/or UAV. In some instances, communications may include one or more command signal from the user terminal to the image capture device and/or UAV. For instance, a command signal may be used to control operation and/or flight of the UAV. Thus, the user terminal that may be used for video editing may also be used to control operation and/or flight of the UAV. In another example, the command signal may be used to control operation of one or more sensors or other components on-board the UAV. Thus, the user terminal that may be used for video editing may be used to control collection of data of the UAV. The command signal may be used to control operation and/or positioning of the image capture device relative to the UAV. Thus, the user terminal that may be used for video editing may be used to control operation and/or positioning of the image capture device. The same device may be used to control any or all of these functions. Alternatively, one or more different devices may be used to control these various functions.

In some embodiments, the image capture device 180 may be a camera. The camera 180 may be rigidly coupled to the UAV 100. Alternatively, the camera 180 may be permitted to move relative to the UAV 100. In some instances, the camera may be permitted to move with respect to up to six degrees of freedom relative to the UAV. The camera 180 may be directly mounted onto the UAV 100, may be incorporated within the UAV 100, or may be coupled to a carrier mounted onto the UAV 100. In some embodiments, the carrier may be a gimbal. The carrier may permit the camera to rotate about one, two, three, four or more axes of rotation. This may permit the field of view captured by the camera to be altered. In some embodiments, the camera 180 may be an element of a payload of the UAV 100.

The camera 180 may capture images of an environment of the UAV 100. The images may include still images (e.g., snapshots) and/or video images. The camera 180 may continuously capture video and/or snapshots. Alternatively, the camera 180 may capture video and/or snapshots at a specified frequency to produce a series of image data and/or video data over time. In some embodiments, the video may be captured simultaneously with a recording of environment audio.

In some embodiments, the captured video and/or images may be stored in a memory onboard the UAV 100, such as memory 124. The memory 124 may be on-board the image capture device 180 or may be separate from the image capture device. The memory may include non-transitory computer readable medium that may include one or more memory units (e.g., removable media or external storage such as a Secure Digital (SD) card, or a random access memory (RAM), or a read only memory (ROM) or a flash memory). Alternatively, the captured video and/or images may be transmitted to a remote terminal. The transmission of captured video and/or images may be implemented over a wireless link, including but not limited to, a radio frequency (RF) link, a Wi-Fi link, a blue tooth link, a 2G link, a 3G link, or a LTE link.

The camera 180 may comprise an image sensor 122, and one or more optical elements, such as lenses. The one or more lenses may be configured to direct light to the image sensor. An image sensor is a device that converts an optical image into an electronic signal. The image sensor of the camera 180 may be a charge-coupled device (CCD) type, a complementary metal-oxide-semiconductor (CMOS) type, a N-type metal-oxide-semiconductor (NMOS) type, or a back-side illuminated CMOS (BSI-CMOS) type. Optionally, image data from the image sensor may be stored in memory 124 on-board or off-board the image capture device. The memory 124 may be on-board a UAV.

A focal length of an optical system is a measure of how strongly the system converges or diverges light. The focal length of an optical lens is the distance over which initially collimated rays are brought to a focus. There are two types of lenses: prime and zoom. A prime lens may have a fixed focal length and the focal length may encompass a single focal length. A zoom lens may have variable focal lengths and the focal length may encompass a plurality of focal lengths. In some embodiments, the lens of the camera 180 may be a zoom lens. Alternatively, the lens of the camera 180 may be a prime lens.

In some embodiments, a lower limit of the focal length range for a zoom lens suitable for the image capture device of the present invention may be less than or equal to 1 mm, 2 mm, 4 mm, 6 mm, 8 mm, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 120 mm, 130 mm, 140 mm, 150 mm, 160 mm, 170 mm, 180 mm, 190 mm, 200 mm, 220 mm, 240 mm, 260 mm, 280 mm, 300 mm, 320 mm, 340 mm, 360 mm, 380 mm, 400 mm, 450 mm, 500 mm, 550 mm, 600 mm, 650 mm, 700 mm, 750 mm, 800 mm, 850 mm, 900 mm, 950 mm, 1000 mm, or 1150 mm. Optionally, the lower limit of the focal length range for the image capture device of the present invention may be less than or equal to any of the values described herein. The lower limit of the focal length range for a zoom lens suitable for the image capture device of the present invention may have a value falling within a range between any two of the values described herein.

In some instances, an upper limit of the focal length range for a zoom lens suitable for the image capture device of the present invention may be less than or equal to 2 mm, 5 mm, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 120 mm, 130 mm, 140 mm, 150 mm, 160 mm, 170 mm, 180 mm, 190 mm, 200 mm, 220 mm, 240 mm, 260 mm, 280 mm, 300 mm, 320 mm, 340 mm, 360 mm, 380 mm, 400 mm, 450 mm, 500 mm, 550 mm, 600 mm, 650 mm, 700 mm, 750 mm, 800 mm, 850 mm, 900 mm, 950 mm, 1000 mm, 1150 mm, or 2000 mm. Optionally, the upper limit of the focal length range for a zoom lens suitable for the image capture device of the present invention may be less than or equal to any of the values described herein. The upper limit of the focal length range for a zoom lens suitable for the image capture device of the present invention may have a value falling within a range between any two of the values described herein.

In some instances, a focal length of a prime lens suitable for the image capture device of the present invention may be less than or equal to 1 mm, 2 mm, 4 mm, 6 mm, 5 mm, 6 mm, 8 mm, 10 mm, 12 mm, 14 mm, 16 mm, 18 mm, 20 mm, 22 mm, 24 mm, 26 mm, 28 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 120 mm, 130 mm, 140 mm, 150 mm, 160 mm, 170 mm, 180 mm, 190 mm, 200 mm, 220 mm, 240 mm, 260 mm, 280 mm, 300 mm, 320 mm, 340 mm, 360 mm, 380 mm, 400 mm, 450 mm, 500 mm, 550 mm, 600 mm, 650 mm, 700 mm, 750 mm, 800 mm, 850 mm, 900 mm, 950 mm, 1000 mm, 1150 mm, or 1200 mm. Optionally, the focal length of a prime lens suitable for the image capture device of the present invention may be less than or equal to any of the values described herein. The focal length of a prime lens suitable for the image capture device of the present invention may have a value falling within a range between any two of the values described herein.

In photography, the field of view (FOV) is that part of the world that is visible through the camera at a particular position and orientation in space; objects outside the FOV when the picture is taken are not recorded in the photograph. It is most often expressed as the angular size of the view cone, as an angle of view. For normal lens, field of view can be calculated as FOV=2 arctan(d/2f), where d is image sensor size, and f is focal length of the lens. For an image sensor having a fixed size, the prime lens may have a fixed FOV and the FOV may encompass a single FOV angle. For an image sensor having a fixed size, the zoom lens may have variable FOV angular range and the FOV angular range may encompass a plurality of FOV angles.

In some instances, a FOV of a prime lens suitable for the image capture device of the present invention may be less than or equal to 170°, 169°, 165°, 160°, 155°, 150°, 145°, 140°, 135°, 130°, 125°, 120°, 115°, 110°, 105°, 100°, 95°, 90°, 85°, 80°, 75°, 70°, 65°, 60°, 55°, 50°, 45°, 40°, 35°, 30°, 25°, 20°, 15°, 10°, 5°, 3°, 2°, or 1°. Optionally, the FOV of a prime lens suitable for the image capture device of the present invention may be less than or equal to any of the values described herein. The FOV of a prime lens suitable for the image capture device of the present invention may have a value falling within a range between any two of the values described herein.

In some instances, a lower limit of the FOV angular range for a zoom lens suitable for the image capture device of the present invention may be less than or equal to 170°, 169°, 165°, 160°, 155°, 150°, 145°, 140°, 135°, 130°, 125°, 120°, 115°, 110°, 105°, 100°, 95°, 90°, 85°, 80°, 75°, 70°, 65°, 60°, 55°, 50°, 45°, 40°, 35°, 30°, 25°, 20°, 15°, 10°, 5°, 3°, 2°, or 1°. Optionally, the lower limit of the FOV angular range for a zoom lens suitable for the image capture device of the present invention may be less than or equal to any of the values described herein. The lower limit of the FOV angular range for a zoom lens suitable for the image capture device of the present invention may have a value falling within a range between any two of the values described herein.

In some instances, an upper limit of the FOV angular range for a zoom lens suitable for the image capture device of the present invention may be less than or equal to 170°, 169°, 165°, 160°, 155°, 150°, 145°, 140°, 135°, 130°, 125°, 120°, 115°, 110°, 105°, 100°, 95°, 90°, 85°, 80°, 75°, 70°, 65°, 60°, 55°, 50°, 45°, 40°, 35°, 30°, 25°, 20°, 15°, 10°, 5°, 3°, 2°, or 1°. Optionally, the upper limit of the FOV angular range for a zoom lens suitable for the image capture device of the present invention may be less than or equal to any of the values described herein. The upper limit of the FOV angular range for a zoom lens suitable for the image capture device of the present invention may have a value falling within a range between any two of the values described herein.

An image capture device 180 may be a high-resolution image capture device. In some embodiments, the image capture device may be a 4K image capture device capable of achieving 4K resolution. The image capture device may be capable of achieving a horizontal resolution of greater than or equal to about 1000 pixels, 2000 pixels, 2500 pixels, 3000 pixels, 3500 pixels, 4000 pixels, 4500 pixels, 5000 pixels, 5500 pixels, 6000 pixels, 7000 pixels, 8000 pixels, or 10000 pixels. In some instances, the image capture device may achieve a horizontal resolution of less than or equal to about 4000 pixels, 6000 pixels, 8000 pixels, 10000 pixels, 12000 pixels, 15000 pixels, 20000 pixels, or 30000 pixels. The horizontal resolution of any of the images captured may fall between any of the values described herein. A high resolution camera may be capable of storing, in a memory, images at the resolution at which they were captured. Alternatively, images may be stored at a lower resolution than at which they were captured. The images may be stored in high resolution, such as any of the resolutions described herein. The images (e.g., video or still images) transmitted to a user terminal 110 may be at the resolution the images were captured or stored, or at a lower resolution from the resolution the images were captured or stored. In some instances, the resolution of the images transmitted to the user terminal may be less than about 100%, 95%, 90%, 80%, 70%, 60%, 50%, 40%, 30%, 20%, 10%, or 5% of the resolution at which the images are captured and/or stored. In some embodiments, transmitting the images at a lower resolution may advantageously reduce delay in data transmission and reduce the bandwidth taken up by the image data.

Figure 2:
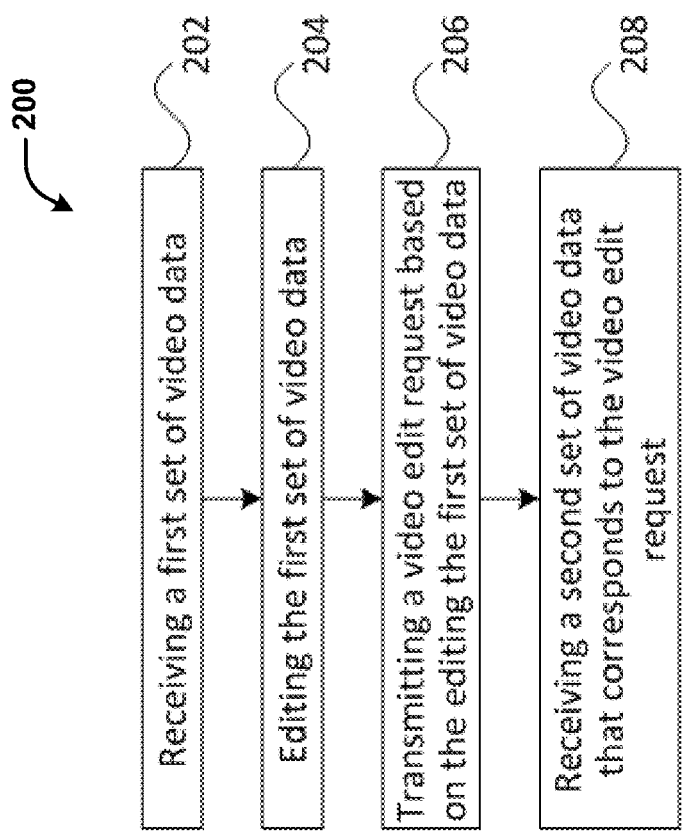
FIG. 2 is a flow chart illustrating a method of processing a video on a user terminal in accordance with an embodiment of the invention.

FIG. 2 is a flow chart illustrating a method 200 of processing a video on a user terminal in accordance with an embodiment of the invention.

In step 202, a first set of video data is received. In particular, the first set of video data may be received from an image capture device. Any description herein of receiving video data from an image capture device may include receiving the video directly from the image capture device, or receiving the video from an object, such as a UAV, that may support or include the image capture device. In some embodiments, the first set of video data may include live streaming video captured by the image capture device in real-time. In other instances, the first set of video data may include video that has been stored in memory and that does not need to be live or in real-time. The video may also be buffered at the user terminal. For example, live feed may be provided to the user terminal in at a time-delay so that a user may interact with the data ahead of the live stream. Additionally, the video data may include one or more video clips.

The first set of video data may be captured by the image capture device at a first definition, and may be provided to the user terminal at a second definition. The first and second definitions may be the same or may be different. In some instances, the second definition may be lower than the first definition (e.g., the image having the first definition may have a higher resolution than the image having the second definition). In particular, the first set of video data may be reduced in definition prior to being transmitted from the image capture device to the user terminal so as to lessen the taxing bandwidth required to transmit the video data and to process the video data once it is downloaded to the user terminal. As such, the first set of video data may be captured at a first definition and may be transmitted to the user terminal at a second definition that is lower than the first definition. In other examples, however, there may not be bandwidth restrictions on the transmitting and processing of video data. In these cases, the first definition and the second definition of the video data may be equal.

At step 204, the first set of video data is edited. In particular, the first set of video data is edited at the user terminal, thereby forming a video edit request. A video edit request may include editing information that provides instructions for a video capture device to edit video associated with the video edit request. For example, the image capture device may store the captured video at a memory accessible by the image capture device, and may send a copy of the captured video to the user terminal in the form of a first set of video data. Then, when the user edits this first set of video data, the user may only need to provide instructions to the image capture device on how to edit video that is stored at the image capture device in order to fulfill a video edit request from the user terminal, since another copy of the video is accessible the image capture device at the memory.

A user at a user terminal may interact with the user terminal to edit the video. For example, the user terminal may include a display that shows a graphical representation of the video to be edited. The graphical representation may include a timeline or other time-based features. The user may perform editing features, such as cutting a video clip, deleting portions of a video clip, adding a video clip, inserting a video clip, modifying a video clip, altering speed of playback of a video clip such as presenting the video clip in a slow motion mode or presenting the video clip in a fast playing mode, adding one or more visual effects or filters to a video clip, adding audio to a video clip, modifying audio of a video clip, or any other editing tasks, such as those described in greater detail elsewhere herein. The user terminal may track the edits made and form the video edit request. The user terminal may form the video edit request based on the final edited video at the user terminal. Any description herein of transmitting a video edit request or any other type of data to an image capture device may include transmitting the video edit request or other data directly to the image capture device, or transmitting the video request or other data to an object, such as a UAV, that may support or include the image capture device.

After the video edit request is formed based on editing the first set of video data at step 204, the video edit request is transmitted to the image capture device at step 206. In particular, the video edit request is based on the editing of the first set of video data and includes information related to how to edit video data that is associated with the first set of video data. For this example, the original captured video data that matches the first set of video data, and is stored by the image capture device, is considered to be associated with the first set of video data. As previously described, any description herein of storing or editing image data by the image capture device may apply to the camera itself or an object, such as a UAV that may support or include the camera.

At step 208, the user terminal receives a response to its video edit request. In particular, at step 208, the user terminal receives a second set of video data that corresponds to the video edit request. In one example, the second set of video data may be generated when the image capture device retrieves video associated with the video edit request, edits the video based on the video edit request, and provides a second set of video data that is responsive to the video edit request to the user terminal. The second set of video data may be provided at a third definition. In some embodiments, the third definition may be the same as the first definition at which the image was captured. In other instances, the third definition may be lower than the first definition at which the image was captured. The third definition may be higher than the second definition that was provided to the user terminal in the first set of video data.

Figure 3:
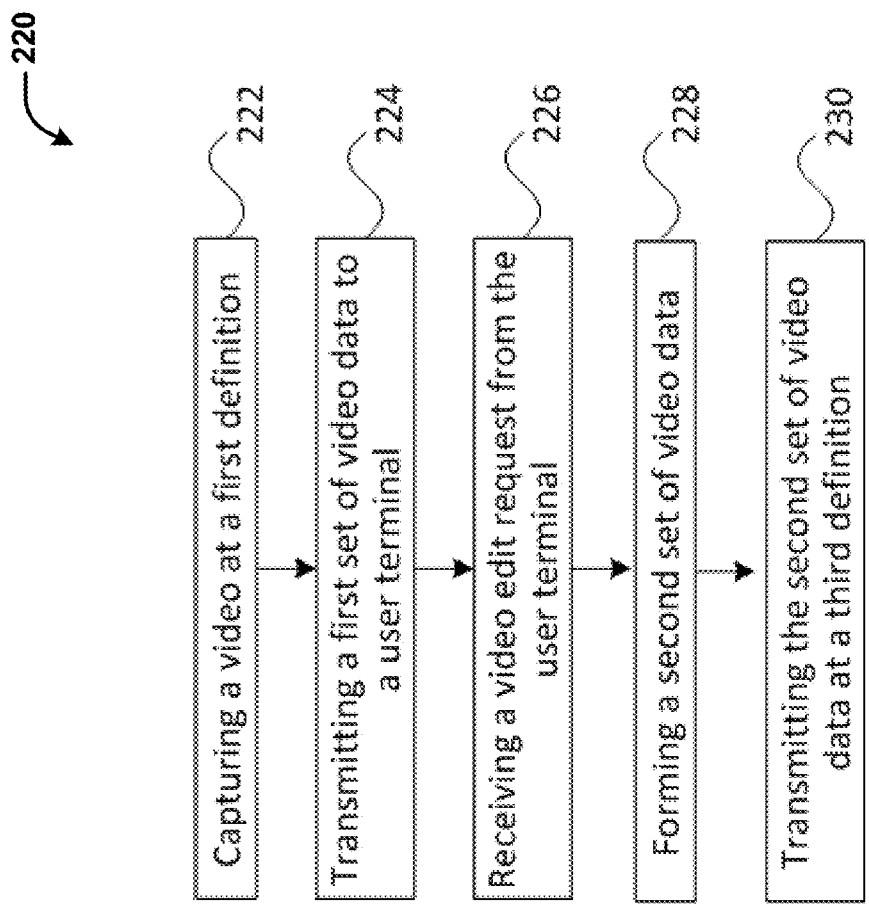
FIG. 3 is a flow chart illustrating a method of processing a video on an image capture device in accordance with an embodiment of the invention.

FIG. 3 is a flow chart 220 illustrating a method of processing a video on an image capture device in accordance with an embodiment of the invention. In step 222, a video is captured at a first definition. In particular, the video is captured at a first definition by an image capture device. The image capture device may be on or part of a movable object, such as a UAV 100 and the video may be captured at a high definition. Once the video is captured, the video may be stored in a memory. The memory may be on-board the image capture device and/or movable object. Any description of memory herein may apply to one or more memory storage units which may be on a single object or distributed over multiple objects. In some embodiments, the captured video data may be stored in the memory at the first definition (e.g., high definition, such as the high resolutions described elsewhere herein). Alternatively, the captured video data may be stored in the memory at a different definition than the first definition (e.g., at a lower definition). In some instances, a single copy of the video data may be stored in the memory. Alternatively, multiple copies of the video data may be stored in the memory. The multiple copies may be at the same definitions or at different definitions. Additionally, a copy of at least a portion of the video may be provided to a user terminal as a first set of video data. The first set of video data may be provided at a second definition, where the second definition may be equal to the first definition or the second definition may be at a lower definition. When the first set of video data is provided at a lower definition, the transmitting of the first set of video data may require less bandwidth, thereby providing advantages in speed and efficient use of data network coverage.

As such, at step 224, the first set of video data is transmitted to a user terminal. Once the first set of video data is received at the user terminal, the user may interact with the data so as to create a video edit request. The video edit request may include information related to the first set of video data and instructions on how to edit the copy of the captured video that is stored at the memory. In this way, the user terminal may provide an editing file to the image capture device and request an edited video based on the first set of video information without having to send back the first set of video data itself. Instead, the user terminal may request that the image capture device retrieve corresponding video from the memory that has the same video clips as those requested in the edited file. In other examples, the video clips retrieved from the memory may have the same content as those requested in the video edit request, but may have a higher definition.

Once a video edit request has been generated at the user terminal and transmitted to the image capture device, the video edit request is received at the image capture device at step 226. After the video edit request is received, the image capture device may retrieve video clips associated with the video edit request and may generate a second set of video data based on the information in the video edit request at step 228. For example, the image capture device may retrieve selected video clips and arrange them in an order described in the video edit request. The image capture device may generate the second set of video data to mirror the edits that are made at the user terminal. The second set of video data may be provided at a different definition (e.g., higher definition) from the video edited at the user terminal. In some instances, the second set of video data may include editing features that were performed at the user terminal, such as cutting a video clip, deleting portions of a video clip, adding a video clip, inserting a video clip, modifying a video clip, altering speed of playback of a video clip, adding one or more visual effects or filters to a video clip, adding audio to a video clip, modifying audio of a video clip, or any other editing tasks, such as those described in greater detail elsewhere herein. In some instances, the second set of video data may be generated as a single video file with the edited features.

Once the second set of video data has been generated at the image capture device, the second set of video data may be transmitted to the user terminal at step 230. Additionally, since the second set of video data may be retrieved from the memory, which stores video at a first definition, the second set of video data may be transmitted to the user device at a third definition that matches the first definition. Alternatively, the video clips included in the second set of video data may be extracted from the memory at the third definition, which may be different from the first definition, such that the second set of video data may be provided to the user terminal at a third definition that is less than the first definition. The third definition may be higher than the second definition at which the first set of video data was provided. In some instances, the third definition may be at a minimum of 10%, 20%, 30%, 40%, 50%, 60%, 70%, 80%, 90%, 100%, 150%, 200%, 300%, 400%, 500%, 600%, 700%, 800%, 900%, or 1000% higher resolution than the second definition.

The second set of video data may be transmitted to the user terminal at which the video editing occurred. Alternatively, the second set of video data may be transmitted to another device, in addition to the user terminal or instead of the user terminal. For instance, the second set of video data may be transmitted to a device of a different user (e.g., computer, laptop, mobile device (e.g., smartphone, tablet) or of the same user. In some instances, the second set of video data may be uploaded to the cloud or to a file sharing site. The second set of video data may be uploaded to a video sharing site.

Figure 4:
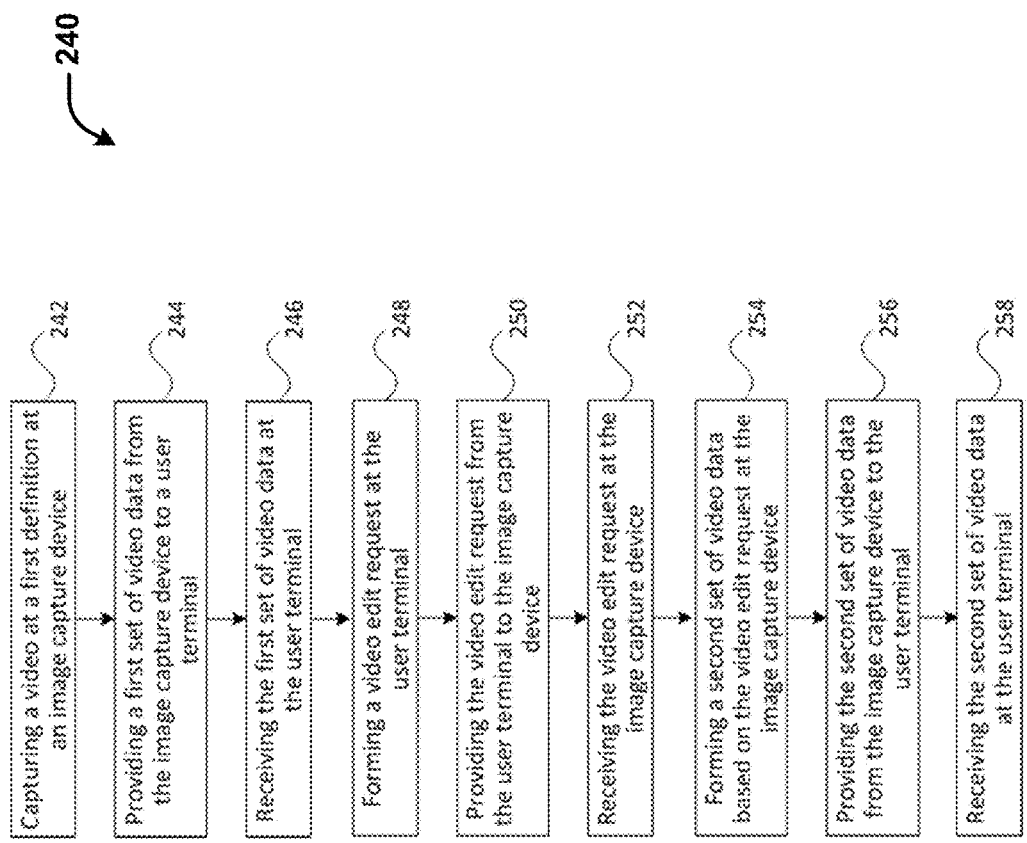
FIG. 4 is a flow chart illustrating a method of processing a video in an image processing system in accordance with an embodiment of the invention.

FIG. 4 is a flow chart 240 illustrating a method of processing a video in an image processing system in accordance with an embodiment of the invention. In step 242, video at a first definition is captured at an image capture device. The first definition may be a high definition, such as resolution values described elsewhere herein. Additionally, the video may be stored at a memory of the image capture device. Additionally, a copy of the video may be copied and sent to a user terminal as a first set of video data. At step 244, the first set of video data is provided to the user terminal. The user terminal may be remote from the image capture device. In one example, the user terminal may be a mobile device and the image capture device may be on a UAV. The user terminal and the image capture device may be physically separated from one another. In some instances, no physical connection is provided between the user terminal and the image capture device and/or UAV. The user terminal and image capture device may or may not be within line of sight of one another. The image capture device may be movable or may be supported by a movable object that may cause the distance and/or position of the image capture device to change relative to the user terminal. In some alternative embodiments, the user terminal may be coupled to the image capture device. For example, if the image capture device is a stationary camera, the stationary camera may be connected to a user terminal for a user to interact with the first set of video data.

At step 246, the first set of video data is received at the user terminal. Once the first set of video data is received at the user terminal, a user may interact with the video data and generate a video edit request. In particular, the video edit request may include information that a user may want to include in an edited video formed from video having the same or similar content as the first set of video data. Accordingly, at step 248 a video edit request is formed at the user terminal. The video edit request may include sufficient data that permits the image capture device to provide a second set of video data in accordance with edits made by the user at the user terminal using the first set of video data.

Once the video edit request is formed, the video edit request may be provided to the image capture device at step 250. The video edit request may be received at the image capture device at step 252. Once the video edit request has been received at the image capture device, the image capture device may generate a second set of video data based on the video edit request. In particular, the image capture device may identify video clips associated with the video edit request by accessing the memory. The memory may story video data that corresponds with the first set of video data. In some embodiments, the video data stored at the memory may be at a high definition. As such, the video clips retrieved from the memory may be at a high definition.

After retrieving the video clips that correspond to the video edit request, the image capture device may synthesize the video clips in an arrangement provided by the video edit request. In this way, the image capture device may generate the second set of video data (step 254) that is responsive to the video edit request received from the user terminal. At step 256, the image capture device may provide the second set of video data to the user terminal. At step 258, the user terminal may receive the second set of video data.

Figure 5:
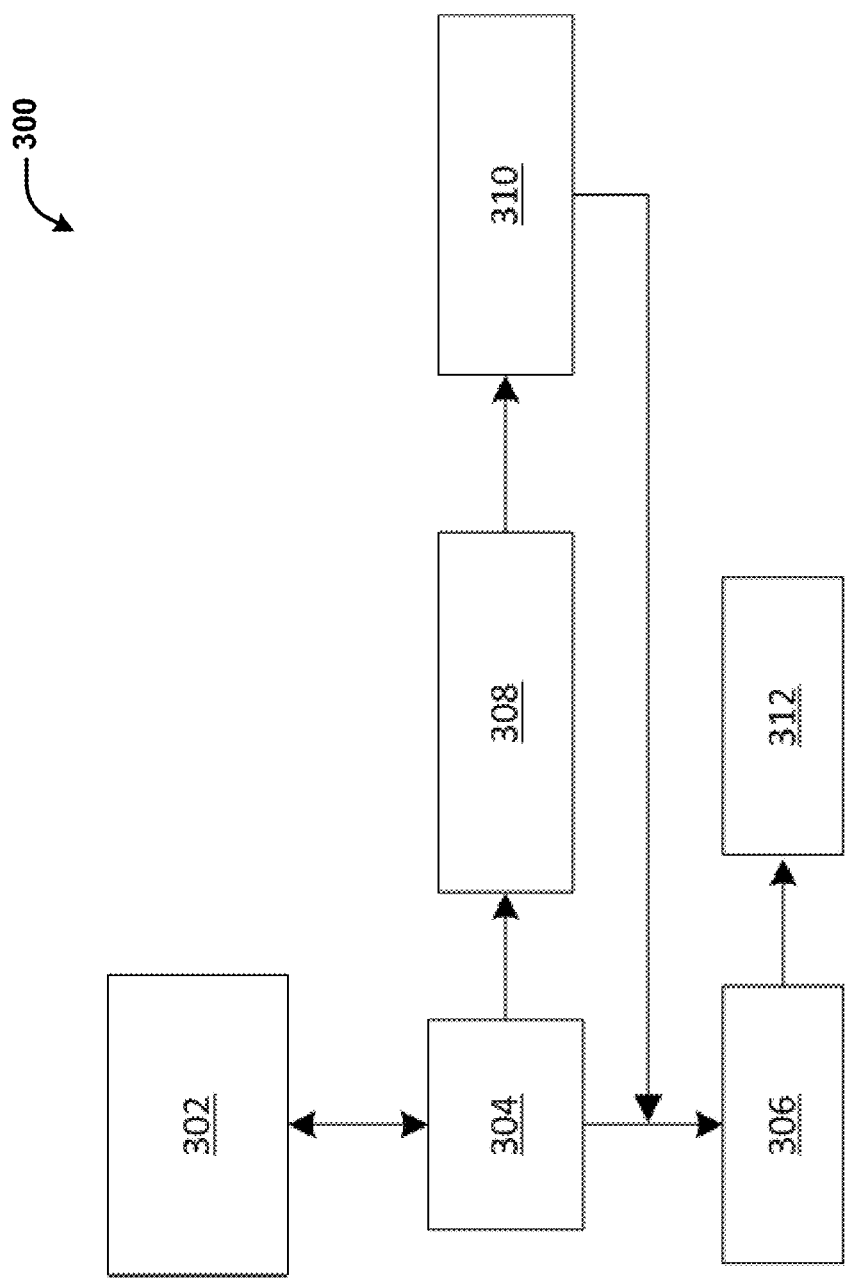
FIG. 5 illustrates exemplary flow of image-related data among image capturing components in an image processing system, in accordance with an embodiment of the invention.

FIG. 5 illustrates exemplary flow 300 of image-related data among image capturing components in an image processing system, in accordance with embodiments. In some embodiments, image-related data includes raw or processed image data as well as data extracted or derived from the image data such as edited image data. As illustrated, raw image data can be captured by an image sensor 304. The image sensor may be in communication with one or more data storage devices 302. The image sensor may also be in communication with an image transmission module 306 and/or a pre-processing unit 308. The image transmission module may transmit data to a user terminal 312. The pre-processing unit may communicate with a processing unit 310, which may transmit data to a user terminal. In some embodiments, the communication between the image sensor 304 and the image transmission module 306 and the communication between the image transmission module 306 and the user terminal 312 may be bi-directional.

The image sensor 304 may be configured to convert optical signals into electronic signals. The image sensor may include semiconductor charge-coupled devices (CCD), active pixel sensors using complementary metal-oxide-semiconductor (CMOS) or N-type metal-oxide-semiconductor (NMOS, Live MOS) technologies, or any other types of sensors. The image sensor may be coupled to a movable object such as a UAV. For example, the image sensor may be part of an imaging device (e.g., camera) that is carried by a UAV with or without a carrier. The image sensor and/or imaging device may be configured to capture pictures, videos, or any other image data with any suitable parameters such as width, height, aspect ratio, megapixel count, resolution or quality, and the like. For example, the imaging device may be configured to capture high-definition or ultra-high-definition videos (e.g., 720p, 1080i, 1080p, 1440p, 2000p, 2160p, 2540p, 4000p, 4320p, and so on).

An image sensor 304 may be coupled to a UAV and may be utilized to capture image data while the UAV is in flight or otherwise engaged. The image sensor may be configured to capture image data while the UAV is in operation and/or when the UAV is powered on or off. In an example, the image data that is captured by an image sensor may be provided directly to a user terminal in real-time. In another example, the image data may be stored and/or processed prior to providing the image data to the user terminal. In some examples, the image data provided to the user terminal may be at an equal or lower definition than the image data that is captured by the image sensor 304. In examples where the image data is provided to the user terminal at a lower definition, the demand for bandwidth may be lessened.

When the image data is not provided directly to the user terminal, the image data captured by the image sensor 304 can be stored in a data storage device 302. The image data may be accessed from the data storage device at a later time and used to be provided to the user terminal. In some instances, image data from the image sensor may be simultaneously stored in the data storage device, pre-processed or processed, and/or transmitted to a user terminal.

The data storage device 302 may be based on semiconductor, magnetic, optical, or any suitable technologies and may include flash memory, USB drives, memory cards, solid-state drives (SSDs), hard disk drives (HDDs), floppy disks, optical disks, magnetic tapes, and the like. For example, the data storage device 302 can include removable storage devices that may be detachably coupled to an imaging device such as memory cards of any suitable formats such as PC Card, CompactFlash, SmartMedia, Memory Stick, Memory Stick Duo, Memory Stick PRO Duo, Miniature Card, Multimedia Card (MMC), Reduced Size Multimedia Card (RS-MMC), MMCmicro Card (MMCmicro), PS2 card, Secure Digital (SD) card, SxS, Universal Flash Storage (UFS), miniSD, microSD, xD-Picture Card, Intelligent Stick (iStick), Serial Flash Module (SFM), NT Card, XQD card, and the like. The data storage device 302 can also include external hard disk drives, optical drives, tape drives, floppy drives, and other suitable storage devices that may be operatively connected to the imaging device.

The image data captured by image sensor 304 may be stored at a data storage device 302 and, additionally, a copy of the image data captured by image sensor 304 may be transmitted to a user terminal 312 by an image transmission module 306. The image transmission module may permit wireless communications with the use terminal. The image data that is transmitted to the user terminal 312 may be shown to correspond with the image data that is stored at the data storage device 302, such as through the use of a source video identification. In some embodiments, the image data may be compressed or otherwise processed before being transmitted by the image transmission module 306. In other cases, the image data may not be compressed or processed before being transmitted. In particular, image data may be compressed so as to decrease the burden of transmitting image data across a network. This, in turn, may decrease the time it takes to download image data on a user's device. In some embodiments, the image data may be compressed so as to minimize the demand for wireless transmission of the image data. The image data may be compressed to be less than about 95%, 90%, 80%, 70%, 60%, 50%, 40%, 30%, 20%, 10%, or 5% of the original data. The transmitted image data may be displayed on the user terminal 312 so that a user operating the user terminal 312 can view the image data and/or interact with the user terminal 312 based on the image data.

Optionally, the image data captured by the image sensor 304 can be pre-processed by a pre-processing unit 308. The pre-processing unit 308 can include any hardware, software, or a combination thereof. Examples of a pre-processing unit 308 can include a field programmable gate array (FPGA). The pre-processing unit 308 can be operatively coupled to the image sensor 304 to pre-processing of the raw image data before the image data is processed to extract specific piece of information. Examples of tasks performed by the pre-processing unit 308 can include re-sampling to assure the correctness of the image coordinate system, noise reduction, contrast enhancement, scale space representation, and the like.

The image data, as processed by the pre-processing unit 308, can optionally be further processed by a processing unit 310 that is operatively coupled to the pre-processing unit 308 (e.g., via a general purpose memory controller (GPMC) connection). Alternatively, no further processing is required. The processing unit 310 can include one or more ARM processors. The processing unit 310 can be configured to perform any suitable embodiments of the methods described herein. Examples of tasks performed by the processing unit 310 may include feature extraction at any suitable level of complexity, image segmentation, data verification, image recognition, image registration, image matching, and the like. In some embodiments, the processing unit 310 produces auxiliary information related to image data that has been captured by image sensor 304. The auxiliary information may include, for example, the location, size, or other characteristics of a target within one or more images.

The auxiliary information as determined by the processing unit 310 can be provided to the user terminal 312 via a communication module. In some embodiments, the communication module may be separate from the image transmission module 306 described above. In other embodiments, the communication module may include or be included in the image transmission module 306. Any suitable means of communication can be used for the communication module and/or the image transmission module 306, such as wired communication or wireless communication. For example, the communication module and/or the image transmission module 306 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. In addition to tracking information, the communication module can also be configured to transmit and/or receive sensing data from other sensors onboard the movable object, positional and/or motion information determined by processing the sensing data, predetermined control data, user commands from remote control terminals, and the like.

In some embodiments, the image data, as provided by the image transmission module 306, may be augmented by or otherwise combined with the auxiliary information, as produced by the processing unit 310. The user may also interact with the user terminal based on the augmented image data. For example, the user may edit and/or create videos based on the image data or the augmented image data.

In some embodiments, the image data can be provided to the user terminal 312 in response to a demand by the user terminal 312. For example, the user terminal 312 may demand such image data only when a user elects to a certain viewing mode (e.g., an active viewing mode that requests image data in real-time, or a delayed viewing mode that requests image that has been buffered so that a user may fast-forward through recent-time image data. Alternatively or additionally, the image data may be provided to the user terminal 312 without any demand by the user terminal 312. For example, the image data may be pushed to the user terminal 312 on a periodic basis (e.g., every 0.1 second, 0.2 second, 0.5 second, 1 second, or 2 second). In some embodiments, data may be pushed down through the image transmission module or other communication module. Alternatively, data may be pulled down from the user terminal, which may send one or more requests for data to the image transmission module or other communication module.

Figure 6:
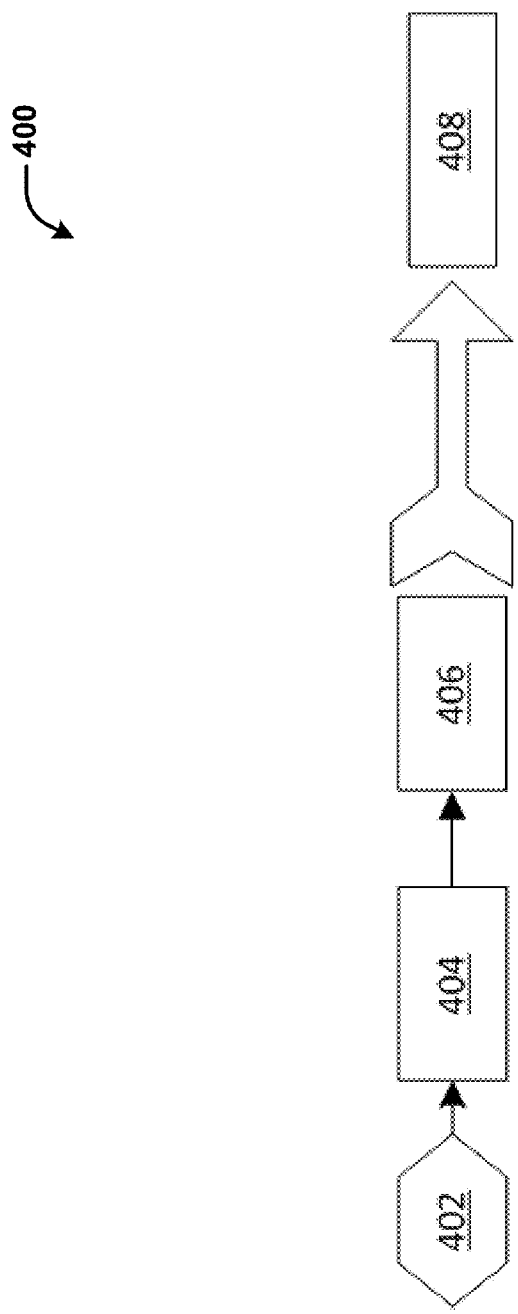
FIG. 6 illustrates exemplary flow of image-related data further among image editing components in an image processing system, in accordance with an embodiment of the invention.

FIG. 6 illustrates exemplary flow 400 of image-related data further among image editing components in an image processing system, in accordance with embodiments. In particular, FIG. 6 illustrates a flow of image-related data that produces an editing file at the user terminal. An example of an editing file is a video edit request, which is discussed in greater detail in FIG. 7.

As discussed in FIG. 5, video captured at a first definition by an image capture device may be stored at a memory that is accessible to the image capture device. Additionally, a copy of at least a portion of the captured video is provided as a first set of video data to a user terminal. In particular, the first set of video data is provided at a second definition to a user terminal, such as user terminal 404 as illustrated in FIG. 6. Once the first set of video data is received at user terminal 404, user 402 may interact with user terminal 404 to edit the first set of video data. The interactions of user 402 with user terminal 404 may be used to produce an editing file that includes editing information 406. Editing information 406 can include characteristics about a desired video clip, such as estimated starting time, estimated stopping time, area of an image to be highlighted/enlarged/minimized, and the like. Editing information may also include data about audio files or may include audio files themselves to be combined with video data.

In some embodiments, editing information 406 can be generated when a user 402 edits video image data via a user interface provided by the user terminal 404. For example, the user terminal 404 may allow a user 402 to use a double click to select a starting point and an ending point to identify a desired video clip. Based on the user selections and edits, editing information 406 may be generated. When a video clip is selected by the user, the information (attribution) of the video clip may be recorded. For example, when a user selects a particular video segment by engaging a double click, that selection may be identified as an editing operation that initiates storage of the video identification of the video segment selection along with other characteristics of the editing. This information may be included in editing information 406, and may include at least one of a starting time in the video stream, a ending time in the video stream, a time of being selected, a description of the selected video clip, a GPS information, a route of shooting, a format, a duration, a definition, etc. In some examples, the video attribution information associated with selected clips and editing operations may be stored in pre-configured files, such as a video edit request. Additionally or alternatively, the attribution information associated with a selected clip may be embedded within the video of interest.

A user 402 may select one or more video clips from video data that is provided to user terminal 404 by various ways, including a single click, double clicks, or pressing a video stream. The way of selecting a video clip may be chosen by the user from an interface of an application that is run on the user terminal 404. In some embodiments, video data provided to the user may include a live stream from an image capture device. Video data may be provided to a user while an image capturing device is in operation and/or while a UAV is in flight. The video data provided to the user may also be video data from a data storage unit (e.g., memory). This may include recently shot video, or video that was captured further in the past. The user may be able to access the video stored in the data storage unit regardless of when the video was captured. For instance, the user may be able to access video that was just captured within the past several seconds, video captured within the past several hours, video captured within the past several days, video captured within the past several weeks, or video captured within the past several months, or any other period of time.

If the user 402 wishes to select a video clip by single clicking the video stream, a video clip may be selected by extending a time period centering the time of the single click. For example, when the user single clicks at 15:35 of the video stream, a video clip may be selected from 15:30 to 15:40, or from 15:33 to 15:43, or from 15:28 to 15:43, depending on a preset configuration. In additional examples, a user may select a video clip by extending a time period that is initiated at the time of the single click. For example, when the user single clicks at 16:40 of the video stream, a video clip may be selected from 16:40-16:50. In another example, a user may select a video clip by backwardly extending a time period that is initiated at the time of the single click. For example, when a user single clicks at 16:30 of the video stream, a video clip may be selected from 16:30-16:40.

Additionally, when the user wishes to select a video clip by double clicking the video stream, a video clip may be selected having a duration equal to the time period between the two clicks. Further, if the user wishes to select a video clip by pressing on the video steam, a video clip may be selected having a duration equal to the time period of the pressing. In another example, a certain advance time period (e.g., 2 s) may be added to a method of video clip selection. For example, if the user presses on the video stream at 15:35 and releases at 15:40, a video clip may be selected from 15:33 to 15:40. This additional two second time delay allows the user to record video that the user may have been too slow to initiate at the precise moment that the user wanted to begin selection.

A user may be able to access any number of video clips stored in a data storage unit. The user may be able to see files or thumbnails of the various video clips that have been stored. The user may select one or more of the clips to edit. In some instances, information about the available video clips may be transmitted to a user terminal for the user to view and select. When a user selects one or more video clips, a set of video data corresponding to the video clip may be transmitted to the user terminal. The set of video data may be at a lower definition than the video data originally captured.

This editing information 406 that is produced by the user 402 interacting with the user terminal 404 may be used in editing the video clip. For example, when combining the selected video clips, the user may want to combine the video clips in a sequence of being selected (which may be different from a sequence in the original video stream), or the user may want to combine selected video clips having the same, or similar, GPS information. Additionally, as the user decides between video clips, not all of the selected video clips may be chosen to be combined into a final video. For example, the user may select some video clips from those selected clips according to certain criteria. Alternatively, a user may choose to apply a filter to certain video clips, or may choose to select only video clips that meet a threshold degree of brightness.

Accordingly, the user may choose whether or not to store selected video clips, or may choose to only store a subset of selected video clips. Selected video clips may be stored in a directory such as "highlight clips". Once a directory has been generated, the user may want to combine clips that are subsequently selected from this directory. The selected video clips may be stored in various formats such as MP4, AVI, MOV. Alternatively, the selected video clips may not be stored in order to save storage space. In order to lessen space constraints, the user may choose to store the information (attribution) of the selected video clips, rather than the full selected clips themselves, thereby forming a video edit request.

In some embodiments, the information (attribution) of the video clips by which the final video file is composed may be stored in the final video file. As such, the instruction to store this attribution information in the final video file may be included in the video edit request. In this way, when playing the final video file, the user may know the information (attribution) of the video clips, such as the GPS information of each clip.

Additionally, the user may want to further edit the selected video clips. For example, the user may want to further select a duration of video from a selected clip. This can be performed by dragging a time window, or by editing the information (attribution) of the video clip (e.g., edit a starting time or an ending time of the video clip).

In another example, the user may want to delete a selected video clip. This can be performed by removing the selected video clip from the directory, or by removing the information (attribution) of the video clip. The user may also want to add new video clips. This can be performed by selecting a new video clip from the stream, or by adding new information (attribution) of a video clip.

Additionally, users may add attribution information when editing video clips. The attribution of selected video clips may include a rating from the user. For example, the user may add his rating (three stars, four stars . . . ) when selecting the video clip. Alternatively, the rating may be a default value when the video clip is selected, and the user may choose to revise it later. Further, the attribution of selected video clips may be stored together with the video clips in a directory or library, such that the user may further select clips in the directory or library at a later time.

After the user has stored selected video clips, such as in a directory or a library, the user may set an edit rule for further selecting video clips to be combined from the directory or library. The edit rule may be a preset rule or a custom rule. For example, a preset rule may be: extracting video clips with a capturing date ###. For another example, a preset rule may be: extracting video clips with a capturing location "riverside". For another example, a preset rule may be: extracting video clips with a rating higher than four stars. The preset rule may a combination of above examples. The preset rule may be edited by the user.

Alternatively, the edit rule may be a custom rule created by the user. Alternatively, the user may set a custom rule by selecting from a menu of editing rules. For example, the user may set a custom rule as: extracting two clips with a rating higher than four stars, one clip with a capture location "forest", and one clip with a capture date "today". Based on the custom rule, the video clips meeting the edit rule may be further selected from the clip directory or library, for further processing such as combining.

Once selected video clips are identified, the user may request that a final video be produced by simple combining. This combining may be in a sequence of a time stamp of each video clips in original stream, in a sequence of being selected by the user, in a sequence of rating, or in a sequence of location, etc. Alternatively, the user may use a template for video combining and/or synthesizing. For example, the user may select a template from a template library, and then insert the selected video clips into the template. The template may include preset audio, subtitle and/or transition effect (a kind clip between two video clips).

The user may edit a template or may create a custom template. Alternatively, the user may select audio, subtitle and/or transition effect from an audio library, a subtitle library and/or a transition effect library when synthesizing the selected video clips. These customizations may be included in the video edit request.

Additionally, the user may preview the combined/synthesized video file, and further revise it. For example, the user may re-arrange the sequence of the clips. In some embodiments, the user can select a "random sequence" button or "shaking" the terminal in order to have the clips re-arranged. For another example, the user can add, delete or edit any clip to be included in the final video file. Once a final video has been composed, a video edit request that contains editing information 406 associated with the final video can be provided to a processing system 408. For example, the editing file that includes editing information 406 may be provided to processing system 408 via a communication module (not shown). The processing system 408 may be onboard a movable object (e.g., UAV). The processing system may encompass an image capture device, a movable object, or both. In some embodiments, an image processing system may include a user terminal as well.

Figure 7:
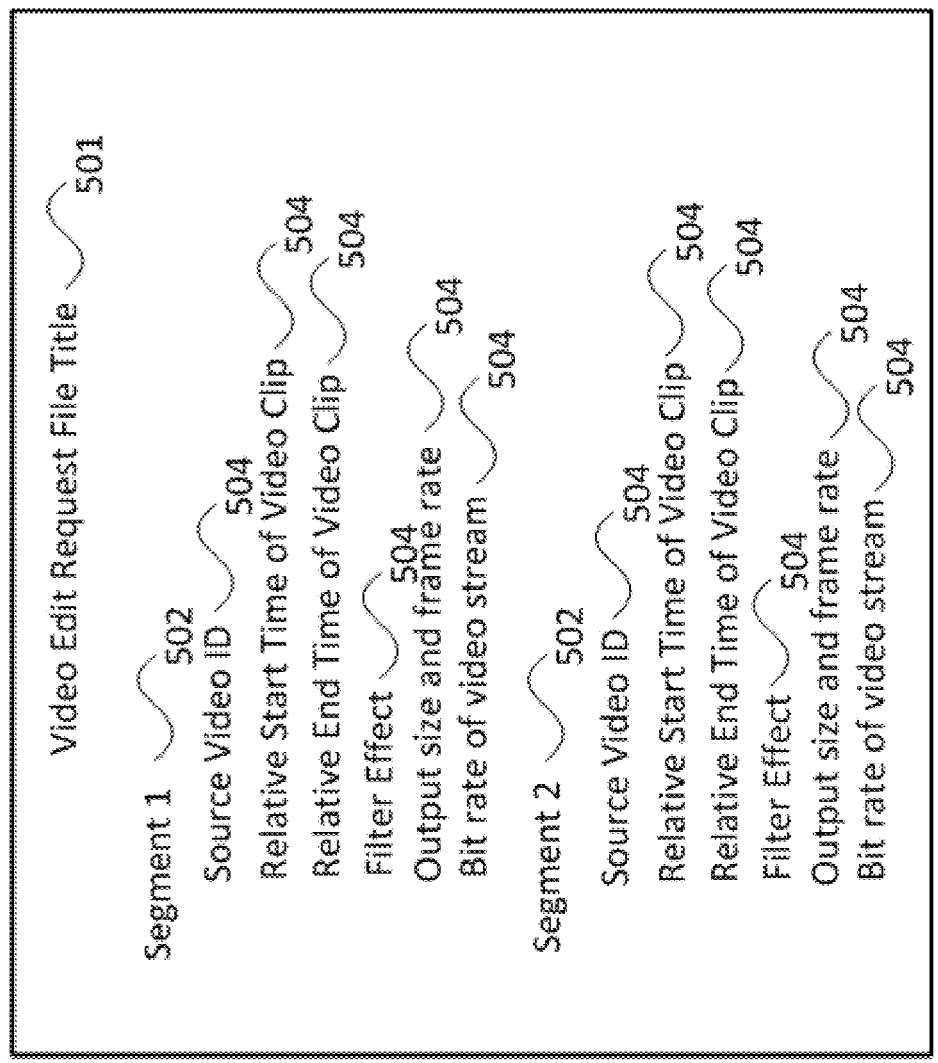
FIG. 7 illustrates an exemplary editing file, such as a video edit request, that may be generated at a user terminal of an image processing system, in accordance with an embodiment of the invention.

FIG. 7 illustrates an exemplary video edit request 500, which may be an editing file that may be generated at a user terminal of an image processing system, in accordance with embodiments. The video edit request 500 may be transmitted from a user terminal to an image processing device, such as image capture device 304 discussed above. The video edit request may be a file. The video edit request may be generated at a user terminal in response to a user's edits of video data.

The video edit request 500 may include editing information related to a first set of video data that is stored in, or accessible to, the image capture device. Accordingly, the editing information may be used by the image capture device to identify video that corresponds to the video edit request 500. In particular, the editing information may be used by the image capture device to identify video segments within the first set of video data. After identifying the video that corresponds with the video edit request, the video capture device may generate edited video data that complies with the video edit request.

As seen in FIG. 7, video edit request 500 may include segment specifications 502. Segment specifications provide information 504 related to a desired video segment, such as source video identification; a relative starting time of the video clip; a relative ending time of the video clip; filter effect; output size and frame rate; bit rate of video stream; and comments or others. For instance, the comments or others may include other interested or supplementary information on the desired video segment, e.g., a model of UAV, flight information describing flight parameters when the video segment is captured. Once the information 504 associated with segment specification 502 has been provided to the image capture device, a processor of the image capture device may use the information 504 to identify video data that is stored at the image capture device and may edit the video data so as to be consistent with the specifications listed in segment specification 502. For example, a video edit request may include a plurality of segments that are to be arranged in a specific order, for example, if a user requests a compilation of multiple video clips.

The information 504 may include additional details about the clip, such as any visual filters or effects that may be applied to the clip. For example, if a text overlay is applied to the clip, or a visual image superimposed over a portion of the clip, such details may be included in the information. Additionally, if any audio is added or modified, the video edit request may include information about the audio. For example, audio accompanying the image portion of a video file may be tracked to correspond to the edited video file. Similarly, the audio may be modified or added. For example, one or more segments of the accompanying audio may be muted out, or a voice or musical overlay may be added. In some instances, the audio data may be provided from the image capture device and/or UAV. Source audio files may also be provided from third party sources (e.g., songs) or may be generated at the user terminal (e.g., a user may record the user's voice, which may be used to narrate a portion of the video). Such information may or may not be included with the video edit request.

Figure 8:
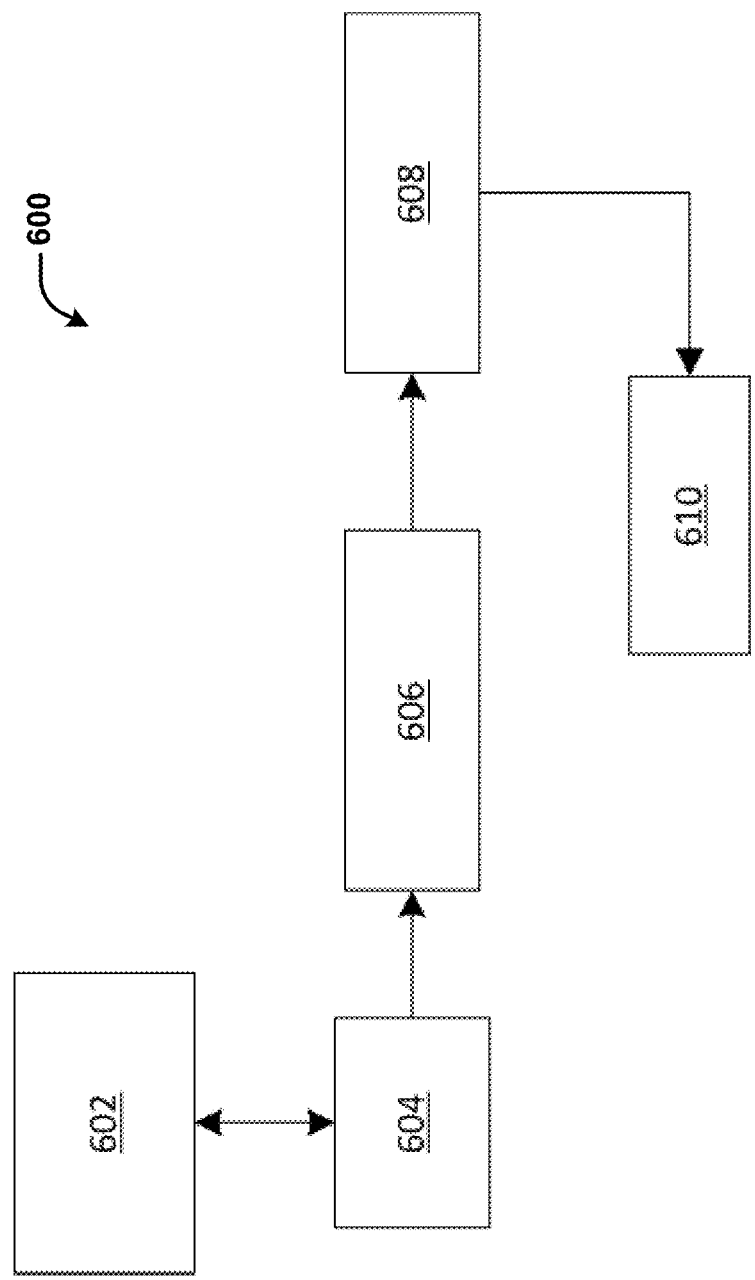
FIG. 8 illustrates exemplary flow of edited image-related data further among image generating components in an image processing system, in accordance with an embodiment of the invention.

FIG. 8 illustrates exemplary flow 600 of edited image-related data further among image generating components in an image processing system, in accordance with embodiments. An editing file, such as video editing request 500 as seen in FIG. 7, may be received at an image capture device 604. Image capture device 604 may be on-board a UAV or part of a UAV, such as a UAV 100 as seen in FIG. 1. Alternatively, the image capture device may be on any other type of movable object, such as a land-bound vehicle, aerial vehicle, water-based vehicle, or space-based vehicle. The image capture device may be carried on a handheld stabilizer, vehicle-supported stabilizer, or any other type of stabilizer. The image capture device may be worn by a human or animal. Once the image capture device 604 receives the editing file, image capture device 604 may access a memory 602 that stores image data associated with the editing file. Memory 602 may be stored locally on image capture device 604, or memory 602 may be accessed remotely. In particular, memory 602 may be used to store video that was captured by an image capture device, such as image capture device 604, and provided to a user terminal. Further, the editing file may include editing information that relates to the video that was captured by the image capture device and sent to the user terminal. In particular, when the video is edited at the user terminal, the editing information associated with the video is described in the editing file and associated with the video that is stored at memory 602. As such, the image capture device does not need the set of video content that was edited at the user terminal in order to generate a requested edited video. Rather, the image capture device merely accesses a copy of the video that is associated with the editing request and edits that video accordingly.

One benefit of this approach is that image capture device may edit video that is captured and stored at a high definition. In contrast, the video that is edited at the user terminal may be of a lower definition, for a number of reasons. For example, the user device may not be able to readily upload high definition video. Additionally, a user may not want to use the bandwidth associated with high definition video for the purpose of merely forming a video request. The user may also want to avoid excess data fees associated with downloading high definition video. Further, the time that it takes to download high definition video may be significantly longer than the time that it takes to download lower definition video. For all of these reasons, the user may prefer to utilize lower definition video to form a video edit request. As such, the image capture device may receive an editing file, such as a video edit request, which provides instructions on how image capture device is to edit video that has already been stored at memory 602.

In order to edit video that is stored at memory 602, the image capture device may retrieve video clips that are associated with the editing file. In particular, the image capture device may retrieve video clips based on attribution information that is provided in the editing file. For example, the video edit request may include segment specifications that indicate the video identification of video that contains one or more selected video clips. The segment specification may also include attribution information that describes a starting point and an ending point of a desired video clip. In this way, the image capture device may retrieve video clips that are associated with the video edit request from memory 602.

In another example, the image capture device may retrieve video clips based on attribution information that is embedded in video. The attribution information may be embedded by the processor of the image capture device at the time of capturing the data, or the attribution data may be embedded into the video based on instructions from a video edit file. Further, the image capture device may find and extract video clips that are indicated by the attribute information that is embedded in the, such as upon detection of a video synthesis command. Video synthesis may include the merging of video clips. After the video clips have been identified and extracted, the image capture device may synthesize the video clips into a video file. In another example, the image capture device may adjust the resolution of video clips when extracting the video clips from the video based on the attribution information. Additionally, the extracted video clips may be synthesized based on the starting point of the video clips.

Once selected video clips have been retrieved, the video clips associated with the editing file may be provided from memory 602 to processor 606. Processor 606 may be configured to edit the video clips based on the editing file. In particular, processor 606 may be used to synthesize selected clips into a final video. The video clips may be synthesized chronologically, or may be organized based on additional instructions provided in the editing file. In one example, the image data may be edited to provide a plurality of video clips that are arranged in an order that corresponds to instructions within a video edit request provided to image capture device 604 from a user terminal. For example, the video edit request may specify the way that each video clip is arranged within a pre-configured template. For example, a music template may be provided that organizes video segments based on the rhythm of the music. Using a music template, the music may be organized into several segments such that a user may fill in time slots of the musical segments with different video clips. Based on these instructions, processor 606 may place each of the selected video clips into the place assigned based on the instructions in the editing file.

In another example, the selected video clips may be further edited by processor 606 after the video clips have been retrieved from memory 602. For example, instructions in video edit request may specify that one or more of the selected video clips be edited to include a filter. Alternatively, the instructions in video edit request may provide that certain video clips be provided at a higher playback speed than other video clips. These characteristic differences in the presentation of certain video clips may be encoded by editing instructions and executed using processor 606.

In this way, the plurality of video clips may be organized as a second set of image data. Once the image data has been edited into the second set of image data, the image data may be provided from processor 606 to a user terminal 610 via image transmission module 608. The second set of image data may include multiple video clips, or may be formed as a single video file that may encompass the multiple video clips.

Figure 9:
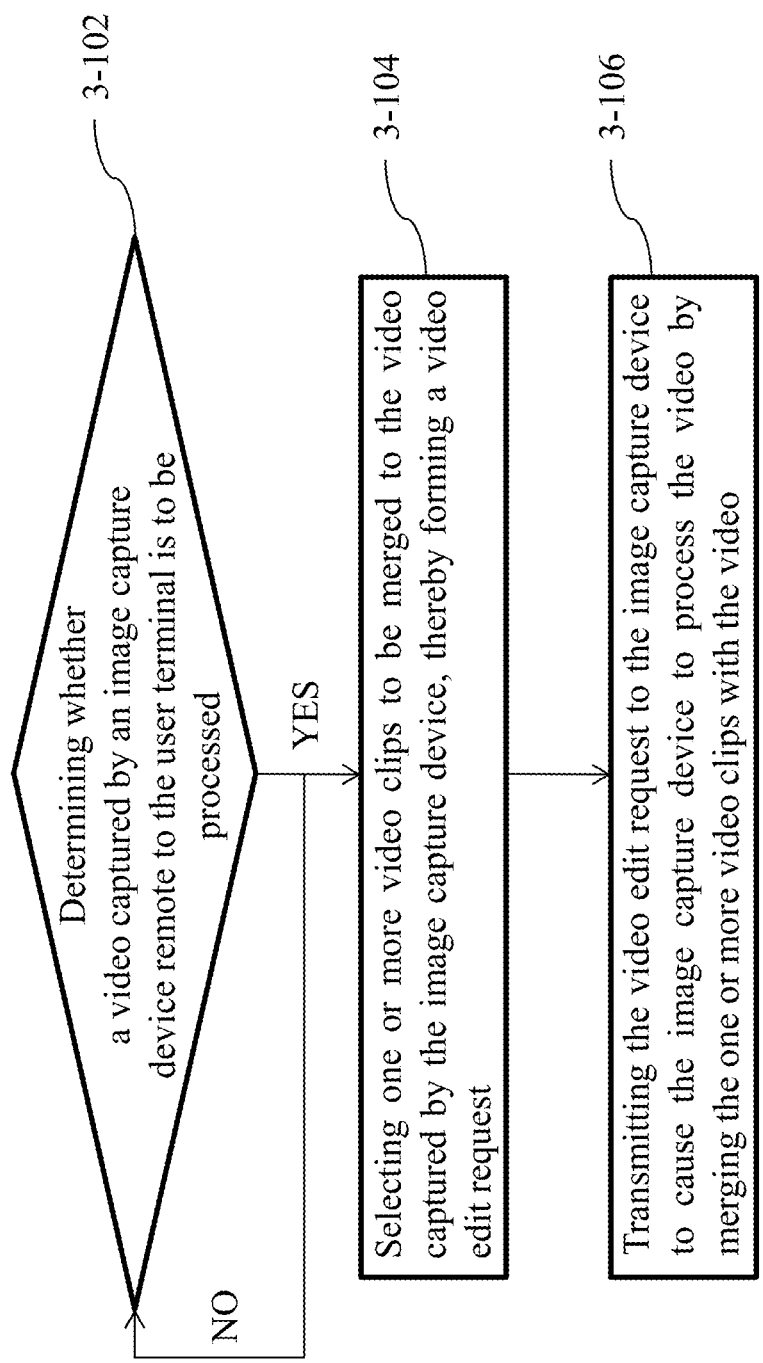
FIG. 9 is a flow chart illustrating a method of processing a video at a user terminal, in accordance with an embodiment of the invention.

FIG. 9 is a flow chart illustrating a method of processing a video at a user terminal in accordance with an embodiment of the invention.

In step 3-102, a determination may be made at the user terminal on whether a video captured by an image capture device is to be processed.

The image capture device may be a device having video capture capability. In some embodiments, the image capture device may be on or part of a movable object such as an aerial vehicle, a ground vehicle or a mobile phone held by a user. Alternatively, the image capture device may be a stationery object such as a camera installed on a building. The user terminal may be a device which can communicate with the remote image capture device via a wireless link or a cable. In some embodiments, the user terminal may be a smartphone. The user terminal may have one or more applications installed thereon. Alternatively, no separate applications are provided on the use terminal. In some instances, the user terminal may have a video editing application installed thereon. The user terminal may be a remote controller. In some embodiments, physical buttons may be provided on the user terminal, by which the user may input signals indicative of operation commands. Alternatively, soft buttons or virtual buttons may be displayed on software application running on the user terminal. The user may input signal indicative of operation commands by pressing or touching the soft buttons. In some embodiments, the user terminal may include a display. The user terminal may include a touchscreen.

In some embodiments, the step 3-102 may comprise receiving an input from a user at the user terminal indicative of a video processing request. The user may input his/her decision on whether the video captured by an image capture device such as a UAV is to be processed by pressing one or more buttons provided on the user terminal. In some instances, the user may operate a wireless remote controller and input his/her decision by pressing one or more physical buttons. Alternatively, the user may operate a smart phone having no physical button, and input his/her decision by pressing a soft button displayed by a software application running on the smart phone. For instance, a user may provide an input to a user terminal to perform an edit function on a video. The input to perform the edit function may be an indication that the video captured by the image capture device is to be processed. A determination may be made that a video captured by an image capture device is to be processed when the user provides an input indicating an editing function to be performed on the video. In alternate embodiments, one or more processors, without requiring human intervention, may provide an indication of an editing function to be performed on a video.

In some embodiments, the processing to be performed on the captured video may include merging one or more video clips to the captured video. The one or more video clips may include a prologue and/or an epilogue. As used here, a prologue may be a video clip to be added at the beginning of a video, and an epilogue may be a video clip to be added at the end of a video. Optionally, the processing to be performed on the captured video may include adding one or more transition effects to the captured video. As used here, a transition effect may be a video clip to be added in a middle of a video. Optionally, the processing to be performed on the captured video may include applying one or more filter effect to the captured video. Processing of the video may include shortening a video clip, deleting a portion of a video clip, modifying or adding audio data, or performing any of the other editing functions described elsewhere herein. Merging of video clips are described herein as an example, but any other processing functions may occur.

If the determination in step 3-102 is YES, then in step 3-104, one or more video clips to be merged to the video captured by the image capture device may be selected at the user terminal, thereby forming a video edit request. If the determination in step 3-102 is NO, then the processing remains in step 3-102.

In some embodiments, the one or more video clips may include at least one of a prologue, an epilogue and a transition effect. The one or more video clips may be selected from a memory device installed on the image capture device. In some instances, the memory device may be a non-transitory computer readable medium that may include one or more memory units (e.g., removable media or external storage such as a Secure Digital (SD) card, or a random access memory (RAM), or a read only memory (ROM) or a flash memory) onboard a UAV and/or image capture device. Alternatively, the one or more video clips may be selected from a memory device installed on the user terminal. Optionally, the one or more video clips may be selected from an online video library, such as a video storage in the cloud. In either cases, the video clips stored in the memory device installed on the image capture device, or the memory device installed on the user terminal, or the online video library may be prepared before the step 3-102.

In some embodiments, the one or more video clips may be selected by playing one or more video clips, which may be stored in a memory device installed on the image capture device or on the user terminal or in an online library. For example, the user may respectively play one or more video clips that are stored in a SD card onboard a UAV and select a video clip having riverside scene as the prologue. Alternatively, the one or more video clips may be selected by viewing descriptions of one or more video clips. In some instances, the description may be information describing content, a category, a location, a duration, and/or a rating of a video clip. For example, the user may select a video clip that is a scene of riverside as the prologue, by checking a corresponding description under a "riverside" category.

In some embodiments, the step 3-104 may comprise receiving an input from the user at the user terminal indicative of a selection of one or more video clips. In some instances, the user input may be made by pressing a physical button of the user terminal such as a wireless remote controller. Optionally, the user input may be made by pressing a soft button that is displayed on the user terminal such as a smart phone. For instances, the user may operate a joystick or press one or more buttons to select a video clip having a "riverside scene" from an online video library and determine to use this video clip as prologue.

In some embodiments, the step 3-104 may comprise receiving a template. In some instances, the template may be a system default template. Alternatively, the template may be a template selected by the user from a plurality of preset templates. The plurality of preset templates may be stored in a memory device installed on the image capture device such as a UAV. Optionally, the plurality of preset templates may be stored in a memory device installed on the user terminal such as a smart phone. Optionally, the plurality of preset templates may be stored in an online template library, such as a template storage in the cloud.

In some instances, the template may comprise at least one of a prologue, an epilogue and a transition effect. Optionally, the template may further comprise at least one of an audio and a subtitle. For instances, a user selected template may comprises one prologue, two transition effects and an audio. In this case, the video captured by the UAV may be processed by accommodating the captured video in the template, such that the processed video contains prologue, video, transition effect and background music.

In some instances, the user may edit the system default template or the online templates, such as modifying at least one of a prologue, an epilogue, a transition effect, an audio and a subtitle of the template. Optionally, the user may create new template by determining at least one of a prologue, an epilogue, a transition effect, an audio and a subtitle. The user created template may be stored as the system default template or as the online template.

In some embodiment, the step 3-104 may comprise determining the one or more video clips as at least one of a prologue, an epilogue and a transition effect. A prologue may indicate the video clip is to be added to a front of the video. An epilogue may indicate the video clip is to be added to an end of the video. A transition effect may indicate that the video clip is to be inserted into a video. Upon completing the step 3-102, at least one of a prologue, an epilogue and a transition effect may be determined.

Optionally, the step 3-104 may comprise selecting a filter effect to be applied to the one or more video clips. For instances, the filter effect may include at least one or more effects selected from basis tuning filters, color filters, stylish filters, geometric filters, and the like. Examples of basic tuning filters include brightness, exposure, contrast modification, white balance, highlighting, shadow, contrast, hue, sharpness, saturation, noise reduction, and gamma. Examples of color filters include color inversion, thermal representation using color, grayscale, color modification, old film coloring, sepia, and color LUT. Examples of stylish filters include cartoons, sketching, blurring, stretching, pixelation, posterization, single color and grayscale, golden, suiboku, suicai, and oil painting. Examples of geometric filters include bulge, swirl, explosion, sphere, and lens vignetting. The filter effects may be selected by the user from a list of filter effects, by pressing a physical button on the user terminal, or by pressing a soft or virtual button as displayed on the user terminal.

In step 3-104, a video edit request may be generated at the user terminal after selecting the one or more video clips to be merged to the video captured by the image capture device. The edit request may be a small size file containing at least information indicative of the prologue, the one or more transition effects and the epilogue to be merged, as selected by the user in step 3-104.

In step 3-106, the video edit request as formed in step 3-104 may be transmitted to the image capture device to cause the image capture device to process the video by merging the one or more video clips with the video.

The video edit request may be transmitted to the image capture device from the user terminal. Since a size of the video edit request is small, a transmission of the video edit request may occupy less bandwidth. For instances, a transmission of the video edit request may utilize one or more of cable, local area networks (LAN), wide area networks (WAN), infrared, radio, WiFi, point-to-point (P2P) networks, telecommunication networks (a 2G link, a 3G link, or a LTE link), cloud communication, and the like. In some instances, the transmission of the video edit request may be encoded and/or encrypted for safety reasons.

The image capture device such as a UAV may receive and analyze the video edit request by extracting the recorded information, and perform corresponding video processing on the captured video. In some instances, the processing performed by the image capture device may include at least merging at least a prologue, an epilogue and a transition effect, as described in the video edit request, to the captured video. For example, the video edit request may record a prologue and an epilogue to be merged to the captured video by describing an ID and a directory of the prologue and epilogue. The image capture device may merge the prologue and the epilogue by adding the prologue and epilogue to a beginning and an end of the captured video, respectively. For another example, the video edit request may record a transition effect to be merged to the captured video by describing an ID of the transition effect, a directory of the transition effect, and a relative start time of the transition effect. The image capture device may merge the transition effect by inserting the transition effect to a middle of the captured video at the relative start time.

In some embodiments, the method of processing a video at a user terminal in accordance with an embodiment of the invention as shown in FIG. 9 may further receiving the merged video from the image capture device. The merged video may be a high definition video file to which the one or more video clips are merged as a prologue, a transition effect and an epilogue. In some instances, the definition of the merged video may be identical to a definition in capturing the video by the image capture device, such as 4K. Alternatively, the definition of the merged video may be lower than a definition in capturing the video by the image capture device. Optionally, the definition of the merged video may be higher than a definition in capturing the video by the image capture device, by means of interpolation. In some instances, a format of the merged video may be MP4 (Moving Picture Experts Group Audio Layer IV), AVI (Audio Video Interleave), MOV (Quicktime Movie Format), or the like.

FIG. 10 is an example of content in the video edit request as formed at a user terminal in accordance with an embodiment of the invention. The content in the video edit request as shown in FIG. 10 is for illustrative purposes only, and may vary according to various protocols. As described hereinabove, the edit request may be a file describing at least the prologue, the one or more transition effects and the epilogue as selected by the user.

In the example shown in FIG. 10, the video edit request may at least comprise the description of a prologue, one or more transition effect and/or an epilogue to be merged to the captured video. In some embodiments, the description may include at least the information sufficient for identifying the video clips for prologue, transition effect and/or epilogue and the information for defining an output parameter of the video clips. For instances, the video edit request may at least comprise a video edit request file title, a video ID, a video directory for identifying a storage location, a filter effect to be applied, output size and frame rate of the video clips and bit rate of the video clips.

The content of the video edit request may vary according to different protocols. In some instances, the content of the video edit request may also vary according to a demand of the user. For instance, if more than one transition effects are to be merged in the captured video, more segments for transition effect may be recorded in the video edit request.

Figure 11:
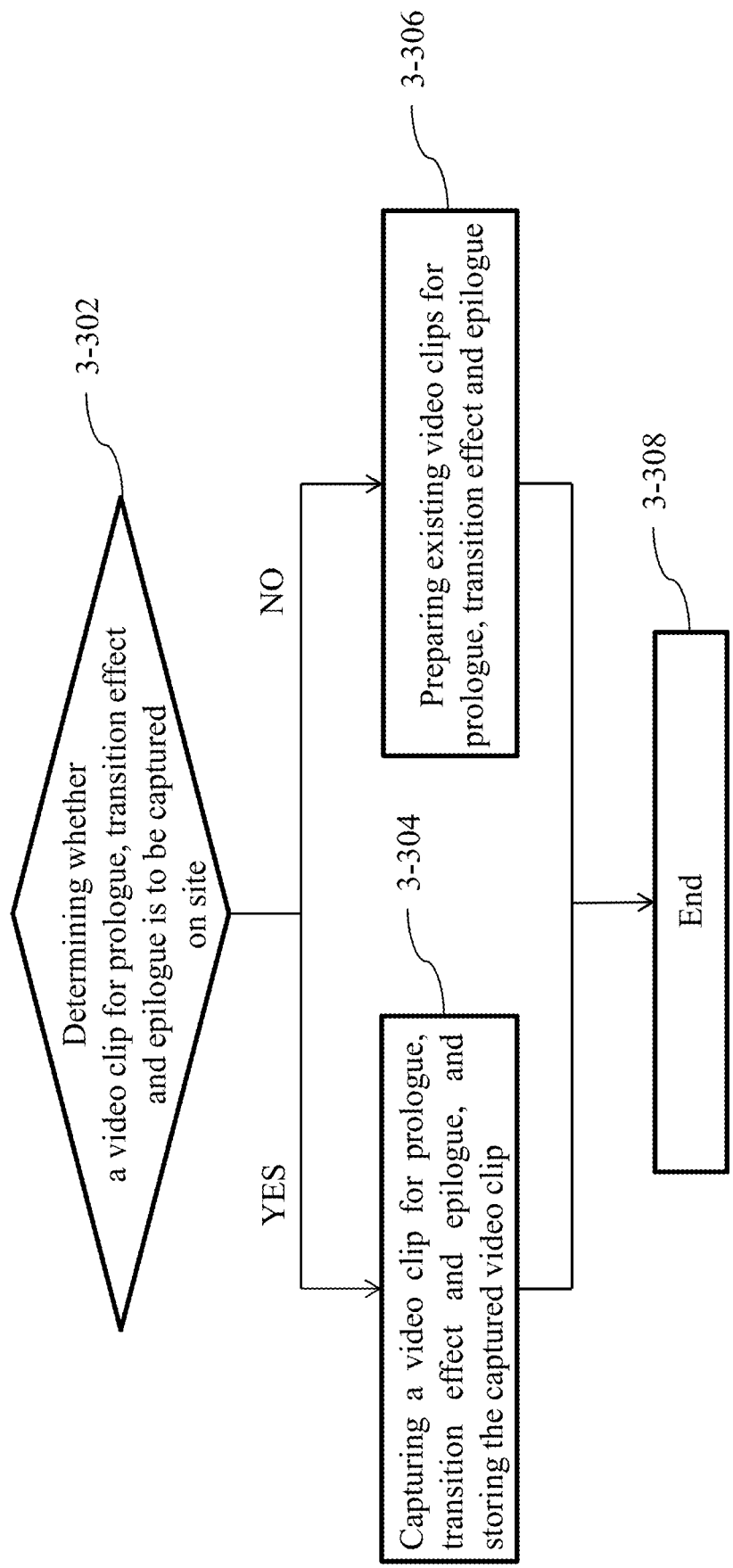
FIG. 11 is a flow chart illustrating a method of preparing video clips for a prologue, a transition effect and an epilogue at a user terminal, in accordance with an embodiment of the invention.

FIG. 11 is a flow chart illustrating a method of preparing video clips for a prologue, a transition effect and/or an epilogue at a user terminal in accordance with an embodiment of the invention. The method of preparing video clips as shown in FIG. 11 may be performed at the user terminal to prepare video clips to be used as a prologue, a transition effect and/or an epilogue, and may be optionally performed before the method of processing a video at a user terminal as shown in FIG. 9, as discussed herein above.

In step 3-302, a determination may be made on whether a video clip for prologue, transition effect and/or epilogue is to be captured on site. In some embodiments, the user may want to capture a video clip on current scene and store it such that this video clip may be later used as a prologue, a transition effect and/or an epilogue. The determination may be made by the user by pressing a physical button on the user terminal such as a remote controller or a smart phone. Alternatively, the determination may be made by pressing a soft or virtual button as displayed on the user terminal.

If the determination in step 3-302 is YES, then in step 3-304, a video clip on current scene may be captured by the image capture device such as a camera, a UAV carrying a camera unit, or a mobile phone having a camera module.

The current scene may be a scene of the environment. In some instances, the user may control a direction, a zoom and/or an effect of a camera unit of the image capture device by sending instructions through the user device. The captured video clip may be stored for future use. In some instances, the captured video clip may be stored in a memory device installed on the image capture device. Alternatively, the captured video clip may be transmitted and stored in a memory device installed on the user terminal through a wireless link or a cable. Optionally, the captured video clip may be uploaded to an online video library, such as a video storage in the cloud. In some instances, when the captured video clip is transmitted to the user terminal, the captured video clip may be merged with a video on the user terminal. For instance, as the video clip is captured, the video clip may be merged with an identified video. Alternatively, the video clip may be accessed from a memory and merged at a future time.

In some instances, the captured video clip may be transmitted, uploaded and/or stored in a format of YUV, Y'UV, YCbCr, YPbPr, H264, H265, MP4 (Moving Picture Experts Group Audio Layer IV), AVI (Audio Video Interleave), MOV (Quicktime Movie Format), or the like.

If the determination in step 3-302 is NO, then in step 3-306, existing video clips for prologue, transition effect and/or epilogue may be prepared. In some embodiments, the user may browse a plurality of existing video clips that are locally stored, select an existing video clip, edit the existing video clip as a video clip appropriate for a prologue, a transition effect or an epilogue. For instances, the user may select a video clip that is locally stored in the user terminal, and edit the video clip to a clip have a duration of 5 seconds by dragging a time window. Optionally, the prepared one or more video clip may be stored in a local directory for future use as a prologue, a transition effect or an epilogue. Alternatively, the prepared one or more video clip may be uploaded and stored in a memory device installed on the image capture device, or in an online video library, such as a video storage in the cloud.

If the step 3-304 or step 3-306 is finished, the method of preparing video clips for a prologue, a transition effect and an epilogue may end in step 3-308. Subsequently, a merging process may occur.

Figure 12:
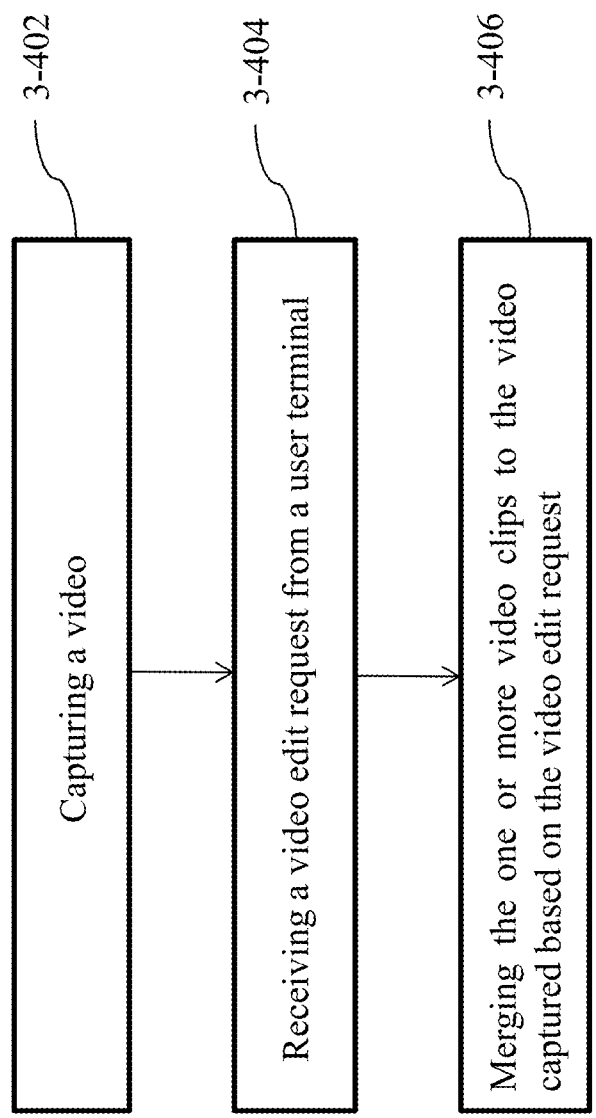
FIG. 12 is a flow chart illustrating a method of merging a prologue, a transition effect and an epilogue at an image capture device, in accordance with an embodiment of the invention.

FIG. 12 is a flow chart illustrating a method of merging a prologue, a transition effect and/or an epilogue at an image capture device in accordance with an embodiment of the invention. The method of merging a prologue, a transition effect and/or an epilogue may be performed at the image capture device after the method of processing a video at a user terminal as discussed hereinabove with reference to FIG. 9.

In step 3-402, the image capture device may capture a video. The image capture device may include a camera unit. In some instances, the camera unit may include an optical sensor and one or more lens for directing light into the optical sensor. In some embodiments, the captured video may be stored in a memory device such as a SD card onboard the image capture device. In some instances, the captured video may be stored in a memory device in a FIFO (First In, First Out) manner, such that only a predetermined length of video may be stored.

In step 3-404, a video edit request may be received from a user terminal. The video edit request may be formed from a selection of one or more video clips to be merged to the captured video when a determination is made at the user terminal that the captured video is to be processed. The video edit request may be formed at the user terminal, and a processing of forming the video edit request is described in step 3-104 of FIG. 9, as discussed hereinabove. The video edit request may contain at least information indicative of the prologue, the one or more transition effects and the epilogue that is to be merged to the captured video. An example of content in the video edit request is described in FIG. 10, as discussed hereinabove. The video edit request may occur any time after the video has been captured. This may include while the video is being live-streamed, within seconds after the video is captured, within hours after the video is captured, within days after the video is captured, within months after the video is captured, or any other time after the video is captured. A user may view the captured video and make a determination to edit the video, at any time. The user may make the determination to edit the video while a UAV supporting the image capture device used to capture the video is in flight. A user may be capable of editing a video while a UAV is in flight (e.g., the same flight during which the video was captured, or a later flight).

In step 3-406, the one or more video clips, which are identified from the received video edit request, may be merged to the video captured by the image capture device. In some embodiments, the process of the step 3-406 may include at least adding a prologue and/or an epilogue to a beginning or an end of the captured video and/or inserting a transition effect to a middle of the captured video, based on the video edit request. The video clips merged with the video captured by the image capture device may also be captured by the same image capture device. Alternatively, the video clips may be captured using a different image capture device. In other instances, the video clips may be generated using a device (e.g., computer-generated).

In some embodiments, a sequence of performing the step 3-402 and step 3-404 may be alternated. For example, the video edit request may be received at the image capture device before a video is captured.

In some embodiments, the method of merging a prologue, a transition effect and/or an epilogue at an image capture device as shown in FIG. 12 may comprise storing the merged video in a memory device. In some instances, the merged video may be stored in a memory device installed on the image capture device, such as a SD card, or stored onboard a UAV. Alternatively, the merged video may be stored a memory device installed on the user terminal. Optionally, the merged video may be stored an online video library in the cloud. In some instance, the merged video may be stored in more than one memory devices as discussed hereinabove.

In some embodiments, the method of merging a prologue, a transition effect and/or an epilogue at an image capture device as shown in FIG. 12 may comprise transmitting the merged video to the user terminal. In some instances, the merged video may be transmitted in a high definition, such as 4K, or any of the other resolutions described elsewhere herein. In some embodiments, the merged video may be transmitted in definition identical to a definition in capturing the video by the image capture device. Alternatively, the merged video may be transmitted at a definition lower than a definition in capturing the video by the image capture device. Optionally, the merged video may be transmitted in definition higher than a definition in capturing the video by the image capture device, by means of interpolation. In some embodiments, a user may view, at a user terminal, the video captured by the image capture device and the one or more video clips to be merged with the video at a definition that may be equal to or lower than the definition at which the video and/or video clips are originally captured or created.

After the user edits the videos, a video edit request may be sent to an image capture device or other external device or cloud storage. In response to the video edit request, a merged video, in accordance with the user edits made, may be provided to the user terminal. The merged video may be at a resolution less than or equal to the resolution at which the video and/or video clips are originally captured or created. The merged video may be at a resolution greater than or equal to resolution at which the videos were edited on the user terminal. In some instances, the merged video may be transmitted in a format of MP4 (Moving Picture Experts Group Audio Layer IV), AVI (Audio Video Interleave), MOV (Quicktime Movie Format), or the like.

Figure 13:
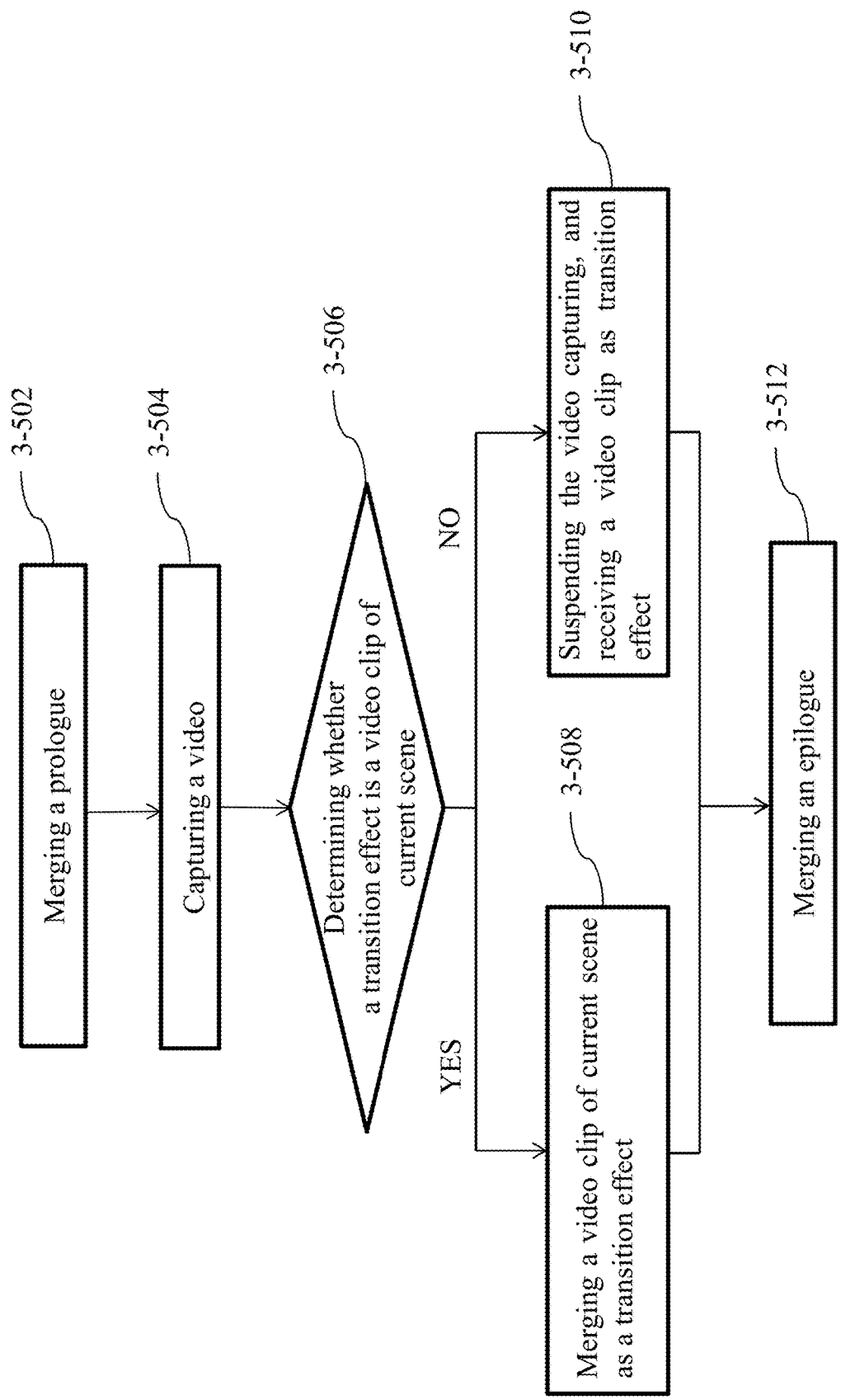
FIG. 13 is a flow chart illustrating a method of merging a prologue, a transition effect and an epilogue at an image capture device, in accordance with an embodiment of the invention.

FIG. 13 is a flow chart illustrating a method of merging a prologue, a transition effect and/or an epilogue at an image capture device in accordance with an embodiment of the invention. This method of FIG. 13 may comprise a plurality of processing as performed in step 3-406 of FIG. 12, as discussed hereinabove.

In step 3-502, a prologue may be merged. In some embodiments, a video clip that is identified based on the video edit request may be added to a beginning of the video to be captured by the image capture device. For instance, a video clip that is a scene of "river side" may be identified based on the video edit request, fetched from an online video library, and used as the prologue to the video to be captured by the image capture device such as a UAV.

In step 3-504, a video may be captured by the image capture device, such as a UAV carrying a camera unit. In some embodiments, the captured video may be stored in a memory device such as a SD card onboard the image capture device.

In step 3-506, a determination may be made on whether a transition effect is a video clip of the current scene. A transition effect may be identified by analyzing the video edit request received from the user terminal. For instance, the video edit request may contain information on a relative start time of a transition effect. In this case, at the relative start time, e.g., 15 seconds from the starting of the captured video, a video clip for transition effect may be inserted as a transition effect.

In some embodiments, the transition effect may be a video clip to be fetched from a memory device installed on the image capture device such as a SD card onboard a UAV. Alternatively, the transition effect may be a video clip to be fetched from a memory device installed on the user terminal. Optionally, the transition effect may be a video clip to be downloaded from an online video library in the cloud.

In other embodiments, the transition effect may be a video clip on current scene. For instance, the user may want to apply certain filter effect to the current scene and use this effected video clip as transition effect.

If the determination in step 3-506 is YES, that is, a video clip on current scene may be used as transition effect, then in step 3-508, a video clip of current scene may be captured and used as the transition effect. In some embodiments, the step 3-506 may include applying one or more filter effects to the video clip of current scene. In some instances, the video edit request received from the user terminal may record the information for instructing the image capture device to use the video clip of current scene as the transition effect, and the information on filter effect to be applied on the video clip of current scene. Alternatively, the user may send an instant instruction from the user terminal, instructing the image capture device to use the video clip of current scene as the transition effect, as well as the information on filter effect to be applied on the video clip of current scene.

If the determination in step 3-506 is NO, that is, an external video clip may be used as transition effect, then in step 3-510, a video clip of current scene may be fetched from a memory device based on the video edit request. In some instances, the video edit request received from the user terminal may record the information on a location of the desired video clip for the transition effect, and/or the information on filter effect to be applied on the video clip. In this case, the video capturing of the image capture device may be suspended, and the external video clip may be received and merged as the transition effect. The video capturing of the image capture device may resume after a completion of receiving and merging the external video clip as the transition effect.

In step 3-512, an epilogue may be merged. In some embodiments, a video clip that is identified based on the video edit request may be added to an end of the video being captured by the image capture device. For instance, a video clip that is a scene of "forest" may be identified based on the video edit request, fetched from an SD card onboard the image capture device, and used as the epilogue to the video being captured by the image capture device such as a UAV. To this end, a merged video may be produced.

In some embodiments, a sequence of performing the steps in the method as discussed hereinabove in FIG. 13 may be changed. For example, the step of merging a prologue, merging a transition effect, and/or merging an epilogue may be performed after a video is completely captured at the image capture device. In this case, the video clip of current scene as captured in step 3-508 may be buffered or stored until a video is completely captured by the image capture device. In some embodiments, a user may choose to perform one, two, or all three of a prologue merging, transition effect, and/or epilogue merging. In some instances, a single video clip, or multiple video clips may be merged with a video. Thus, one or more steps of FIG. 13 may not need to occur, or may occur in different orders. In some instances, the video clips to be merged with the video may come from the same source (e.g., from the same memory or data storage unit), or may be provided from different sources (e.g., some video clips may come from an image capture device, some video clips may come from a cloud storage device, some video clips may come from a separate device, some video clips may come from the user terminal). In some embodiments, the user terminal may receive video clips and/or the video from a single source or from multiple sources. Similarly, the image capture device and/or movable object may create the merged video using video clips and/or video from a single source (e.g., memory of the image capture device and/or movable object) or multiple sources.

In some embodiments, if the user wishes to merge the same prologue, transition effect and/or epilogue, the configuration on prologue, transition effect and/or epilogue may be saved, for example, as a template. The configuration on prologue, transition effect and epilogue may be saved by pressing a pressing a physical button or a soft button on the user terminal such as a remote controller or a smart phone. Alternatively, the configuration may be saved by pressing a pressing a physical button or a soft button on the image capture device such as a UAV carrying a camera unit.

Figure 14:
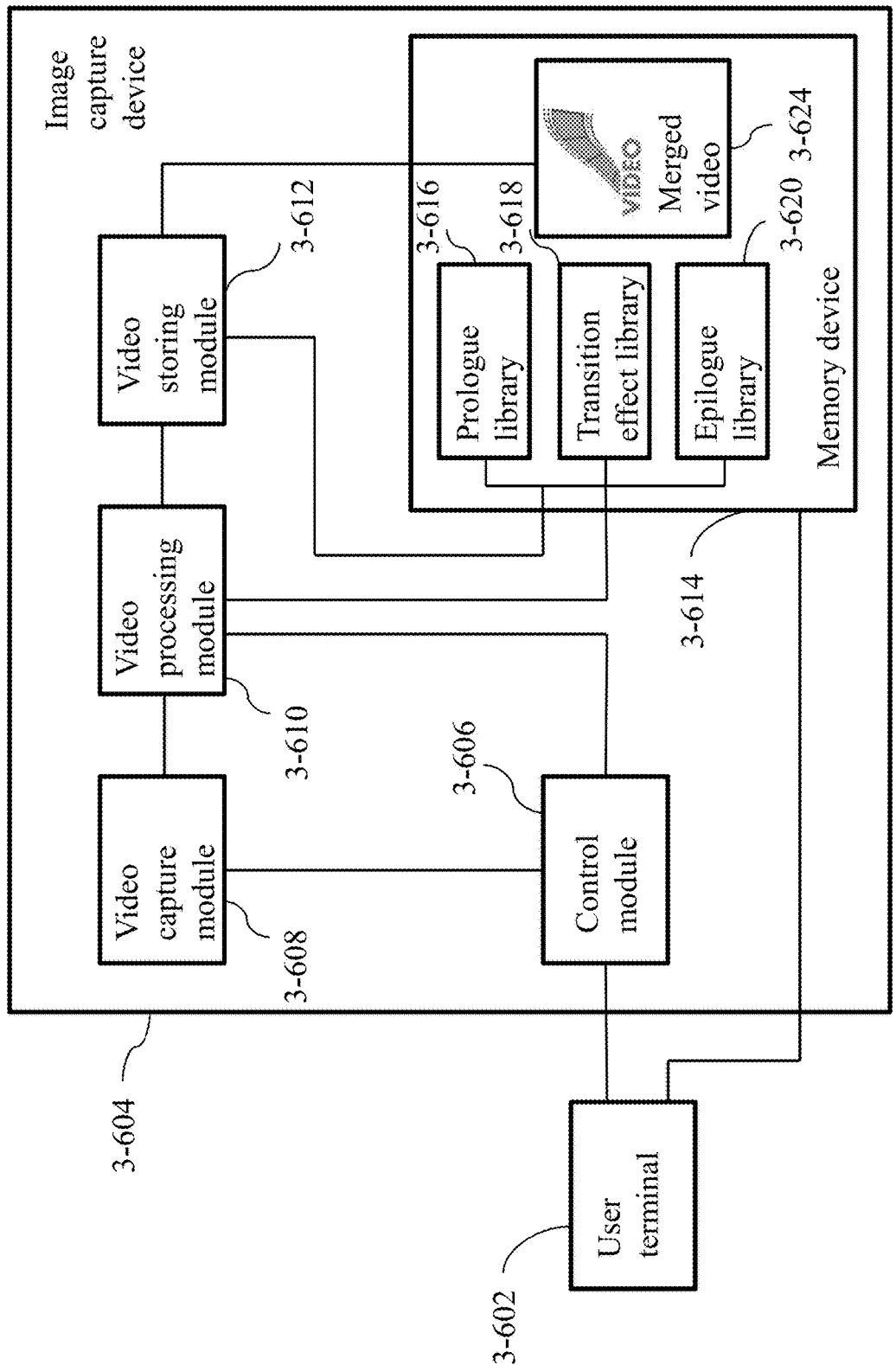
FIG. 14 is a schematic illustration by way of block diagram of a system for processing a video, in accordance with an embodiment of the invention.

FIG. 14 is a schematic illustration by way of block diagram of a system for processing a video, in accordance with embodiments of the present invention.

The system for processing a video in accordance with embodiments of the present invention as shown in FIG. 14 may comprise a user terminal 3-602 and an image capture device 3-604. Any descriptions herein of components of the image capture device may include components on-board the image capture device itself (e.g., camera). Alternatively, one or more components may be distributed over a movable object (e.g., UAV) supporting the image capture device.

In some embodiments, the image capture device 3-604 may comprise a control module 3-606, a video capture module 3-608, a video processing module 3-610 and a video storing module 3-612 which are serially connected. The control module 3-606 may be directly connected to the video processing module 3-610. The image capture device 3-604 may also comprise a memory device 3-614 which is connected to the video processing module 3-610 and the video storing module 3-612. In some embodiments, the memory device 3-614 may comprise a prologue library 3-616, a transition effect library 3-618 and an epilogue library 3-620. The memory device may receive video clips for the libraries from a video storing module. For instance, one or more of the video clips may be captured using the video capture module. In other instances, the video clips may be provided to the memory device from an external source. In some instances, the memory device will download the data and/or video clips for libraries. The downloads may occur periodically or in response to an event. In some examples, the downloads may occur any time the image capture device is turned on. In other instances, the downloads may occur at regular or irregular intervals of time. Optionally, the downloads may occur in response to a user request to update the memory. Thus, the libraries may be stored in a memory on-board the image capture device. Alternatively, the libraries may be stored off-board the image capture device and may be accessed by the image capture device. For instance, the libraries may be stored on the cloud and may be accessed by the image capture device upon request. The image capture device may buffer or temporarily store the selected video clips or portions of the libraries.

In some embodiments, the user terminal 3-602 may be a remote controller or a smartphone. In some instances, at least one physical button may be provided on the user terminal. Alternatively, at least one screen, such as a LCD (Liquid Crystal Display) screen, may be provided on the user terminal. A display of the user terminal may be a touchscreen. The user may input an instruction by pressing the physical button or soft button. The user may input instructions via a touchscreen (e.g., touching a soft key, tapping, swiping, pinching, expanding, twisting/turning clockwise or counter clockwise). In some instances, the user terminal 3-602 may comprise at least a communication unit that permits communication with the image capture device, and one or more processors that individually or collectively to perform at least the operation as discussed hereinabove with reference to FIG. 9 and FIG. 11.

In some embodiments, the image capture device 3-604 may be a camera, a UAV carrying a camera unit, or a mobile phone having a camera module. In some instances, the image capture device may comprising at least an image sensor configured to capture a video, a communication unit (not shown in FIG. 14) that permits communication with the user terminal, and one or more processors that individually or collectively to perform at least the operation as discussed hereinabove with reference to FIG. 12 and FIG. 13.

In some embodiments, the user terminal 3-602 may browse a plurality of existing video clips that are locally stored in, for example the memory device 3-614, and select an existing video clip as a video clip appropriate for a prologue, a transition effect or an epilogue. The user selected video clip may be accordingly stored in the prologue library 3-616, the transition effect library 3-618 or the epilogue library 3-620. Optionally, the user may edit an existing video clip by sending an instruction to the video processing module 3-610 through the control module 3-606. Optionally, the user may edit a captured video clip by sending an instruction to the video processing module 3-610 through the control module 3-606. The edited video clips may then be accordingly stored in the prologue library 3-616, the transition effect library 3-618 or the epilogue library 3-620. Alternatively, the user may instruct the video capture module 3-608 to capture a video clip of current scene, through the control module 3-606, and store the captured video clip to be used as a prologue, a transition effect or an epilogue in one of the prologue library 3-616, the transition effect library 3-618 and the epilogue library 3-620.

In some embodiments, the control module 3-606 may receive instructions from the user terminal 3-602, and send the instructions to the video capture module 3-608 and the video processing module 3-610.

In some embodiments, the video capture module 3-608 may capture a video that is to be processed, and feed the captured video to the video processing module 3-610. In some instances, the video capture module 3-608 may also capture a video clip that is to be used as a prologue, a transition effect or an epilogue, according to an instruction from the user terminal 3-602.

In some embodiments, the video processing module 3-610 may merge at least one of a prologue, a transition effect and an epilogue to a video captured by the video capture module 3-608.

Optionally, the video processing module 3-610 may edit an existing video clip according to instructions from the user terminal 3-602, such that the edited video clip may be used as a prologue, a transition effect or an epilogue. Optionally, the video processing module 3-610 may edit video clips captured by the video capture module 3-608 such that the edited video clip may be used as a prologue, a transition effect or an epilogue.

In some embodiments, the video storing module 3-612 may store the merged video, which is processed by the video processing module 3-610, to the memory device 3-614. Optionally, the video storing module 3-612 may store the edited video clips, which are processed by the video processing module 3-610, to one of the prologue library 3-616, the transition effect library 3-618 and the epilogue library 3-620.

In some embodiments, the memory device 3-614 may include at least the prologue library 3-616, the transition effect library 3-618 and the epilogue library 3-620 which are used to store the video clips suitable for a prologue, a transition effect or an epilogue. Optionally, the memory device 3-614 may include a memory for storing the merged video.

Figure 15:
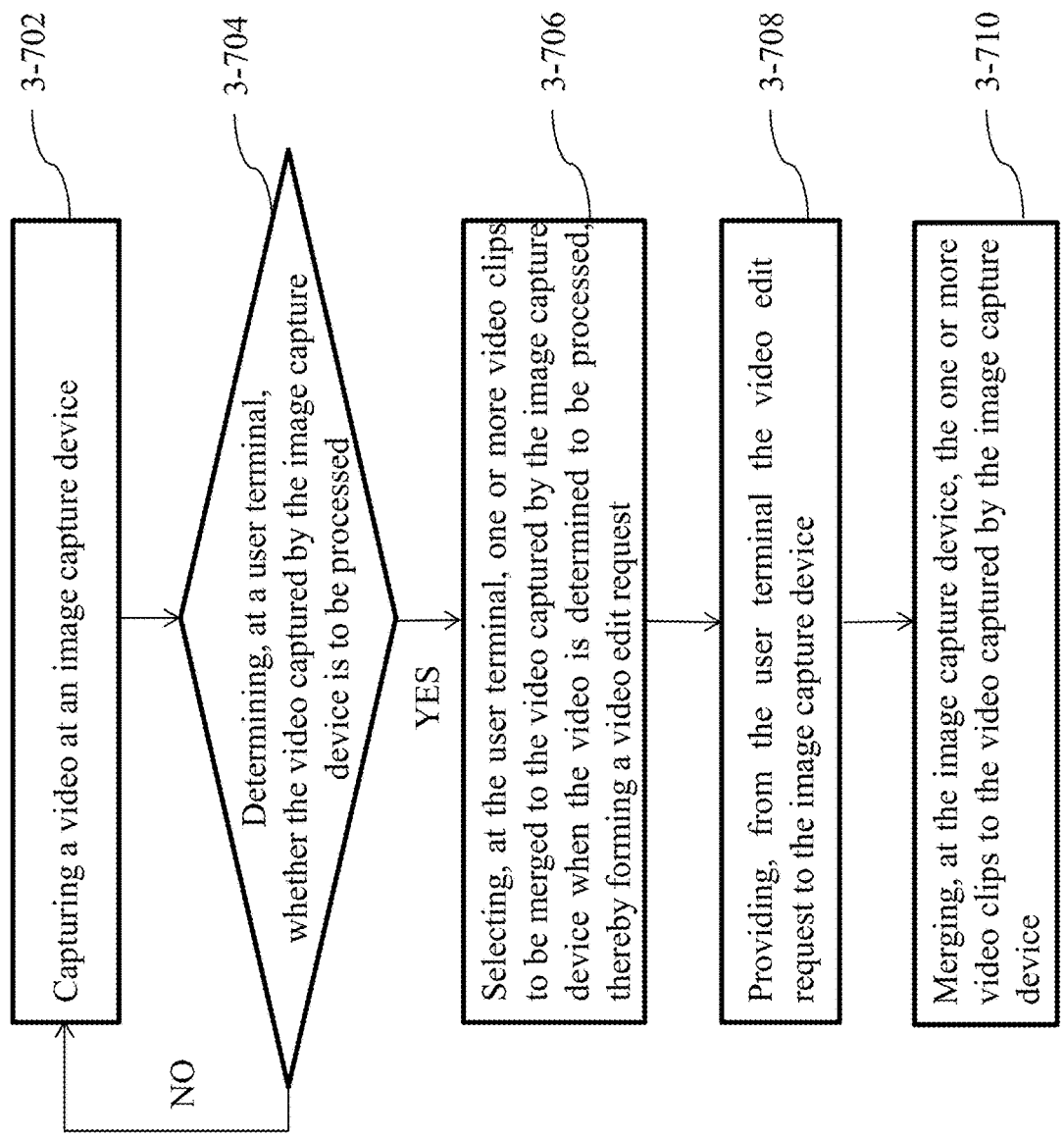
FIG. 15 is a flow chart illustrating a method of processing a video, in accordance with an embodiment of the invention.

FIG. 15 is a flow chart illustrating a method of processing a video, in accordance with an embodiment of the invention.

In step 3-702, a video may be captured at the image capture device. The operations in step 3-702 may be identical to those performed in step 3-402 as discussed hereinabove with reference to FIG. 12. Similarly, the order of the steps may be modified. For instance, step 3-702 may occur after step 3-704 or 3-706.

In step 3-704, a determination may be made at the user terminal on whether the video captured by the image capture device is to be processed. The user may provide an input to a user terminal that indicates the video is to be processed. For example, the user may input signal indicative the determination by pressing a physical button or a soft button provided on the user terminal. A video edit request or any type of indication of video editing may be an indication that the video is to be processed. The operations in step 3-704 may optionally be identical to those performed in step 3-102 as discussed hereinabove with reference to FIG. 9.

If the determination in step 3-704 is YES, that is, the captured video is determined to be processed, then in step 3-706, one or more video clips to be merged to the video captured by the image capture device may be selected at the user terminal, thereby forming a video edit request. The operations in step 3-706 may be identical to those performed in step 3-104 as discussed hereinabove with reference to FIG. 9. Otherwise, if the determination in step 3-704 is NO, that is, the captured video is determined not to be processed, then the processing flow may return back to step 3-702.

In step 3-708, the video edit request may be provided from the user terminal to the image capture device. The operations in step 3-708 may be identical to those performed in step 3-106 as discussed hereinabove with reference to FIG. 9 and those performed in step 3-404 as discussed hereinabove with reference to FIG. 12.

In step 3-710, the one or more video clips may be merged to the captured video at the image capture device. The operations in step 3-710 may be identical to those performed in step 3-406 as discussed hereinabove with reference to FIG. 12.

In some embodiments, the method of processing a video as shown in FIG. 15 may further comprise transmitting the merged video to the user terminal at a definition which may be equal to, lower than, or higher than a definition in capturing the video by the image capture device.

Optionally, at a user terminal, the user may view the video and/or video clips to be merged. A video edit request may be formed at the user terminal indicative of how the video and/or video clips are to be merged. When viewing the video and/or video clips, the user may view them at a resolution that may be less than or equal to a resolution at which the video and/or video clips are captured and/or created. The video edit request may be provided to an image capture device. The image capture device, in response to the video edit request, may return a merged video. The merged video may be at a resolution that may be greater than, equal to, or less than the resolution at which the video and/or video clips were viewed at the user terminal. The merged video may be at a resolution that may be greater than, equal to, or less than the resolution at which the video and/or video clips were captured and/or created.

Figure 16:
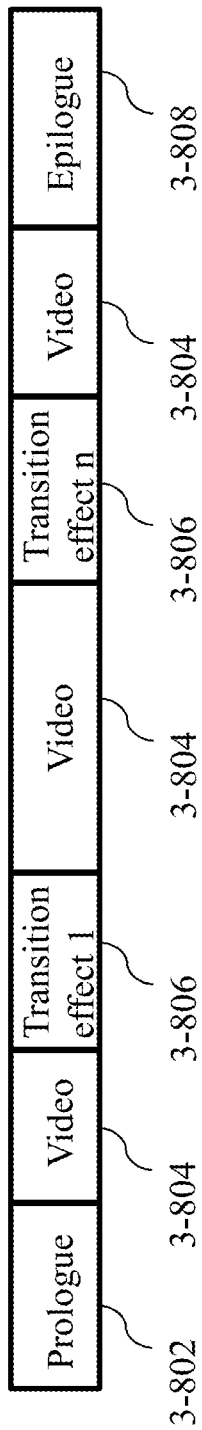
FIG. 16 is diagram illustrating a merged video produced by a method of processing a video, in accordance with an embodiment of the invention.

FIG. 16 is diagram illustrating a configuration of a merged video produced by a method of processing a video, in accordance with an embodiment of the invention.

In some embodiments, the merged video produced by a method of processing a video of the invention may comprise a video captured by an image capture device and at least one of a prologue, a transition effect and an epilogue. In some instances, the number of transition effect may be more than one. In some instances, the merged video may not comprise a prologue. Alternatively, the merged video may not comprise a transition effect. Optionally, the merged video may not comprise an epilogue.

For instance, the merged video shown in FIG. 16 may comprise a video 3-804 captured by the image capture device such as a UAV, one prologue 3-802, one epilogue 3-808 and a plurality of transition effects 3-806. The prologue 3-802 may be added at the beginning of the captured video 3-804. The epilogue 3-808 may be added at the end of the captured video 3-804. The plurality of transition effects 3-806 may be inserted in a middle of the captured video 3-804.

In some embodiments, one or more prologues may be appended to a video. For instance, multiple prologue clips can be merged at the front of a video. Similarly, one or more epilogues may be appended to a video. Multiple epilogue clips can be merged at the end of a video. One or more transition effects may be inserted into a video. Multiple transition effects may be inserted into the video adjacent to one another, or may be spaced apart within the video.

In other embodiments, various video editing techniques may also include splicing videos side by side so that they may simultaneously play. The spliced videos may be adjacent to one another or form an array. In some instances, the spliced videos may simultaneously play in a picture-in-picture format, where at least one of the images is within another of the images. Any description herein of merging videos, e.g., for prologue, transition effect, and/or epilogue may also apply to other video editing that may occur.

Figure 17:
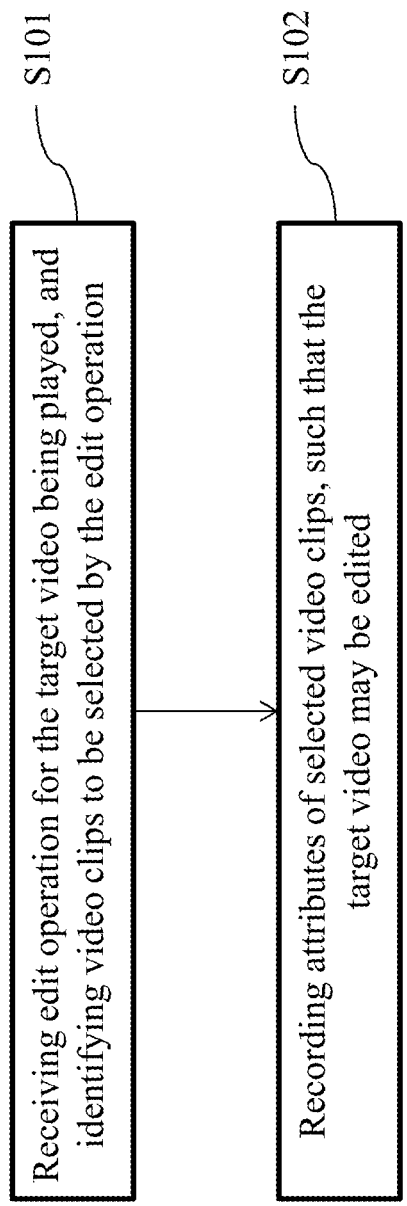
FIG. 17 is a flowchart showing a video processing method according to an embodiment of present invention.

FIG. 17 is a flowchart showing a video processing method according to an embodiment of present invention. The method described in this disclosure may be implemented by electronic devices such as UAVs, cameras, remote controllers, mobile phones, tablets, computers, or laptops that can play video.

At step S101, an edit operation associated with a target video is received. As provided in step S101, the edit operation may identify selected video clips. For example, a target video may be played to a user. The target video being played may be a video being recorded, a video being previewed, or a video being played back. For instance, the target video may be created by being captured by an image capture device, such as those described elsewhere herein. The target video may be captured concurrently with playing the video to the user, or prior to playing the video to the user. The preview and playback may be performed on a video capture device such as a camera, or on may be played on a separate device such as a mobile device (e.g., smartphone, tablet), or computer (e.g., laptop computer, desktop computer). The devices described herein may refer to video editing devices. Alternatively, the target video may be a pre-stored video that may originate from the image capture device or any other source.

During the playing the video, a user may interact with the video to perform an edit operation, such as selecting a video clip. The edit operation may be a single click, a double click or a long press. In some instances, the video clip may be a part of the target video. For instance, a beginning point and/or end point of the video clip may be selected at two points in time of the target video. The beginning point and/or end point may be identified by clicking, double clicking, long press, dragging, drag-and-drop or any other user interaction with the video. Alternatively, the video clip may be provided from a separate video file as the target video. The video clip may be the entirety of a separate video file, or a portion of the separate video file. Once a video clip has been selected, the edit operation for the target video may be detected and received. If the edit operation is received, video clips may be identified from the target video according to a rule associated with the edit operation.

An implementation of the rules for the edit operations may include an example where the edit operation is a single click, and a video clip having a certain duration may be identified by extending a predetermined duration in both time directions centering the time point of the single click. In some embodiments, a video clip having a duration of 5 s may be identified by extending 2 s in a starting direction of the target video and extending 3 s in an ending direction of the target video. In other embodiments, the extended time may be set to other values. For example, a video clip having a duration of 10 s may be identified by extending 5 s in a starting direction of the target video and extending 5 s in an ending direction of the target video. The duration of a video clip may be preset, or may be determined by a user. Similar examples are provided in a discussion of user video edits as provided in FIG. 6 above.

In another example, the edit operation may include a double click, and a video clip may be identified as having a duration between the time points of the two clicks. In other examples, the edit operation may include a long press, and a video clip may be identified from the target video as having a duration between the starting time and ending time of the long press. In some embodiments, in order to compensate a delay in a user's press with respect to a playing of the video, the starting time of the long press may be determined by advancing a couple of seconds, such that the identified video clip is a complete one. In some instances, when a functional button is pressed, the starting time of the press may be determined as 2 s before the press. In other embodiments, a starting time of the press may be determined as another time period before the press. Alternatively, a starting time of the press may be determined as certain time period after the press. Additional example of user selections and interactions are discussed in FIG. 6 above.

At step S102 of FIG. 17, attributes of selected video clips are recorded. The recorded attributes may be utilized in editing the target video or editing video that corresponds to the target video. In particular, in step S102, the attributes of the video clips which are selected in S101 may be recorded. The attributes of the video clips may be recorded in memory on-board a video-editing device. Alternatively, the attributes of the video clips may be recorded in memory on-board a video clip origination device (e.g., an image capture device if the image capture device is the source of the video clip).

In some embodiments, the attributes may include a starting time and ending time of the video clip in the target video, and the time of being selected from the target video. In some embodiments, the attributes may include description such as a format, a duration, a memory usage, location of capture, route of capture, a file name of the target video from which the video clip is selected, definition and frame rate.

The attributes of the video clip may be used for editing the target video. In some embodiments, when an instruction for video synthesizing is received, all video clips having a certain attribute may be selected from the target video, and the selected video clips may be synthesized to a video file. In particular, video clips that share a particular attribute may be selected and synthesized. For example, video clips that have a particular user mark, such as a star rating, may be selected and synthesized. User marks may include tags that signify a particular rating, such as 3 stars for the best favorite, 2 stars for the better favorite, and 1 star for a good favorite. In some instances, video clips shot at or near a particular location may be selected and synthesized. Such selection may be performed with aid of one or more processors, without requiring a user to manually scan through multiple video clips to find the video clips of particular attributes. A user may select the type of attributed to be selected. In some instances, the video clips may be sorted in a sequence of time in the target video and then synthesized. Alternatively, the video clips may be sorted in a sequence of a time being selected and then synthesized. The rule for synthesizing may be determined in view of the user's demand.

For devices that are remote to the image capture device (e.g., an aerial shooting apparatus), the video clips may be identified from a buffered video. In this case, the attributes of the video clips may be recorded, and corresponding video clips may be downloaded from a video stored in a storage media onboard an aerial vehicle (e.g., UAV), such as a memory card, according to the recorded attributes of the video clips. The memory card may be on-board an image capture device supported by the UAV, or may be on-board the UAV without being on-board the image capture device. In some embodiments the memory card may be on-board an image capture device that may encompass the UAV. Any description herein of components on-board the aerial vehicle and/or image device may refer to any combination as described. In some embodiments, if the video stored in a storage media onboard the aerial vehicle has a higher definition and the locally buffered video has a lower definition, the attributes of the video clips may be determined from the video having a lower definition, and then the corresponding video clips may be later extracted from the video having a higher definition.

When video clips are extracted from the target video, a definition of the video clips may be modified. In some embodiments, the definition of video clips may be lowered in order to save space in storage. Alternatively, the definition of video clips may be increased by techniques such as interpolation.

In some embodiments, when an edit instruction for editing the recorded attributes is received, the attributes of the video clips may be edited according to the edit instruction. For example, the edit instruction may include one or more directions to modify the recorded attribute, such as adding new attributes and deleting attributes. Alternatively, portions of attributes, such as a selected start time of a video clip, may be added, deleted, or modified.

If the edit instruction is modifying the recorded attribute, the starting time and/or ending time in the attributes of the video clip may be modified such that the duration of the video clip may be modified, or the position of the video clip itself within the video may be shifted forward or backward. In some embodiments, other attributes such as location of capture, format, or definition may be modified.

In an example where the edit instruction is adding new attributes, the target video may be played again and an edit operation may be received again. Additional video clip or video clips may be identified by the edit operation, and the attributes of the new video clips may be recorded. In another example where the edit instruction is deleting attributes, attributes of the video clips which are identified by the deleting instruction may be deleted.

A user may interact with a device, such as a user terminal or other devices described herein, to edit the video. In some embodiments, one or more sessions may be provided during which a user may interact with video clips to edit the video. A user may log off between sessions or shut down an editing application between sessions. In some instances, editing may occur within a single session. Alternatively, editing may span multiple sessions and a user may be able to save the user's progress between sessions. A user may be within an editing phase while the user is editing the video. One or more edit instructions may be provided during the editing phase. The user may play back edited video during the editing phase. In some instances, the user may go back and forth between playing back video and making additional edit instructions during the editing phase until the user feels the editing is complete. During the editing phase, the video may be local buffered video. During the editing phase, the video may be at a definition lower than or equal to the video as was originally captured or created. When a user has completed editing the video, a video synthesizing instruction may be provided. The video synthesizing instruction may optionally be a video edit request. In some embodiments, the video clips to form the finalized video may be extracted from a source (e.g., image capture device, aerial vehicle). This may occur during a synthesization phase. The finalized video may be delivered and/or played back. The finalized video may be at a definition greater than, equal to, or lower than the definition at which the video was originally captured or created. The finalized video may be at a definition greater than or equal to the definition of the video used during the editing phase.

Additionally, when a video synthesizing instruction is received after editing the attributes, video clips may be extracted from the target video according to the edited attributes, and a video file may be produced. In some embodiments, the extracted video clips may be stored in a storage media in certain format, such as MP4 (Moving Picture Experts Group Audio Layer IV), AVI (Audio Video Interleave) or MOV (Quicktime Movie Format). The user may play or preview each of the video clips, or the user may play or preview a combined file of the video clips. In some embodiments, the stored video clips may be selected during one playing process. Alternatively, the stored video clips may be selected during more than one playing processes. Therefore, a storing time of the video clips may be different from a time of the video clips in the target video. In some embodiments, the video clips may be combined based on the order in which the video clips are stored. Alternatively, the video clips may be combined based on the order in which the video clips are presented in the target video. Further, the process of selecting video clips from the target video, extracting video clips according to attributes of video clips, and synthesizing the video clips into a video file may be implemented by dedicated software.

Figure 18:
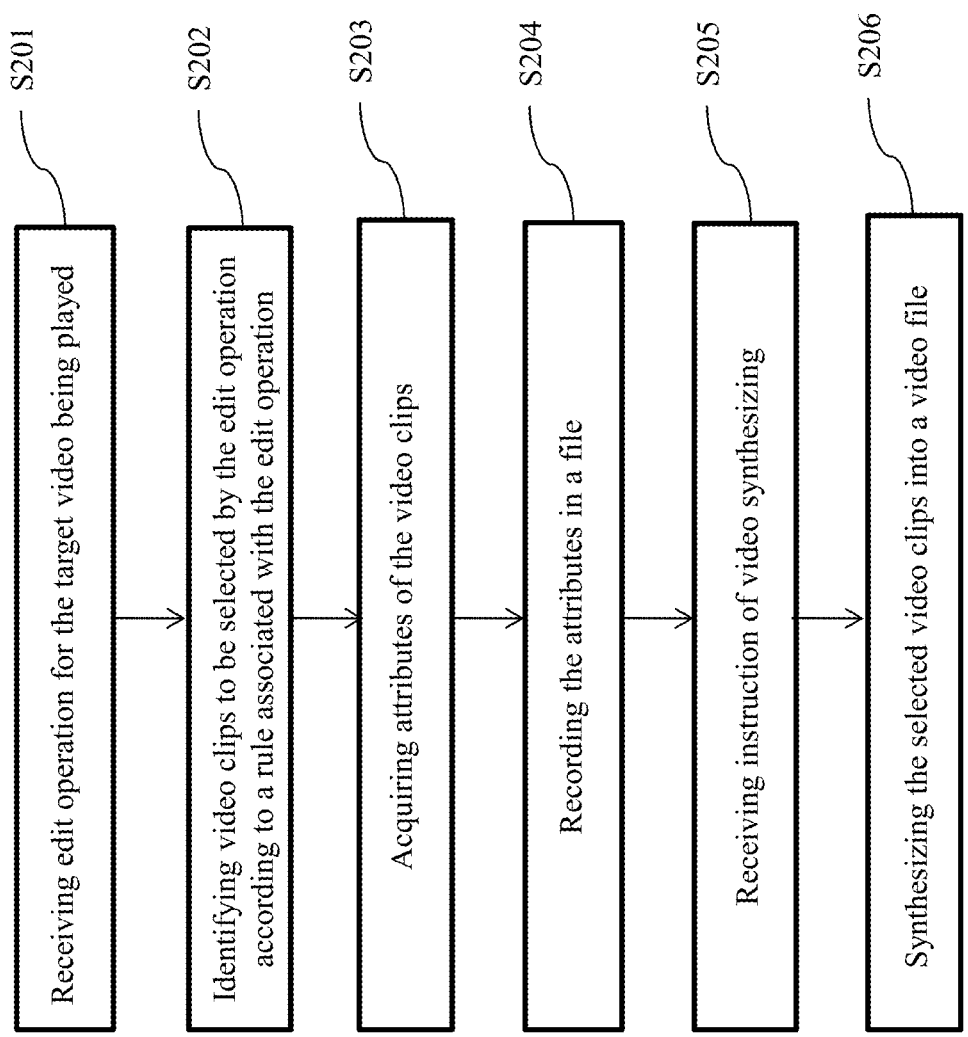
FIG. 18 is a flowchart showing a video processing method according to another embodiment of present invention.

FIG. 18 is a flowchart showing a video processing method according to another embodiment of present invention. As shown in FIG. 18, edit operation relating to target video being played is received at step S201. In some examples, the target video being played may be a video being recorded, a video being previewed, or a video being played back. Additionally, a user may interact with the target video to edit the video. Accordingly, at step S202, video clips to be selected by the edit operation are identified. In particular, the video clips to be selected may be identified by the edit operation according to a rule associated with the edit operation. The edit operation may include any user interaction with a device, such as a single click, a double click, a long press, a swipe or dragging motion, or a drag-and-drop, on a physical button or functional button of an application. The edit operation may occur with any other type of user interaction via a user interactive device, such as a mouse, joystick, trackball, touchpad, touchscreen, multi-touch, tilt or shaking of the device, camera, or microphone. Any description herein of user interaction of a device may include any of the interactions described herein.

If the edit operation is a single click, a video clip having certain duration may be identified by extending a predetermined duration in both time directions centering the time point of the single click. Alternatively, if the edit operation is a double click, a video clip may be identified as having a duration between the time points of the two clicks. Further, if the edit operation is a long press, a video clip may be identified from the target video as having a duration between the starting time and ending time of the long press. The video clip and/or duration of the video clip may be identified using any other user interaction.

In step S203, attributes of the video clips are acquired. In some embodiments, the attributes of the video clips may be acquired after the video clips are identified from the target video. Additionally, the identified video clips may be stored.

In step S204, the attributes may be recorded in a file. For example, the attributes of the video clips may be recorded in a file. The name of the file may be associated with the target video, such that the user may find the target video based on a file name of the attributes. In some instances, the file may be independent from the target video.

An instruction of video synthesizing may be received at step S205. For example, an instruction of video synthesizing may be received, and in response the video clips identified by the attributes in the file may be extracted from the target video. Additionally, before extracting from the target video the video clips identified by the attributes, the attributes may be edited on user's demand. For example, attributes of certain video clips may be deleted from the file, attributes of certain video clips may be modified, or attributes of new video clips may be added to the file. In some instances, the attributes may be edited more than once. Additionally, if the file containing edited attributes of video clips satisfies the user's demand, video clips may be extracted from the target video according to the edited attributes in the file.

Optionally, the target video may be stored at a memory on a device that is remote to a device where an edit operation is received. For example, a user may edit a video at a user terminal and the target video may be stored on an image capture device or on an aerial vehicle (e.g., on the image capture device on the aerial vehicle, or on the aerial vehicle while not being stored on the image capture device). Alternatively, the target video stored may be stored at a memory on the same device where an edit operation is received.

At step S206, the selected video clips may be synthesized into a video file. When synthesizing the video file, the video clips may be sorted in a sequence of a time in the target video. Alternatively, the video clips may be sorted in a sequence of a time being selected. Subsequently, the sorted video clips may be combined into a video file. In some embodiments, the video file may be played directly after being synthesized. Alternatively, the video file may be exported to a storage media such as a personal computer, a mobile phone, a pad or a mobile hard disk for later play.

The video synthesization may occur on a device having the memory on which the target video is stored. Thus, the video synthesization may occur locally where the video is stored. For example, a user may edit a video on a user terminal and the target video may be stored and synthesized on an image capture device or on an aerial vehicle. The editing phase may occur on a first device and the synthesization phase may occur on a second device. The synthesized video may be played back on the image capture device or on the aerial vehicle. The synthesized video may be transmitted to another device, such as the user terminal or any other device to be played back. The synthesized video may be transmitted to a cloud storage or a video streaming site. Alternatively, the video synthesization may occur on a device separate from the device on which the target video is originally stored. The target video may be transmitted to another device where the synthesization may occur. The other device where the synthesization may occur may be the device where the editing occurs or may be a separate device. For example, a user may edit a video on a user terminal the target video may be stored on an image capture device or an aerial vehicle. The target video may be transmitted to the user terminal or a separate device where synthesization may occur. The editing phase may occur on a first device and the synthesization phase may occur on the same first device, or alternatively on a third device.

In an example where the user opens a new target video and selects video clips from the new target video, the above procedures may be performed to identify video clips from the new video clip and record the attributes of the video clips in a new file. Further, since the attributes of the video clips are recorded in a preset file, the video clips may be extracted from the target video according to the attributes recorded in the file, even if the user fails to store the identified video clips.

Figure 19:
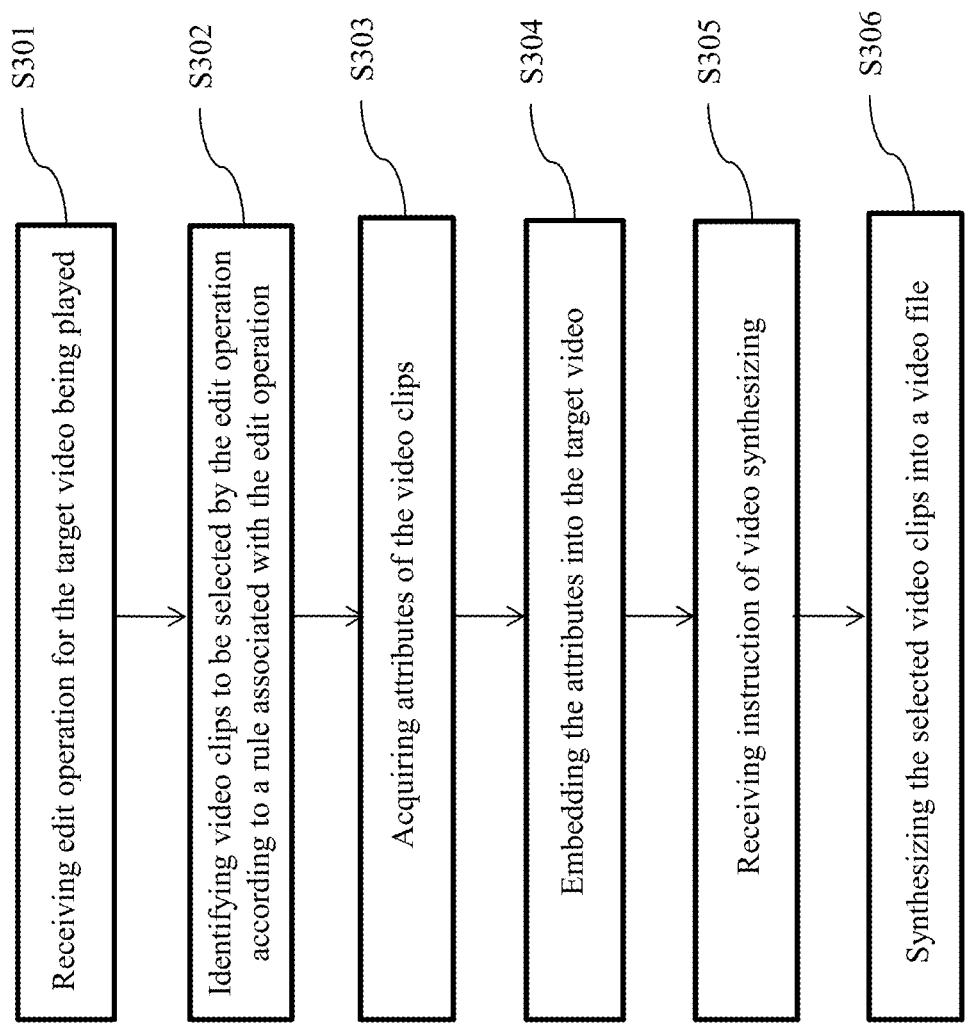
FIG. 19 is a flowchart showing a video processing method according to still another embodiment of present invention.

FIG. 19 is a flowchart showing a video processing method according to still another embodiment of present invention. At step S301, edit operations for the target video being played are received. Further, at step S302, video clips to be selected by the edit operation are identified according to a rule associated with the edit operation. At step S303, attributes of the video clips are acquired. Additionally, at step S304, the attributes are embedded into the target video. For example, a starting time and an ending time of the video clips may be tagged on the target video, and the video clips may be assigned a name or brief description. Alternatively, the time of being identified for the video clips may be tagged on the target video. The attributes of the video clips may be stored together with the target video. The user may open the target video, click the identified video clips and preview the video clips.

At step S305, instruction of video synthesizing may be received. For example, if an instruction of video synthesizing is received, the video clips identified by the attributes in the file may be extracted from the target video. Additionally, if an instruction of video synthesizing is received, the target video may be opened, the identified video clips may be extracted and the video clips may be stored. Further, the selected video clips may be synthesized into a video file at 5306. In some instances, before combining the extracted video clips, the video clips may be sorted in a sequence of a time in the target video or in a sequence of a time being selected. The sorted video clips may then be synthesized to produce a video file.

Since the attributes of the selected video clips in FIG. 19 are embedded into the target video, the user may know the attributes of the video clips when the target video is played. In some embodiments, the user can edit the attributes of the video clips in real time when the target video is played.

Figure 20:
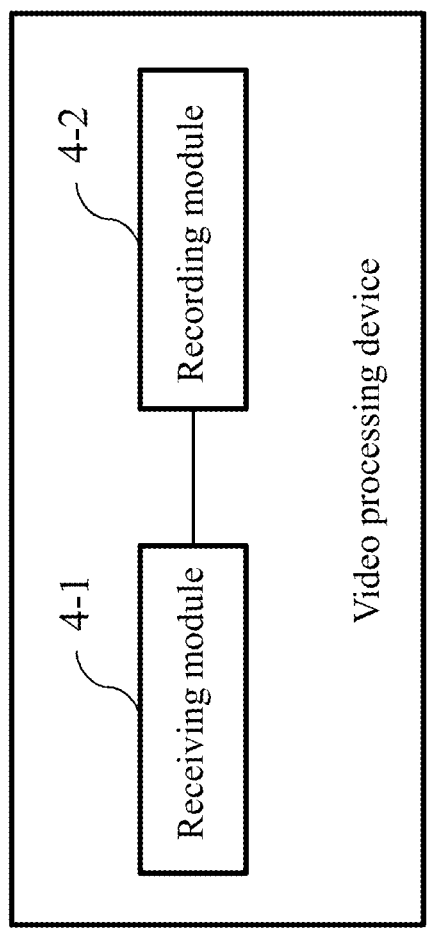
FIG. 20 is a schematic view showing a configuration of a video processing device according to an embodiment of present invention.

FIG. 20 is a schematic view showing a configuration of a video processing device according to an embodiment of the invention. The video processing device may be installed on electronic device which can play a video such as an aerial vehicle, a mobile phone, an electronic pad, a camera, etc. The video processing device may be a device or may be installed on a device on which a video editing application may be run. A user may interact with the video processing device to edit a video. For instance, the video processing device may be installed on a user terminal, which may run a video editing application through which the user may edit video.

In some embodiments, the video processing device may include a receiving module 4-1 for receiving an edit operation for the target video being played, and for identifying the video clips to be selected by the edit operation; and a recording module 4-2 for recording the attributes of the selected video clips such that the target video may be edited.

During the playing of the target video, the user's edit operation of the target video may be received, such as user's single click, a double click or a long press. For example, video clips may be identified from the target video according to a rule associated with the edit operation. Additionally, the recording module 4-2 may record the attributes of the video clips which are selected by the receiving module 4-1 such that the target video may be edited according to the stored attributes.

Figure 21:
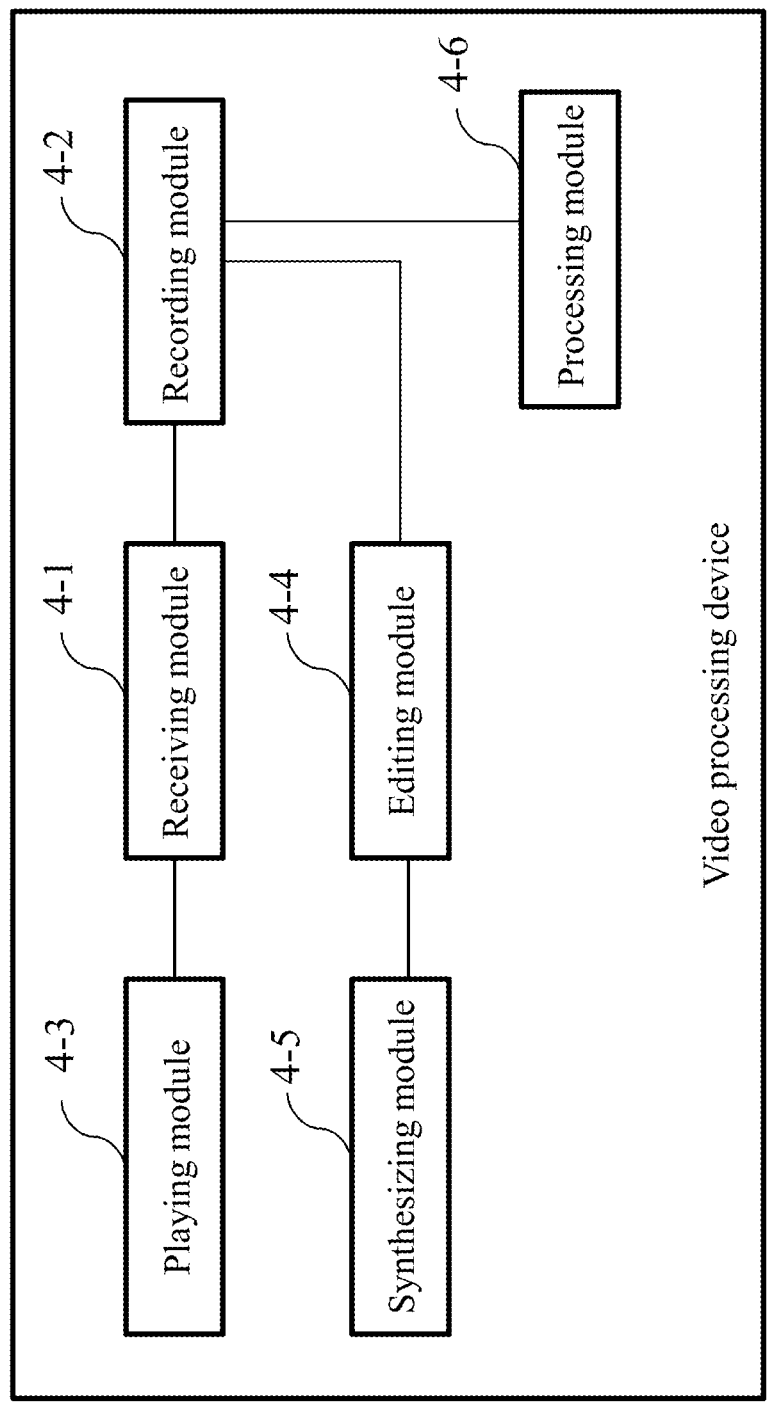
FIG. 21 is a schematic view showing a configuration of a video processing device according to another embodiment of present invention.

FIG. 21 is a schematic view showing a configuration of a video processing device according to another embodiment of the invention. In some embodiments, the video processing device may be used to edit and synthesize video. Optionally, an editing phase and synthesizing phase may occur on the video processing device. The video processing device may further include a playing module 4-3, an editing module 4-4, a synthesizing module 4-5 and a processing module 4-6.

The playing module 4-3 may play a video, such as the target video. In some embodiments, the video played by the playing module 4-3 may be a video being recorded, a video being previewed, or a video being played back. Alternatively, the video played by the playing module 4-3 may be selected video clips or the final synthesized video file.

The editing module 4-4 may edit the recorded attributes of the video clips, including modifying and deleting the attributes of certain video clips and adding attributes of new video clips. Further, the synthesizing module 4-5 may synthesize and produce the video file. The processing module 4-6 may perform processings to the video clips.

Figure 22:
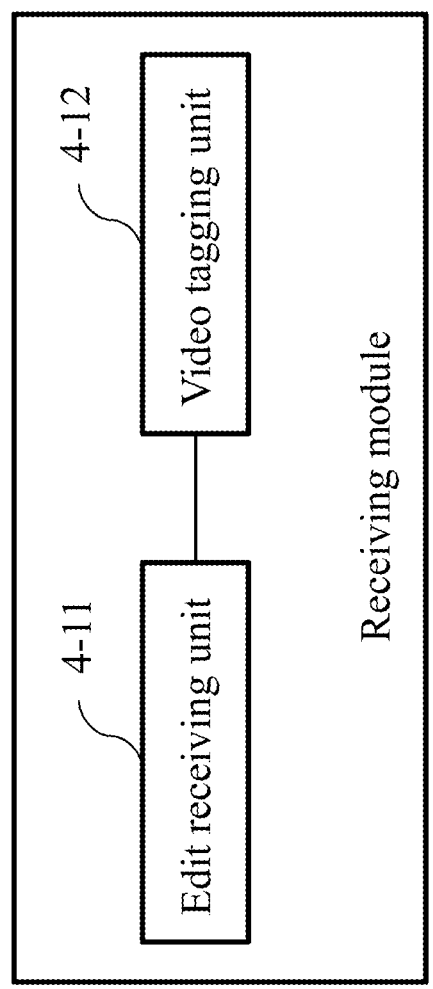
FIG. 22 is a schematic view showing a configuration of a receiving module in the video processing device according to the embodiment shown in FIG. 20 or FIG. 21.

FIG. 22 is a schematic view showing a configuration of a receiving module in the video processing device according to the embodiment shown in FIG. 20 or FIG. 21. In some embodiments, the receiving module may include an edit receiving unit 4-11 and a video tagging unit 4-12. The edit receiving unit 4-11 may receive edit operation for the target video being played, including any of the user interactions described elsewhere herein, such as a single click, a double click or a long press. The video tagging unit 4-12 may identify video clips from the target video being played according to a rule associated with the edit operation.

If the edit operation received by the edit receiving unit 4-11 is a single click, the edit receiving unit 4-11 may identify a video clip having certain duration by extending a predetermined duration in both time directions centering the time point of the single click. In some embodiments, a video clip having a duration of 5 s may be identified by extending 2 s in a starting direction of the target video and extending 3 s in an ending direction of the target video. In some embodiments, the extended time may be set to other values. For example, a video clip having a duration of 10 s may be identified by extending 5 s in a starting direction of the target video and extending 5 s in an ending direction of the target video.

If the edit operation received by the edit receiving unit 4-11 is a double click, the edit receiving unit 4-11 may identify a video as having a duration between the time points of the two clicks.

If the edit operation received by the edit receiving unit 4-11 is a long press, the edit receiving unit 4-11 may identify a video clip from the target video as having a duration between the starting time and ending time of the long press. In some embodiments, in order to compensate a delay in user's press with respect to a playing of the video, the starting time of the long press may be determined by advancing a couple of seconds, such that the identified video clip is a complete one.

In some instances, when a functional button is pressed, the starting time of the press may be determined as 2 s before the press. In some embodiments, a starting time of the press may be determined as other time period before the press.

Alternatively, a starting time of the press may be determined as certain time period after the press.

Figure 23:
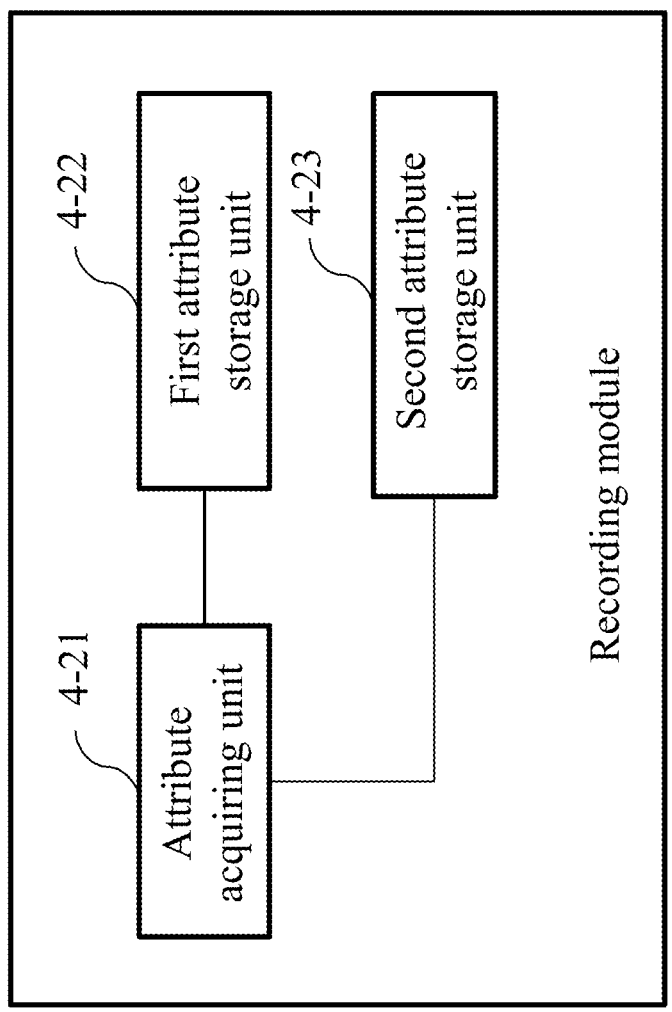
FIG. 23 is a schematic view showing a configuration of a recording module in the video processing device according to the embodiment shown in FIG. 20 or FIG. 21.

FIG. 23 is a schematic view showing a configuration of the recording module in the video processing device according to the embodiment shown in FIG. 20 or FIG. 21. In some embodiments, the recording module 4-2 may include an attribute acquiring unit 4-21, a first attribute storage unit 4-22 and a second attribute storage unit 4-23.

The attribute acquiring unit 4-21 may acquire the attributes of the video clips. In some embodiments, the attribute may include a starting time and ending time of the video clip in the target video, and the time of being selected. In some embodiments, the attribute may include description such as a format, a duration, a memory usage, location of capture, route of capture, a file name of the target video from which the video clip is selected, definition and frame rate.

The first attribute storage unit 4-22 may record the attributes of the video clips acquired by the attribute acquiring unit 4-21 in a preset file. In some embodiments, when recording the attributes of the video clips in the file, the name of the file may be associated with the target video, such that the user may find the target video based on a file name of the attributes. Alternatively, the file may be assigned another name. In some instances, the file may be independent from the target video.

The second attribute storage unit 4-23 may embed the attributes of the video clips acquired by the attribute acquiring unit 4-21 into the target video. In some embodiments, a starting time and an ending time of the video clips may be tagged on the target video, and the video clips may be assigned a name or brief description. Alternatively, the time of being identified for the video clips may be tagged on the target video. The attributes of the video clips may be stored together with the target video. The user may open the target video, click the identified video clips and preview the video clips.

Figure 24:
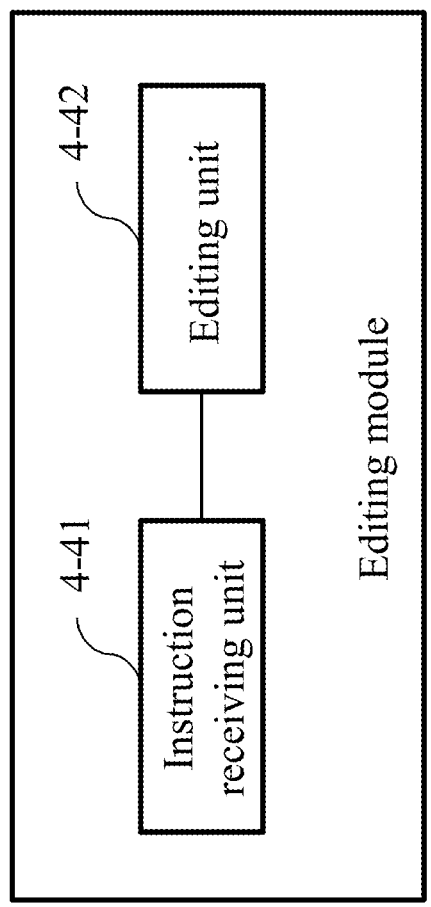
FIG. 24 is a schematic view showing a configuration of an editing module in the video processing device according to the embodiment shown in FIG. 21.

FIG. 24 is a schematic view showing a configuration of the editing module in the video processing device according to the embodiment shown in FIG. 21. The editing module 4-4 may edit the recorded attributes of the video clips. In some embodiments, the editing module 4-4 may include an instruction receiving unit 4-41 and an editing unit 4-42. The receiving unit 4-41 may receive an edit instruction for editing the recorded attributes. When the receiving unit 4-41 receives an edit instruction for editing the recorded attributes, the editing unit 4-42 may edit the recorded attributes of the video clips according to the received edit instruction. For example, the attribute editing instruction may include one or more of modifying the recorded attribute, adding new attributes and deleting attributes.

If the receiving unit 4-41 receives a modifying instruction, one or more of the starting time, ending time in the attributes of the video clip may be modified. Alternatively, if the receiving unit 4-41 receives a deleting instruction, attributes of the video clips which are identified by the deleting instruction may be deleted. Alternatively, if the receiving unit 4-41 receives an adding instruction, the target video may be played again and an edit operation may be received again. Additional video clip or video clips may be identified by the edit operation, and the attributes of the new video clips may be recorded.

Figure 25:
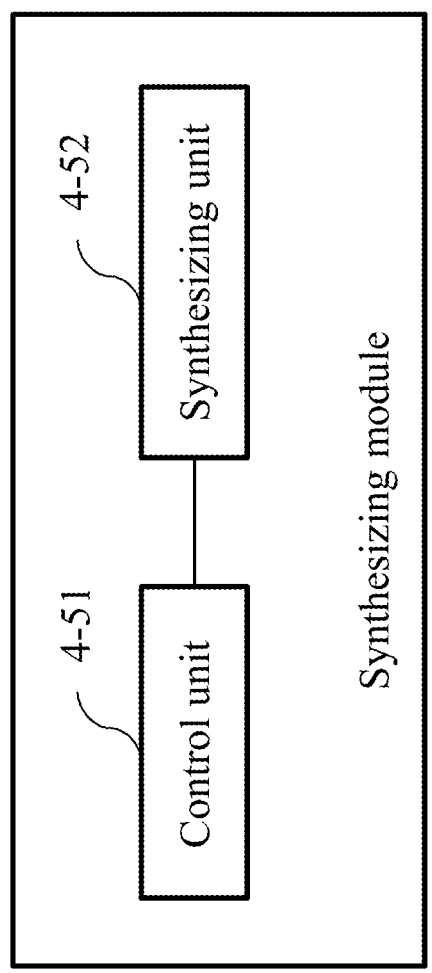
FIG. 25 is a schematic view showing a configuration of a synthesizing module in the video processing device according to the embodiment shown in FIG. 21.

FIG. 25 is a schematic view showing a configuration of the synthesizing module in the video processing device according to the embodiment shown in FIG. 21. The synthesizing module 4-5 may include a control unit 4-51 and a synthesizing unit 4-52. The synthesizing module 4-5 may edit the video according to the attributes of the video clips as recorded by the recording module 4-2.

The control unit 4-51 may extract video clips identified by the attributes from the target video when an instruction of video synthesizing is received. The synthesizing unit 4-52 may combine the video clips extracted by the control unit 4-51 such that a video file is produced. When synthesizing the video file, the video clips may be sorted in a sequence of a time in the target video. Alternatively, the video clips may be sorted in a sequence of a time being selected. In some embodiments, the video file may be played directly after being synthesized. Alternatively, the video file may be exported to a storage media such as a personal computer, a mobile phone, a tablet or a mobile hard disk for later play.

Figure 26:
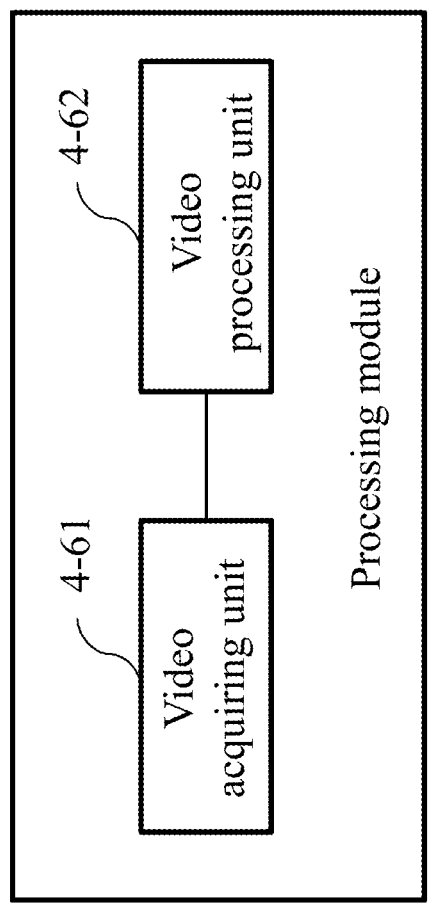
FIG. 26 is a schematic view showing a configuration of a processing module in the video processing device according to the embodiment shown in FIG. 21.

FIG. 26 is a schematic view showing a configuration of the processing module in the video processing device according to the embodiment shown in FIG. 21. The processing module 4-6 may combine the video clips. In some embodiments, if the recording module 4-2 stores the video clips tagged by the receiving module 4-1, the processing module 4-6 may combine the stored video clips. The processing module 4-6 may include a video acquiring unit 4-61 and a video processing unit 4-62. The video acquiring unit 4-61 may acquire the identified video clips, and the video processing unit 4-62 may synthesize the video clips. In combining, the video clips may combine in order to produce a video file. In some embodiments, the video clips may be sorted in a sequence of a time in the target video or in a sequence of a time being selected, then the sorted video clips may be synthesized to produce a video file.

In present embodiment, the video clips may be identified from the target video, and the attributes of the video clips may be recorded. The user may synthesize the video file based on the recorded attributes of the video clips, and may edit the video file by editing the attributes of the video clips. Therefore, no specific video edit software is necessary. In some embodiments, the video clips may be tagged during the video capture, thus there's no need for playback in identifying the video clips.

In some embodiments, user input to edit videos may occur with videos of lower resolution. Once the user has completed editing the videos, the attributes and edit instructions may be used to acquire video from a target video which may be at an equal or higher resolution than the videos where editing occurred. The video acquisition and video processing to produce the synthesized video file may occur at the equal or higher resolution.

Figure 27:
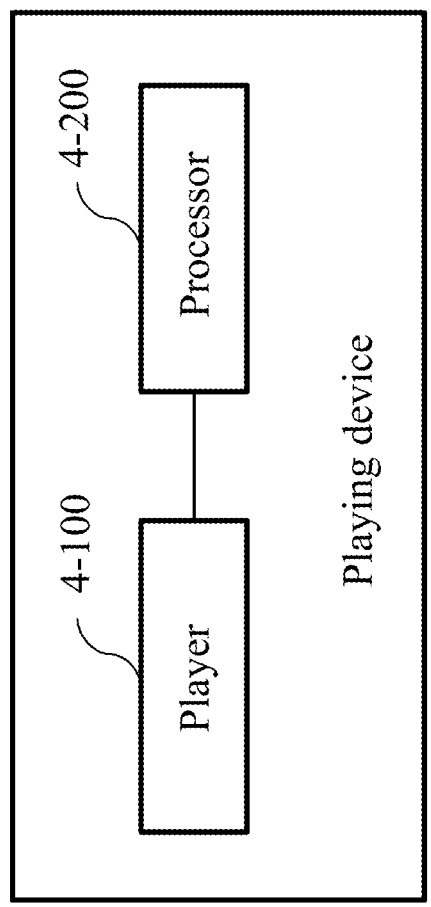
FIG. 27 is a schematic view showing a configuration of a playing device according to an embodiment of present invention.

FIG. 27 is a schematic view showing a configuration of a playing device according to an embodiment of present invention. In some embodiments, the playing device may be electronic devices that can play and display a video, such as UAVs, cameras, mobile phones and tablets. The playing device may include a player 4-100 and a processor 4-200. The player 4-100 may play a video. The processor 4-200 may receive edit operation for the target video being played, identify video clips to be selected by the edit operation, and record the attributes of the selected video clips, such that the target video can be edited.

In some embodiments, the player 4-100 may play and display a target video. In some instances, the target video may be a video being recorded, a video being previewed or a video being played back. Alternatively, the player 4-100 may play the video clips which are identified from the target video or the final synthesized video file. In some examples, the processor 4-200 may receive edit operation for the target video being played on the player 4-100, identify video clips to be selected by the edit operation according to a rule associated with the edit operation, and record the attributes of the selected video clips. In other examples, the processor 4-200 may receive a single click, a double click and a long press on the target video being played on the player 4-100, identify video clips from the target video according to a rule associated with the edit operation.

If the received edit operation is a single click, a video clip having certain duration may be identified from the target video by extending a predetermined duration in both time directions centering the time point of the single click. Alternatively, if the received edit operation is a double click, a video clip may be identified from the target video as having a duration between the time points of the two clicks. If the received edit operation is a long press, a video clip may be identified from the target video as having a duration between the starting time and ending time of the long press.

In some embodiments, the processor 4-200 may acquire the attributes of the video clips, and record the attributes of the video clips in a preset file or embed the attributes of the video clips into the target video. In some embodiments, the attribute may include a starting time and ending time of the video clip in the target video, and the time of being selected. In some embodiments, the attribute may include description such as a location of capture, route of capture, and definition.

In some embodiments, if the processor 4-200 receives an edit instruction for editing the recorded attributes, the processor 4-200 may edit the attributes of the video clips according to the edit instruction. For instances, the edit instruction may include one or more of modifying the recorded attribute, adding new attributes and deleting attributes.

If the edit instruction is modifying the recorded attribute, the processor 4-200 may modify one or more of the starting time and/or ending time in the attributes of the video clip. Additionally, if the edit instruction is deleting attributes, the processor 4-200 may delete the attributes of the video clips which are identified by the deleting instruction. Further, if the edit instruction is adding new attributes, the target video may be played again and an edit operation may be received again. Additional video clip or video clips may be identified by the edit operation, and the attributes of the new video clips may be recorded.

In some embodiments, if an instruction of video synthesizing is received, the processor 4-200 may extract the video clips identified by the attributes from the target video, and synthesize the selected video clips into a video file. In some embodiments, when synthesizing the video file, the video clips may be sorted in a sequence of a time in the target video and then synthesized. Alternatively, the video clips may be sorted in a sequence of a time being selected and then synthesized.

In some embodiments, the processor 4-200 may store the video clips identified from the target video. Therefore, if an instruction of video synthesizing is received, the processor 4-200 may acquire the stored video clips and synthesize a video file in a successive order. In some instances, the video clips may be sorted in a sequence of a time in the target video and then synthesized. Alternatively, the video clips may be sorted in a sequence of a time being selected and then synthesized.

Figure 28:
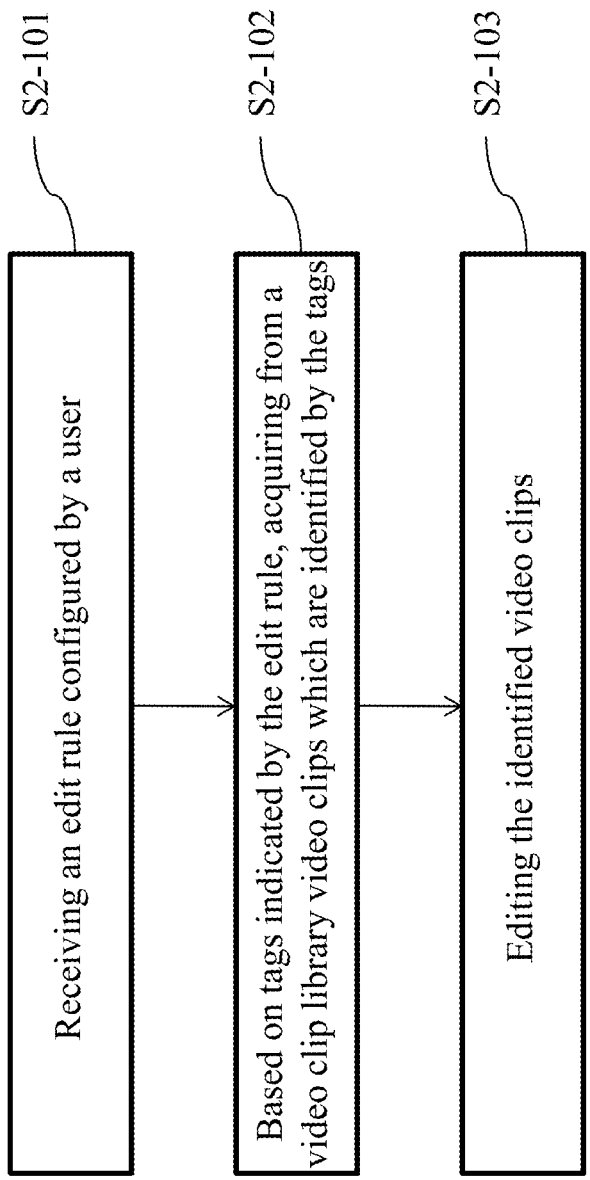
FIG. 28 is a flowchart showing a video processing method according to an embodiment of present invention.

FIG. 28 is a flowchart showing a video processing method according to an embodiment of the invention. The method described in this disclosure may be implemented by an electronic device such as an aerial vehicle, a camera, a mobile phone, or a tablet that can play video.

At step S2-101 of FIG. 28, an edit rule that is configured by a user is received. In particular, the user may select a preset edit rule. Alternatively, the user may customize the edit rule according to a demand. In some examples, before receiving the edit rule configured by the user, a video data may be received from an image capture device and/or an aerial vehicle (e.g., UAV), as a video source such that video clips may be acquired. The video data captured by the image capture device and/or aerial vehicle may be locally buffered and used as target video from which video clips may be extracted. Video editing may occur on the device that captures the video data (e.g., image capture device and/or aerial vehicle) or on a separate device (e.g., user terminal).

In some examples, before receiving the edit rule configured by the user, the following operations may be performed: receiving a tagging operation for the target video being played; extracting video clips being selected by the tagging operation; generating tags for the selected video clips; and storing the video clips in association with the generated tags in a video clip library. Alternatively, video clips may be extracted from the target video, and a description of each video clip may be stored, including a starting time, an ending time of the video clip in the target video, and a definition of the video clip. Then, the video clips may be extracted and downloaded from a video stored in a storage media of a video source device (e.g., onboard the image capture device and/or aerial vehicle) such as a memory card according to the recorded description of the video clips.

When video clips are extracted from the target video, a definition of the video clips may be modified. In particular, the definition of video clips may be lowered in order to save the storage. Alternatively, the definition of video clips may be increased by techniques such as interpolation.

Additionally, the edit operation to the target video being played may be a single click, a double click or a long press. If the edit operation is a single click, a video clip having certain duration may be identified by extending a predetermined duration in both time directions centering the time point of the single click. In some embodiments, a video clip having a duration of 5 s may be identified by extending 2 s in a starting direction of the target video and extending 3 s in an ending direction of the target video. In some embodiments, the extended time may be set to other values. For example, a video clip having a duration of 10 s may be identified by extending 5 s in a starting direction of the target video and extending 5 s in an ending direction of the target video. If the edit operation is a double click, a video clip may be identified as having a duration between the time points of the two clicks.

Further, if the edit operation is a long press, a video clip may be identified from the target video as having a duration between the starting time and ending time of the long press. In some embodiments, in order to compensate a delay in user's press with respect to a playing of the video, the starting time of the long press may be determined by advancing a couple of seconds, such that the identified video clip is a complete one. In some instances, when a functional button is pressed, the starting time of the press may be determined as 2 s before the press. In some embodiments, a starting time of the press may be determined as other time period before the press. Alternatively, a starting time of the press may be determined as certain time period after the press.

When a video clip is selected, one or more of a location of capture, a time of capture and rating information may be generated. For example, a time tag may be generated for the selected video clip according to a time of capture thereof. The time tag may be generated automatically without requiring input by a user. In some instances, the time tag may provide a time in accordance with a clock present on a device used to capture or store the video clip. In some embodiments, a location tag may be generated for the selected video clip according to a location of capture thereof. The location tag may be generated automatically without requiring input by a user. For example, the location tag may be a geotag indicative of the location of a device used to capture the video clip at the time the video clip is captured. For example, an image capture device and/or aerial vehicle may have a GPS locator, or other type of locator, that may provide location information (e.g., global coordinates). In other instances, the location tag may be generated with user input. For instance, a user may specify the type of location (e.g., beach, home, forest) or provide any other personalized information about the location. The personalized information from the user may be combined with automatic location information. In some embodiments, a rating tag may be generated for the selected video clip according to a rating thereof. The rating tag may be automatically generated without user input. For instance, a default rating may be provided that may be modified by the user at a later time. In another example, a rating may be generated based on one or more video parameters (e.g., clarity, contrast, resolution, etc.). The rating tag may be provided based on a input from a user (a user may rate the video at the time the video is captured or at a later time). In some embodiments, any type of categorization tag may be generated, that may help a user sort through videos at a later time. For instance, the tag may indicate the individuals or objects shown in the video (e.g., family, herd of buffalo). The tag may indicate the purpose of the video (e.g., personal use, for business). The tag may indicate a type of event that is depicted by the video (e.g., birthday celebration, concert, graduation). Other types of tags may be generated. The tag (e.g., time tag, location tag and rating tag) may be generated for a video clip as needed. In some examples, a rating may be generated when the video clip is generated. For example, a video clip may be assigned as three star, four star or others. Alternatively, a video clip may be assigned a default rating, and the user may modify the default rating later. The tag may be alternatively be generated after the video clip is generated.

Additionally, if an edit instruction is received, the tags, including time tag, location tag and rating tag of the video clip may be edited according to the edit instruction. The video clips can be stored in associated with the corresponding tags in a video clip library.

In some embodiments, the preset edit rule may be one or a combination of an edit rule of performing editing according to a time tag of the video clips, an edit rule of performing editing according to a location tag of the video clips, and an edit rule of performing editing according to a rating tag of the video clips. The user customized edit rule may be a combination of certain rating, time and/or location which are set according to the user's demand. Additionally, the target video being played may be a video being recorded, a video being previewed or a video being played back.

At step S2-102, video that is acquired from a video clip library is specified by tags that are indicated by the edit rule. In some examples, if an edit rule configured by a user is a preset edit rule, video clips having the tags as indicated by the preset edit rule may be acquired from the video clip library. For instance, video clips having a time tag "today" may be acquired, video clips having a location tag "beach" may be acquired, or video clips having a rating tag "three star" may be acquired. Any other categories of tags may be applied to the video clips.

Alternatively, video clips having a combination of time tag, location tag and rating tag may be acquired. For instance, video clips having a time tag "today" and a location tag "beach" may be acquired. Alternatively, the edit rule may be: acquiring video clips from one flight route of the aerial vehicle.

In some examples, if the edit rule configured by a user is a user customized edit rule, video clips may be acquired according to tags in the user customized edit rule. For instance, a user customized edit rule may be: acquiring two video clips having a rating tag "five star", one video clip having a location tag "forest" and one video clip having a time tag "today". In this case, video clips having such tags may be acquired from the video clip library. The user customized edit rule may be created by simple edit operations.

At step S2-103, the identified video clips are edited. In particular, after video clips are acquired according to the tags in S2-102, the video clips may be synthesized to a video file. The video clips may be combined to produce the video file. Alternatively, the acquired video clips may be inserted into a template to produce the video file. The template may be a default template from the system or a template selected by the user's instruction.

A template for use in generating an edited video file may include one or more of: a preset audio, a subtitle, and a transition clip. In some embodiments, prologue video clips, epilogue video clips, and/or transition effect clips may be provided to be merged with a video. If the template includes a transition clip, the video clips and the transition clips may be arranged according to the user's instructions. In some instances, the video clips may be inserted between the transition clips, such that the synthesizing of video clips is smoothed by the transition clips. For example, if two video clips having two different levels of brightness are merged/synthesized, a transition clip may be used to adjust the brightness between the clips. In additional examples where the template includes audio and/or subtitles, the video clips may be synthesized with the audio and/or subtitles to produce a video file. Further, a synthesized video file may be produced by selecting a template and inserting the video clips.

In other examples, the user may edit the templates, such as modifying one or more of the audio, subtitles and transition clips. Additionally, the user may edit the video file if an edit instruction is received. In some instances, if the edit instruction is a reordering instruction, then the video clips may be reordered according to the user's specified order and synthesized to a video file. Alternatively, a "shaking" operation or a pressing on a "synthesize again" button may be performed to reorder the acquired video clips in a random manner. When the clips are reordered in a random matter, corresponding edits may or may not be reordered with the clips. For example, if certain subtitles were associated with certain clips, the subtitles may be reordered with the clips. Alternatively, the subtitles may remain playing in the same order and rate without regard to whether the video clips are reordered. If the edit instruction is a deleting instruction, the video clips specified by the deleting instruction may be deleted. If the edit instruction is an adding instruction, new video clips may be acquired from the video clip library according to the tags specified by the adding instruction, and added to a specified position of the video file. If the edit instruction is an acquiring new video clips instruction, new video clips may be acquired from the video clip library according to the tags specified by the acquiring new video clips instruction, and a new video file may be synthesized accordingly.

Figure 29:
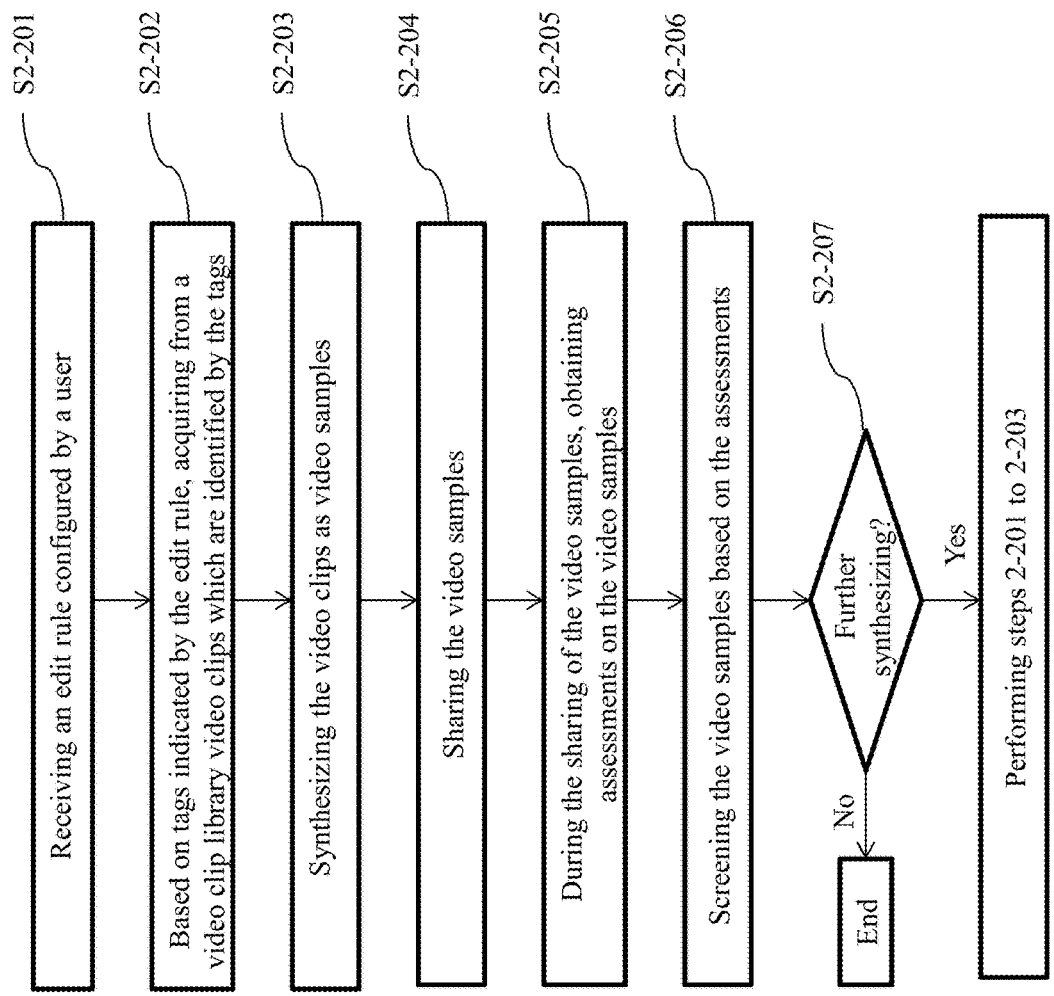
FIG. 29 is a flowchart showing a video processing method according to another embodiment of present invention.

FIG. 29 is a flowchart showing a video processing method according to another embodiment of present invention. At step S2-201 of FIG. 21, an edit rule configured by a user is received. In an example, before receiving the edit rule configured by the user, one or more of the following operations may be performed: receiving a tagging edit operation for the target video being played; extracting video clips being selected by a tagging operation; generating tags for the selected video clips; and storing the video clips in associated with the generated tags in a video clip library.

Video clips may be selected from the target video by a user interaction, such as a single click, a double click or a long press. After the video clips have been selected, the selected video clips may be extracted. When a video clip is selected, one or more of a time of capture, a location of capture and rating information may be generated, such that a time tag, location tag and rating tag may be available. The video clips are stored and associated with the corresponding tags in a video clip library.

Additionally, the user may select a preset edit rule. Alternatively, the user may customize the edit rule according to a demand. For example, the preset edit rule may be one or a combination of an edit rule of performing editing according to a time tag of the video clips, an edit rule of performing editing according to a location tag of the video clips, and an edit rule of performing editing according to a rating tag of the video clips. In some examples, the user customized edit rule may be a combination of certain rating, time and/or location which are set according to the user's demand.

At step S2-202, based on tags indicated by the edit rule, video clips which are identified by the tags may be acquired from a library. In some examples, if an edit rule configured by a user is a preset edit rule, video clips having the tags as indicated by the preset edit rule may be acquired from the video clip library. For instance, video clips having a certain time tag, location tag or rating tag may be acquired. Alternatively, video clips from one flight route of the aerial vehicle may be acquired. If the edit rule configured by a user is a user customized edit rule, video clips may be acquired according to tags in the user customized edit rule.

At step S2-203, video clips may be synthesized as video samples. For example, after video clips are acquired according to the tags specified by the edit rule, the video clips may be synthesized to a plurality of video samples. Additionally, the video clips may be combined to produce the video samples. Alternatively, the acquired video clips may be inserted into a template to produce the video samples. The template may be a default template from the system or a template selected by the user's instruction. In some embodiments, the template may include one or more template features, which may include one or more of a preset audio, a subtitle and a transition clip.

In some examples, the video clips may be reordered. Further, some video clips may be deleted or added. Additionally, if the number of video clips which can be acquired from the video clip library according to the tags specified by the edit rule is larger than a predetermined value, the video clips may be grouped, and a plurality of video samples may be produced by synthesizing a certain number of video clips from each group. Alternatively, if the number of video clips which can be acquired from the video clip library according to the tags specified by the edit rule is smaller than a predetermined value, a certain number of video clips may be acquired to synthesize a plurality of video samples.

In an example, if 20 video clips are acquired according to a time tag "today", a certain number of video clips, for example 10 clips or 5 clips, may be acquired from the 20 video clips to produce a plurality of video samples. In other instances, if 1,000 video clips are acquired according to a time tag "today", these 1,000 video clips may be grouped into a number of groups, for example 10 groups each having 100 video clips. In this case, a certain number of video clips, for example 20 video clips may be acquired to synthesize a plurality of video samples. The number of groups and the number of video clips to be acquired from each group may be configured by the user.

In step S2-204, video samples may be shared. In particular, the synthesized video samples may be uploaded to a sharing platform. In some instances, the synthesized video samples may be uploaded to a network such that viewer may browse. Additionally, assessments on the video samples may be obtained during the sharing of the video samples at step S2-205. Viewers may comment on the video samples by providing assessments. Additionally, the number of clicks on a video sample and a duration of viewing a video sample may be recorded. The assessment information such as viewer's assessment, duration of viewing and number of clicks may be acquired.

At step S2-206, video samples may be screened based on the assessments. For example, a target sample may be selected from the plurality of video samples based on the assessment information such as viewer's assessment, duration of viewing and number of clicks. In some instances, the target sample may be stored associated with the assessments in the video clip library.

Additionally, at step S2-207, a determination may be made whether further synthesizing is to be performed. For example, if the number of acquired video clips is larger than or equal to a predetermined value before the video synthesizing, the video samples may be sub-samples which are synthesized based on video clips acquired from each group. Therefore, in this case, the video samples may be further synthesized to produce a final video file. Alternatively, if the number of acquired video clips is smaller than a predetermined value before the video synthesizing, the screened video sample may be kept as the final video file. In some instances, the final video file may be remained in the sharing platform.

Figure 30:
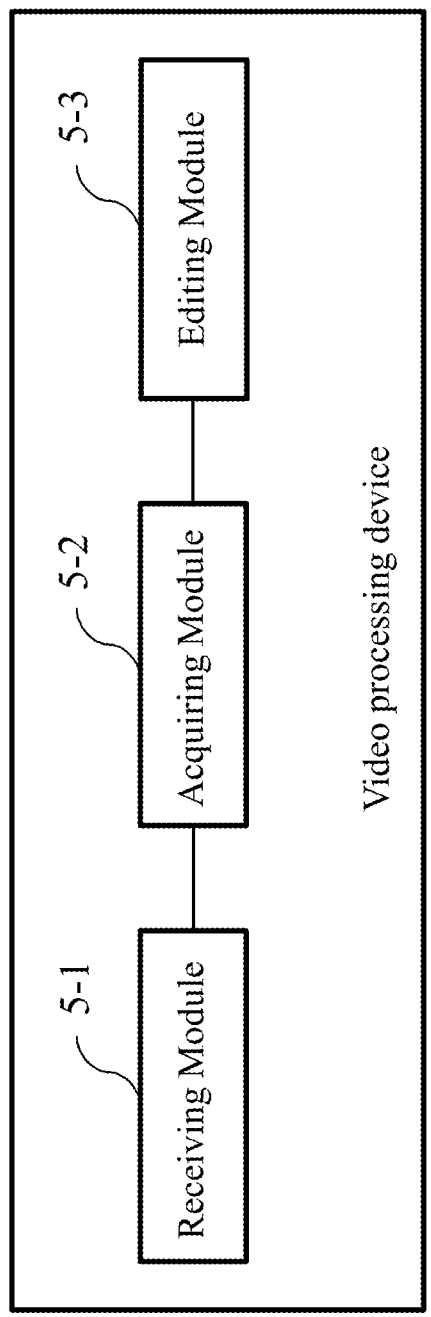
FIG. 30 is a schematic view showing a configuration of a video processing device according to an embodiment of present invention.

FIG. 30 is a schematic view showing a configuration of a video processing device according to an embodiment of present invention. The device described in this disclosure may be, or may be installed on, a display apparatus of an electronic device, such as an aerial vehicle (e.g., UAV), a camera, a mobile phone, or a tablet.

Receiving module 5-1 may receive an edit rule configured by the user. The acquiring module 5-2 may acquire from a video clip library video clips which are specified by the tags in the edit rule. The editing module 5-3 may perform one or more edits on the acquired video clips.

The receiving module 5-1 may receive a preset edit rule or a user customized edit rule. In some embodiments, the preset edit rule may be one or a combination of an edit rule of performing editing according to a time tag of the video clips, an edit rule of performing editing according to a location tag of the video clips, and an edit rule of performing editing according to a rating tag of the video clips. In some embodiments, the user customized edit rule may be a combination of certain rating, time and/or location which are set according to the user's demand.

The acquiring module 5-2 may acquire, from a video clip library, video clips which are specified by the tags indicated by the preset edit rule or the user customized edit rule. For example, the video clips may be acquired video clips based on certain tags, such as certain time tag, location tag or rating tag. For instance, best video clip of the month or best video clip of the year may be acquired based on viewers' assessments. In some examples, the video clips may have ratings tags which may be used to assess whether the video clips qualify as the best video clip, and the video clips may have timing tags which may be used to assess whether the video clips qualify as the best video clip in a specified period of time.

The editing module 5-3 may synthesize the acquired video clips and produce a video file. In some embodiments, the video clips may be combined to produce the video file. Alternatively, the acquired video clips may be inserted into a template to produce the video file. The template may be a default template from the system or a template selected by the user's instruction. In some embodiments, the user may edit the video file if an edit instruction is received.

Figure 31:
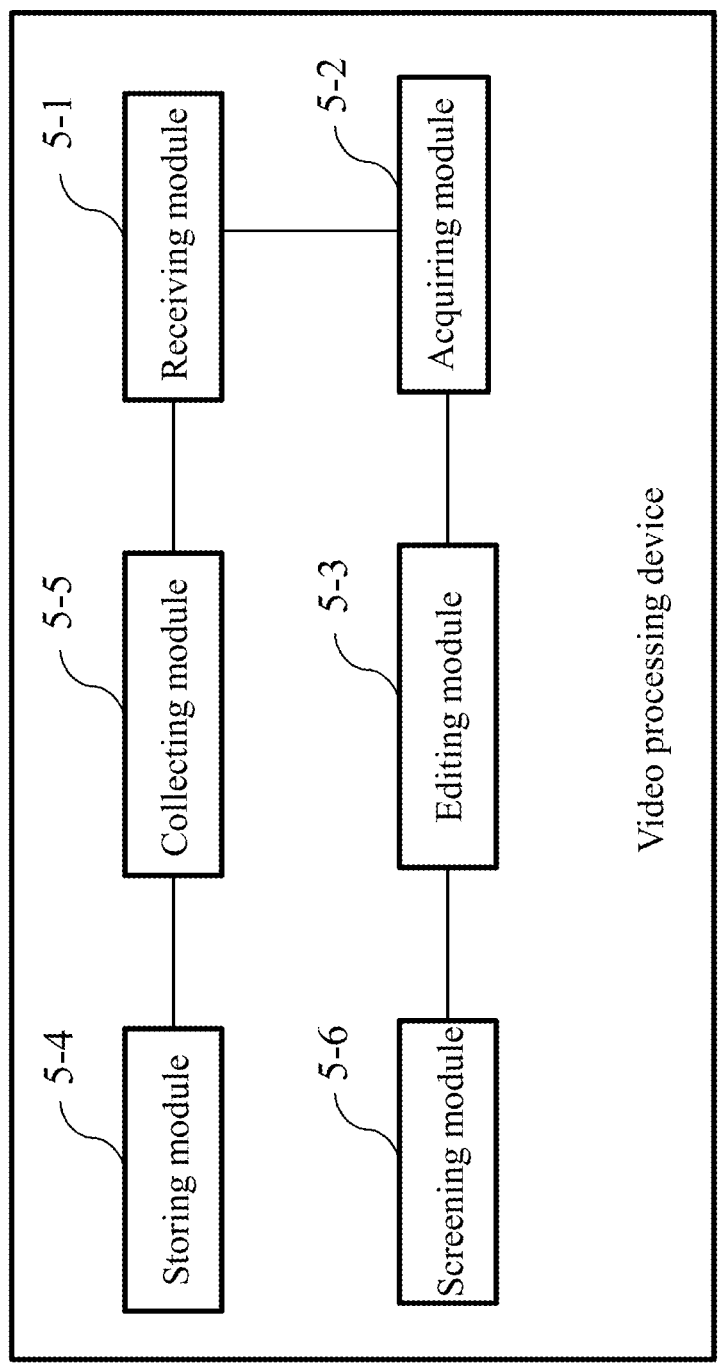
FIG. 31 is a schematic view showing a configuration of a video processing device according to another embodiment of present invention.

FIG. 31 is a schematic view showing a configuration of a video processing device according to another embodiment of present invention. In some embodiments, editing of a video and synthesizing of a video may occur on the same device. In some embodiments, the video processing device may further include a storing module 5-4, a collecting module 5-5 and a screening module 5-6.

The storing module 5-4 may receive a video data from the aerial vehicle as video source such that video clips may be acquired. In some instances, the storing module 5-4 may locally buffer the video data captured by the aerial vehicle and use the buffered video data as target video from which video clips may be extracted.

The collecting module 5-5 may select video clips from the target video and generate tags for the selected video clips.

The screening module 5-6 may extract video clips from a video clip library, synthesize the video clips to produce a plurality of video samples, share the synthesized video samples on a sharing platform such as a network, and screen the synthesized video samples based on viewer's assessment in order to select a target sample.

Figure 32:
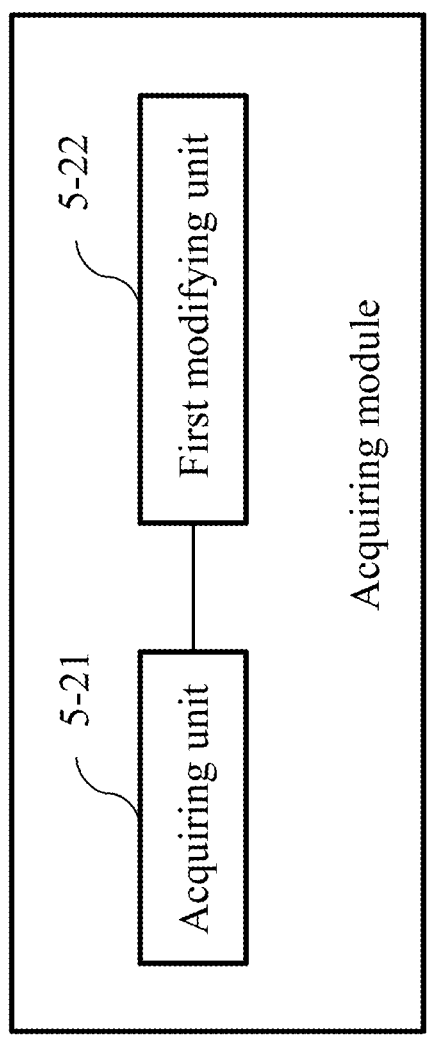
FIG. 32 is a schematic view showing a configuration of an acquiring module in the video processing device according to the embodiment shown in FIG. 30 or FIG. 31.

FIG. 32 is a schematic view showing a configuration of the acquiring module in the video processing device according to the embodiment shown in FIG. 30 or FIG. 31. In some embodiments, the acquiring module 5-2 may include an acquiring unit 5-21 and a first modifying unit 5-22.

The acquiring unit 5-21 may acquire from a video clip library video clips which are specified by the tags in the edit rule. One or more tags may be associated with the acquired video clips. The tags may be acquired with the video clips or may be provided as part of the video clips.

The first modifying unit 5-22 may edit the tags of the video clips, including time tag, location tag and/or rating tag, according to an edit instruction. Optionally, an edit instruction may be provided by a user interacting with an editing application on a device. The user may provide an input that is indicative of a change to a tag, and the corresponding tag may be updated.

Figure 33:
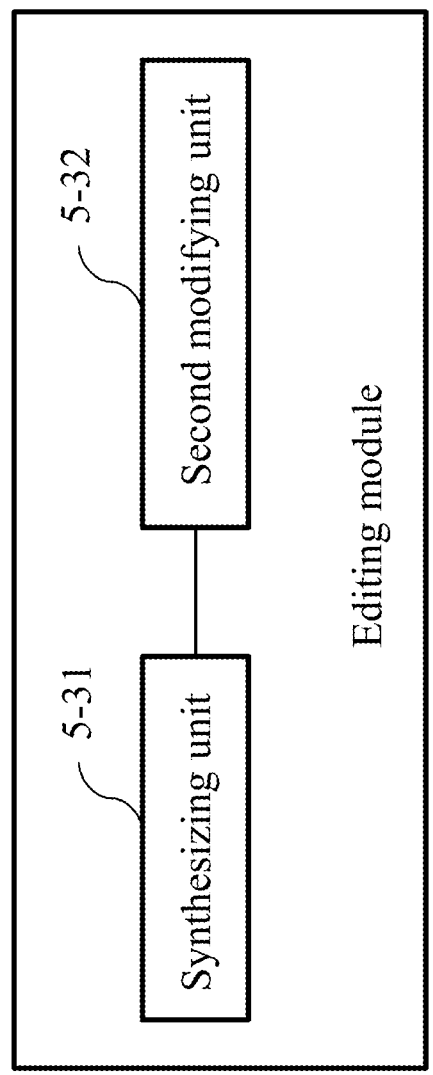
FIG. 33 is a schematic view showing a configuration of an editing module in the video processing device according to the embodiment shown in FIG. 30 or FIG. 31.

FIG. 33 is a schematic view showing a configuration of the editing module in the video processing device according to the embodiment shown in FIG. 30 or FIG. 31. In some embodiments, the editing module 5-3 may include a synthesizing unit 5-31 and a second modifying unit 5-32.

The synthesizing unit 5-31 may synthesize the video clips acquired from the video clip library by the acquiring unit 5-21 to produce a video file. In some embodiments, the synthesizing unit 5-31 may combine the video clips to produce the video file. Alternatively, the synthesizing unit 5-31 may insert the acquired video clips into a template to produce the video file. The template may be a default template from the system or a template selected by the user's instruction.

The template may include one or more of a preset audio, a subtitle and a transition clip. If the template includes a transition clip, the video clips and the transition clips may be arranged according to the user's instruction. In some instances, the video clips may be inserted between the transition clips, such that the video clips are smoothed by the transition clips. If the template includes audio and/or subtitles, the video clips may be synthesized with the audio and/or subtitles to produce a video file. The synthesized video file may be browsed by viewers.

The second modifying unit 5-32 may receive an edit instruction for editing the video file and edit the video file according to the edit instruction. In some instances, if the edit instruction is a reordering instruction, then the video clips may be reordered according to the user's specified order and synthesized to a video file. Alternatively, a "shaking" operation or a pressing on a "synthesize again" button may be performed to reorder the acquired video clips in a random manner. If the edit instruction is a deleting instruction, the video clips specified by the deleting instruction may be deleted. If the edit instruction is an adding instruction, new video clips may be acquired from the video clip library according to the tags specified by the adding instruction, and added to a specified position of the video file. If the edit instruction is an acquiring new video clips instruction, new video clips may be acquired from the video clip library according to the tags specified by the acquiring new video clips instruction, and a new video file may be synthesized accordingly. Additionally, the second modifying unit 5-32 may edit the templates, such as modifying one or more of the audio, subtitles and transition clips.

Figure 34:
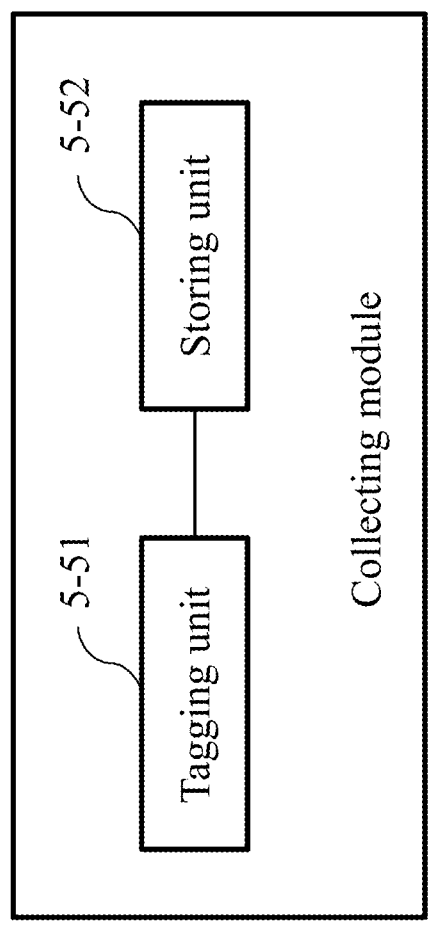
FIG. 34 is a schematic view showing a configuration of a collecting module in the video processing device according to the embodiment shown in FIG. 31.

FIG. 34 is a schematic view showing a configuration of the collecting module in the video processing device according to the embodiment shown in FIG. 31. In some embodiment, the collecting module 5-5 may include a tagging unit 5-51 and a storing unit 5-52. The tagging unit 5-51 may receive a tagging operation for the target video being played, and extract video clips being selected by a tagging operation. The storing unit 5-52 may generate tags for the selected video clips, and store the video clips in associated with the generated tags in a video clip library. In some embodiments, the storing unit 5-52 may perform one or more of the following operations: generating time tags for the selected video clip according to a time of capture thereof, generating a location tag for the selected video clip according to a location of capture, and generating a rating tag for the selected video clip according to a rating thereof.

Figure 35:
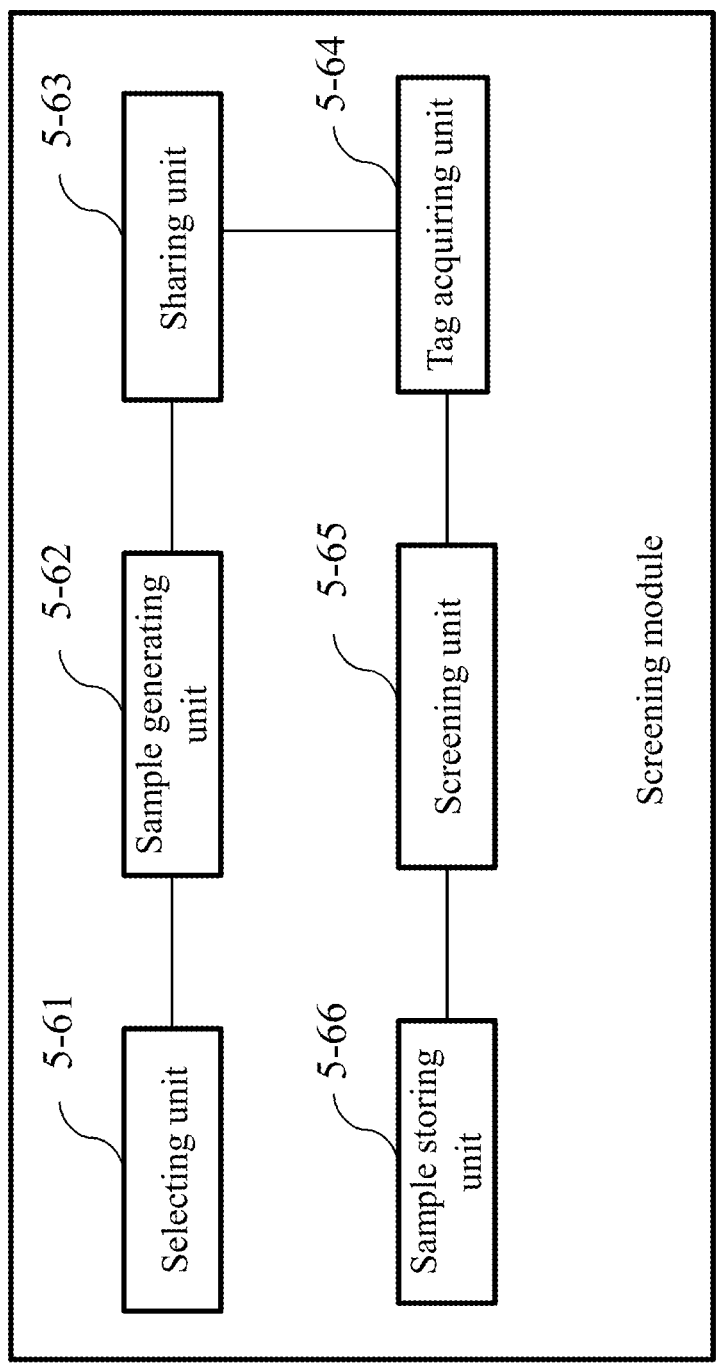
FIG. 35 is schematic view showing a configuration of a screening module in the video processing device according to the embodiment shown in FIG. 31.

FIG. 35 is a schematic view showing a configuration of the screening module in the video processing device according to the embodiment shown in FIG. 31. In some embodiments, the screening module 5-6 may include a selecting unit 5-61, a sample generating unit 5-62, a sharing unit 5-63, a tag acquiring unit 5-64 and a screening unit 5-65.

The selecting unit 5-61 may acquire a certain number of video clips based on tags of the video clips. For example, video clips having certain tags, such as a certain time tag, location tag or rating tag may be acquired. Alternatively, video clips from one flight route of the aerial vehicle may be acquired.

Additionally, the sample generating unit 5-62 may synthesize the acquired video clips to produce the video samples. In some embodiments, if the number of video clips which can be acquired from the video clip library according to the tags specified by the edit rule is larger than a predetermined value, the video clips may be grouped, and a plurality of video samples may be produced by synthesizing a certain number of video clips from each group. Alternatively, if the number of video clips which can be acquired from the video clip library according to the tags specified by the edit rule is smaller than a predetermined value, a certain number of video clips may be acquired to synthesize a plurality of video samples. In some instances, the number of groups and the number of video clips to be acquired from each group may be configured by the user. In some instances, the predetermined value for determining if the video clips should be grouped may also be configured by the user.

The sharing unit 5-63 may upload the video samples to a sharing platform. In some instances, the sharing unit 5-63 may upload the synthesized video samples to a network such that viewer may browse.

The tag acquiring unit 5-64 may acquire viewer's assessment. The viewers may comment on the video samples by providing assessments. In some embodiments, the number of clicks on a video sample and a duration of viewing a video sample may be recorded. The assessment information such as viewer's assessment, duration of viewing and number of clicks may be acquired.

The screening unit 5-65 may select a target sample from the plurality of video samples based on the assessment information such as viewer's assessment, duration of viewing and number of clicks. In this way, best video clip of the month or best video clip of the year may be acquired.

The screening module 5-6 may further include a sample storing unit 5-66. The sample storing unit 5-66 may store the target sample in associated with the assessments in the video clip library.

Figure 36:
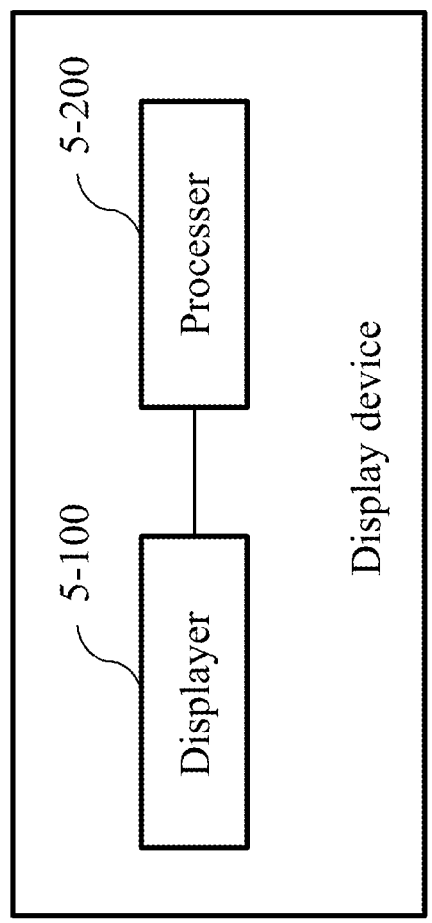
FIG. 36 is a schematic view showing a configuration of a displaying device according to an embodiment of present invention.

FIG. 36 is a schematic view showing a configuration of a displaying device according to an embodiment of present invention. The display device described in this disclosure may be a display apparatus of an aerial vehicle, a mobile phone and a pad. In some embodiments, the display device may include a displayer 5-100 and a processor 5-200.

The displayer 5-100 may display the video clips and operation information. The processor 5-200 may be configured to, before receiving the edit rule configured by the user, perform one or more of the following operations: receiving a tagging edit operation for the target video being played; extracting video clips being selected by a tagging operation; generating tags for the selected video clips; and storing the video clips in associated with the generated tags in a video clip library.

In some embodiments, the processor 5-200 may be configured to generate tags for the selected video clips, and store the video clips in associated with the generated tags in a video clip library. In some embodiments, the storing unit 5-52 may perform one or more of the following operations: generating time tags for the selected video clip according to a time of capture thereof, generating a location tag for the selected video clip according to a location of capture, and generating a rating tag for the selected video clip according to a rating thereof.

In some embodiments, the processor 5-200 may be configured to receive a preset edit rule or a user customized edit rule. In some instances, the preset edit rule may be one or a combination of an edit rule of performing editing according to a time tag of the video clips, an edit rule of performing editing according to a location tag of the video clips, and an edit rule of performing editing according to a rating tag of the video clips.

In some embodiments, the processor 5-200 be configured to may receive am edit instruction after storing the acquired video clips in associated with the corresponding tags in a video clip library, and edit the tags of the video clips, including time tag, location tag and rating tag, according to an edit instruction.

The processor 5-200 may be configured to synthesize the acquired video clips to produce a video file. Additionally, the processor 5-200 may be configured to perform one or more of the following operations: reordering the video clips in the video file, deleting video clips from the video file, and adding new video clips into the video file. Further, the processor 5-200 may be configured to acquire a predetermined number of video clips from the video clip library based on tags of the video clips, synthesize the video clips to produce video samples, share the video samples, acquire assessment on the video samples and screen the video samples to select a target sample according to the assessment.

The processor 5-200 may be configured to store the target sample in associated with the assessments in the video clip library. Additionally, the processor 5-200 may be configured to acquire a template and insert the video clips into the template to produce the video file. The template may include one or more of: a preset audio, a subtitle and a transition clip. Therefore, the final video file may include video, audio and/or subtitles. Further, the processor 5-200 may be configured to receive user's instruction to may edit the templates, such as modifying one or more of the audio, subtitles and transition clips.

Figure 37:
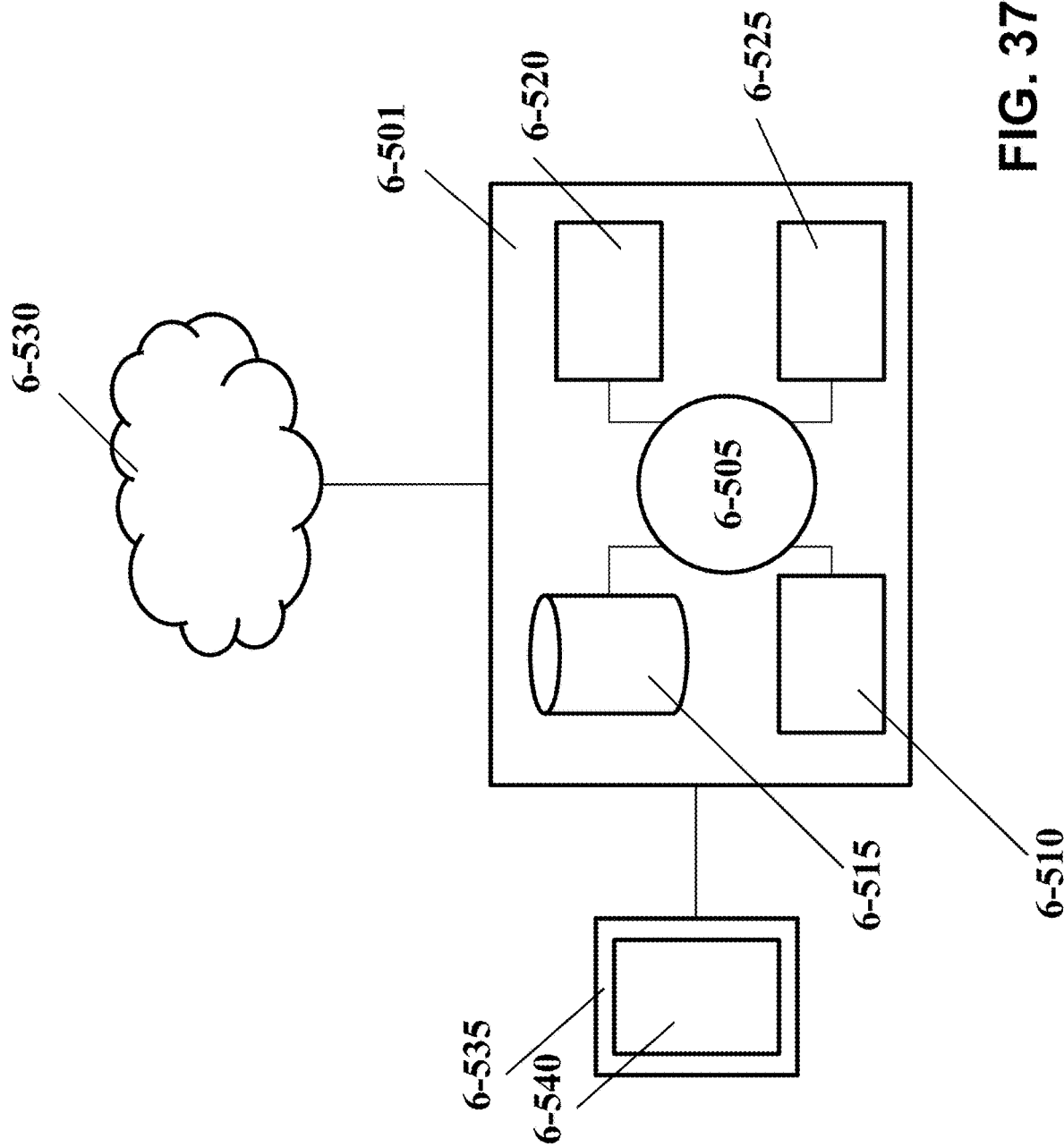
FIG. 37 shows a computer control system that is programmed or otherwise configured to implement methods provided herein.

The present disclosure provides computer control systems that are programmed to implement methods of the disclosure. FIG. 37 shows a computer system 6-501 that is programmed or otherwise configured to process video data. The computer system 6-501 can regulate various aspects of processing video data of the present disclosure, such as, for example, capturing video data, storing video data, editing video data, and merging video data. The computer system 6-501 can be a processor of an image capture system, an electronic device of a user, or a computer system that is remotely located with respect to the electronic device. The electronic device can be a mobile electronic device.

The computer system 6-501 includes a central processing unit (CPU, also "processor" and "computer processor" herein) 6-505, which can be a single core or multi core processor, or a plurality of processors for parallel processing. The computer system 6-501 also includes memory or memory location 6-510 (e.g., random-access memory, read-only memory, flash memory), electronic storage unit 6-515 (e.g., hard disk), communication interface 6-520 (e.g., network adapter) for communicating with one or more other systems, and peripheral devices 6-525, such as cache, other memory, data storage and/or electronic display adapters. The memory 6-510, storage unit 6-515, interface 6-520 and peripheral devices 6-525 are in communication with the CPU 6-505 through a communication bus (solid lines), such as a motherboard. The storage unit 6-515 can be a data storage unit (or data repository) for storing data. The computer system 6-501 can be operatively coupled to a computer network ("network") 6-530 with the aid of the communication interface 6-520. The network 6-530 can be the Internet, an internet and/or extranet, or an intranet and/or extranet that is in communication with the Internet. The network 6-530 in some cases is a telecommunication and/or data network. The network 6-530 can include one or more computer servers, which can enable distributed computing, such as cloud computing. The network 6-530, in some cases with the aid of the computer system 6-501, can implement a peer-to-peer network, which may enable devices coupled to the computer system 6-501 to behave as a client or a server.

The CPU 6-505 can execute a sequence of machine-readable instructions, which can be embodied in a program or software. The instructions may be stored in a memory location, such as the memory 6-510. The instructions can be directed to the CPU 6-505, which can subsequently program or otherwise configure the CPU 6-505 to implement methods of the present disclosure. Examples of operations performed by the CPU 6-505 can include fetch, decode, execute, and writeback.

The CPU 6-505 can be part of a circuit, such as an integrated circuit. One or more other components of the system 6-501 can be included in the circuit. In some cases, the circuit is an application specific integrated circuit (ASIC).

The storage unit 6-515 can store files, such as drivers, libraries and saved programs. The storage unit 6-515 can store user data, e.g., user preferences and user programs. The computer system 6-501 in some cases can include one or more additional data storage units that are external to the computer system 6-501, such as located on a remote server that is in communication with the computer system 6-501 through an intranet or the Internet.

The computer system 6-501 can communicate with one or more remote computer systems through the network 6-530. For instance, the computer system 6-501 can communicate with a remote computer system of a user (e.g., a user terminal). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 6-501 via the network 6-530.

Methods as described herein can be implemented by way of machine (e.g., computer processor) executable code stored on an electronic storage location of the computer system 6-501, such as, for example, on the memory 6-510 or electronic storage unit 6-515. The machine executable or machine readable code can be provided in the form of software. During use, the code can be executed by the processor 6-505. In some cases, the code can be retrieved from the storage unit 6-515 and stored on the memory 6-510 for ready access by the processor 6-505. In some situations, the electronic storage unit 6-515 can be precluded, and machine-executable instructions are stored on memory 6-510.

The code can be pre-compiled and configured for use with a machine have a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 6-501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 6-501 can include or be in communication with an electronic display 6-535 that comprises a user interface (UI) 6-540 for providing, for example, a user terminal that plays video and/or allows a user to edit video at the user interface 6-540. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 6-505. The algorithm can, for example, prioritize processing of video clips or order video clips that are to be merged.

The systems, devices, and methods described herein can be applied to a wide variety of objects, including movable objects and stationary objects. As previously mentioned, any description herein of an aerial vehicle, such as a UAV, may apply to and be used for any movable object. Any description herein of an aerial vehicle may apply specifically to UAVs. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm, 500 cm$^3$, 750 cm$^3$, 1000 cm$^3$, 5000 cm$^3$, 10,000 cm$^3$, 100,000 cm$^3$3, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of processing a video, said method comprising:
controlling, by a user terminal, an image capture device to capture a first set of video data at a first definition during a flight;
receiving, by the user terminal, the first set of video data at a second definition remotely from the image capture device during the flight;
editing, by the user terminal, the received first set of video data at the second definition, thereby forming a video edit request, wherein editing the first set of video data includes: selecting one or more video clips; changing an order of the one or more video clips; adding a video filtering effect to the one or more video clips; editing a duration of the one or more video clips; deleting the one or more video clips; adding another one or more video clips; presenting in a slow motion mode and presenting in a fast playing mode; and combining the one or more video clips into a single video file;
transmitting the video edit request to the image capture device; and
receiving, from the image capture device, a second set of video data at a third definition, wherein the second set of video data corresponds to edited video data in the video edit request, and the third definition is lower than the first definition and higher than the second definition.

2. The method of claim 1, wherein the first definition is at least a 4K definition and wherein the image capture device is a 4K or greater image capture device.

3. The method of claim 1, wherein the first, second, and third definitions are determined based on any one or more of a framerate, a visual quality and a resolution.

4. The method of claim 1, wherein the image capture device is installed on an unmanned aerial vehicle (UAV), and wherein the first set of video data is captured while the UAV is in flight.

5. The method of claim 4, wherein the second set of video data is received while the UAV is in flight.

6. The method of claim 1, wherein the user terminal is a mobile device, and wherein editing the first set of video data at the second definition occurs using a mobile application on the mobile device.

7. The method of claim 4, wherein the user terminal is configured to control a movement of the UAV or the image capture device of the UAV.

8. The method of claim 1, wherein selecting one or more video clips includes selecting one or more video clips according to a tag or description of the video clip.

9. The method of claim 1, wherein editing the first set of video data includes storing a video clip description of each of the one or more video clips in the video edit request, and wherein the video clip description includes a starting time and an ending time of the video clip among the first set of video data, or a rating of the video clip.

10. The method of claim 1, wherein editing the first set of video data includes editing audio data, and wherein the audio data is selected from a local audio source of the image capture device.

11. The method of claim 1, wherein editing the first set of video data includes editing audio data, and wherein the audio data is selected from an online audio source.

12. A user terminal for processing a video, said user terminal comprising:
a communication unit that permits communication with a remote image capture device; and
one or more processors that individually or collectively:
control the image capture device to capture a first set of video data at a first definition during a flight;
receive the first set of video data at a second definition from the image capture device during the flight;
edit the received first set of video data at the second definition, thereby forming a video edit request;
generate a signal for the communication unit to transmit the video edit request to the image capture device; and
receive a second set of video data from the image capture device at a third definition, wherein the second set of video data corresponds to edited video data in the video edit request, and the third definition is lower than the first definition and higher than the second definition, wherein editing the first set of video data includes: selecting one or more video clips; changing an order of the one or more video clips; adding a video filtering effect to the one or more video clips; editing a duration of the one or more video clips; deleting the one or more video clips; adding another one or more video clips; presenting in a slow motion mode and presenting in a fast playing mode; and combining the one or more video clips into a single video file.

13. The user terminal of claim 12, wherein the image capture device is installed on a movable object, and wherein the one or more processors receive the first set of video data while the movable object is in motion.

14. The user terminal of claim 13, wherein the one or more processors receive the second set of video data while the movable object is in motion.

15. A computer program product for processing a video, the computer program product being encoded on non-transitory machine-readable storage media and comprising:
instructions for controlling, using a user terminal, an image capture device to capture a first set of video data at a first definition during a flight;
instructions for receiving, using the user terminal, the first set of video data at a second definition remotely from the image capture device during the flight;
instructions for editing, using the user terminal, the received first set of video data at the second definition, thereby forming a video edit request, wherein editing the first set of video data includes: selecting one or more video clips; changing an order of the one or more video clips; adding a video filtering effect to the one or more video clips; editing a duration of the one or more video clips; deleting the one or more video clips; adding another one or more video clips; presenting in a slow motion mode and presenting in a fast playing mode; and combining the one or more video clips into a single video file;

instructions for transmitting the video edit request to the image capture device; and instructions for receiving, from the image capture device, a second set of video data at a third definition, wherein the second set of video data corresponds to edited video data in the video edit request, and the third definition is lower than the first definition and higher than the second definition.

16. The method of claim 1, wherein editing the received first set of video data includes accommodating the first set of video data at the second definition in a template, the template being selected from an online source and including an audio and a subtitle.

17. The method of claim 1, wherein editing the received first set of video data includes accommodating the first set of video data at the second definition in a template, the template being selected from an online source and including a prologue, an epilogue, and a transition effect.

* * * * *